United States Patent
Kume

(10) Patent No.: US 6,606,914 B2
(45) Date of Patent: Aug. 19, 2003

(54) LOAD SENSOR, LOAD SENSOR UNIT AND INSERTION DETECTION DEVICE

(75) Inventor: Masahiro Kume, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 232 days.

(21) Appl. No.: 09/917,933

(22) Filed: Jul. 31, 2001

(65) Prior Publication Data

US 2002/0020223 A1 Feb. 21, 2002

(30) Foreign Application Priority Data

| Aug. 1, 2000 | (JP) | ................................ 2000-233347 |
| Aug. 23, 2000 | (JP) | ................................ 2000-252222 |

(51) Int. Cl.[7] ................................................. G01N 3/20
(52) U.S. Cl. .......................................... 73/849; 73/824
(58) Field of Search ........................ 73/790, 796, 807, 73/812, 813, 814, 818, 821, 824, 849

(56) References Cited

U.S. PATENT DOCUMENTS

| 6,367,334 B2 | * | 4/2002 | Wade et al. ................... 73/756 |
| 6,389,907 B2 | * | 5/2002 | Shishihara et al. ............ 73/849 |
| 6,412,354 B1 | * | 7/2002 | Birchak et al. ........ 73/861.356 |

* cited by examiner

Primary Examiner—Max Noori
(74) Attorney, Agent, or Firm—Oliff & Berridge, PLC

(57) ABSTRACT

A load sensor 10 is provided with an elastic conductive tube 21, and a first electrode member 22 and second electrode member 23 separated by a distance in the longitudinal direction. The load sensor 10 is further provided with an elongated insertion member 24 to be inserted into the elastic conductive tube 21, and envelope members 25, which are provided at predetermined intervals in the longitudinal direction to enclose the insertion member 24, and together with the insertion member 24 are inserted into the tube 21 to separate the insertion member 24 from the tube 21. When the tube 21 is bent by the application of a load, the electrode members 22 and 23 contact the tube 21. The load is detected by determining whether the electrode members 22 and 23 have been rendered conductive via the tube 21. The sensitivity of the sensor 10 can be easily controlled by adjusting the interval between envelope members 25 and the thicknesses thereof.

47 Claims, 31 Drawing Sheets

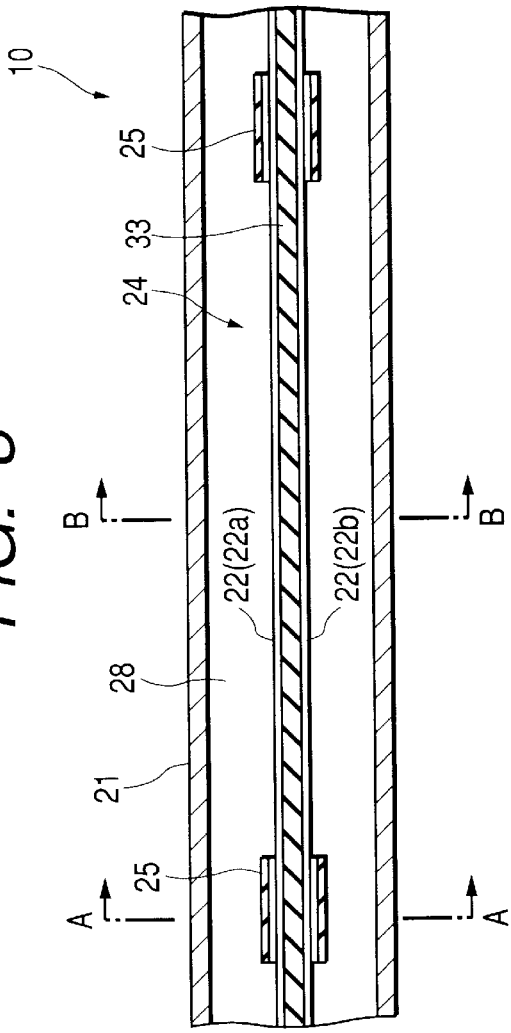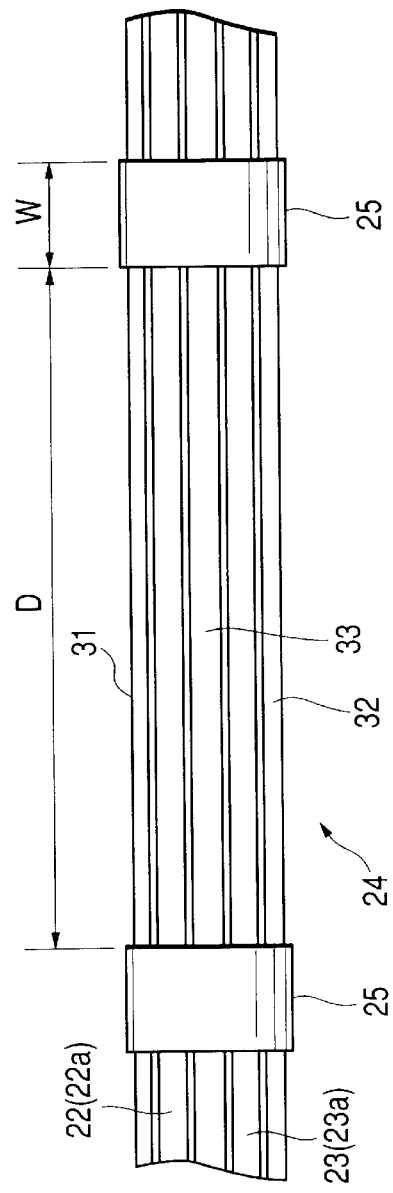

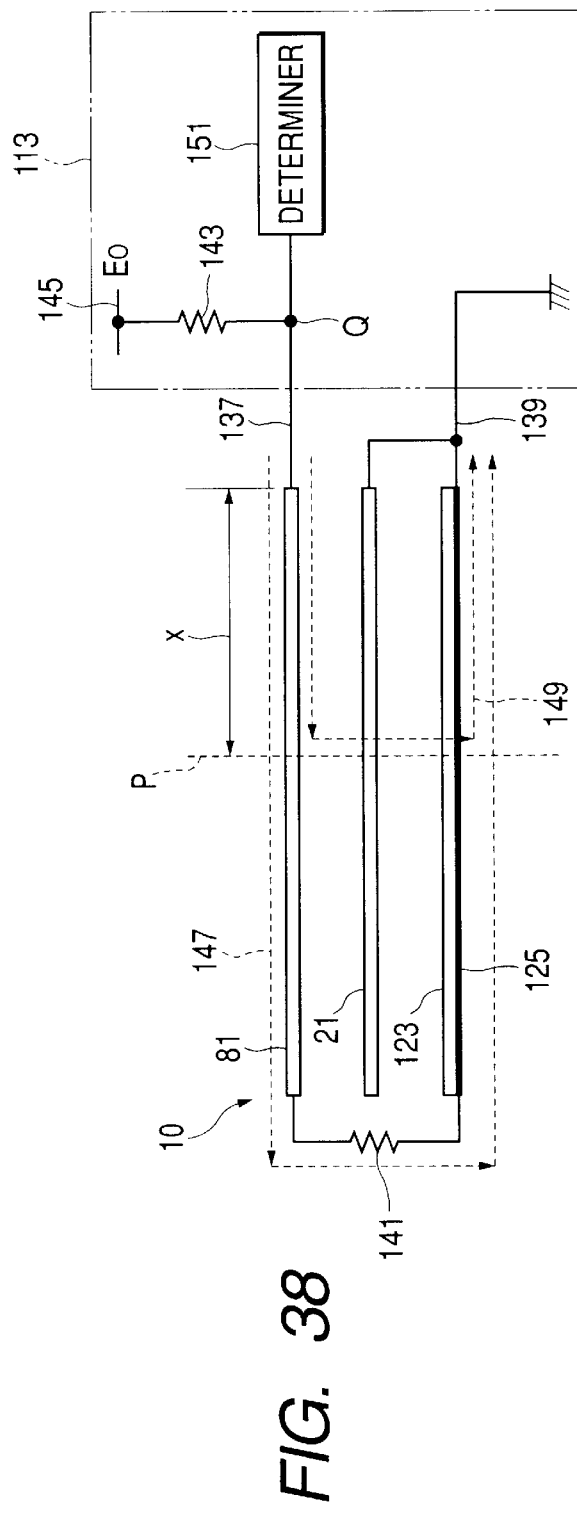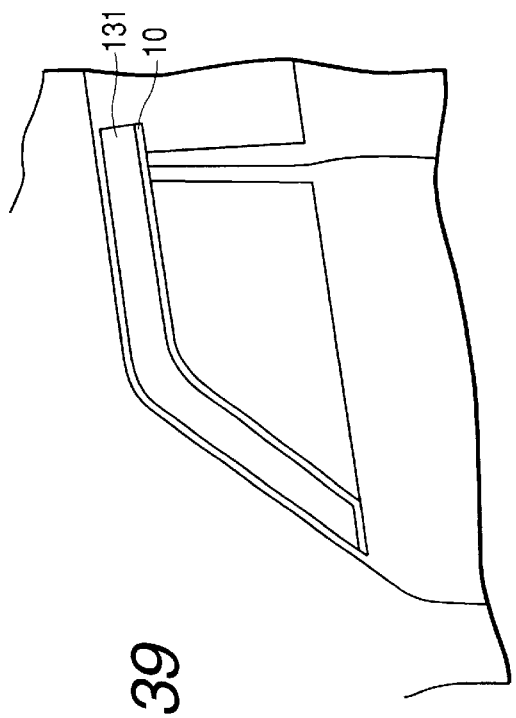

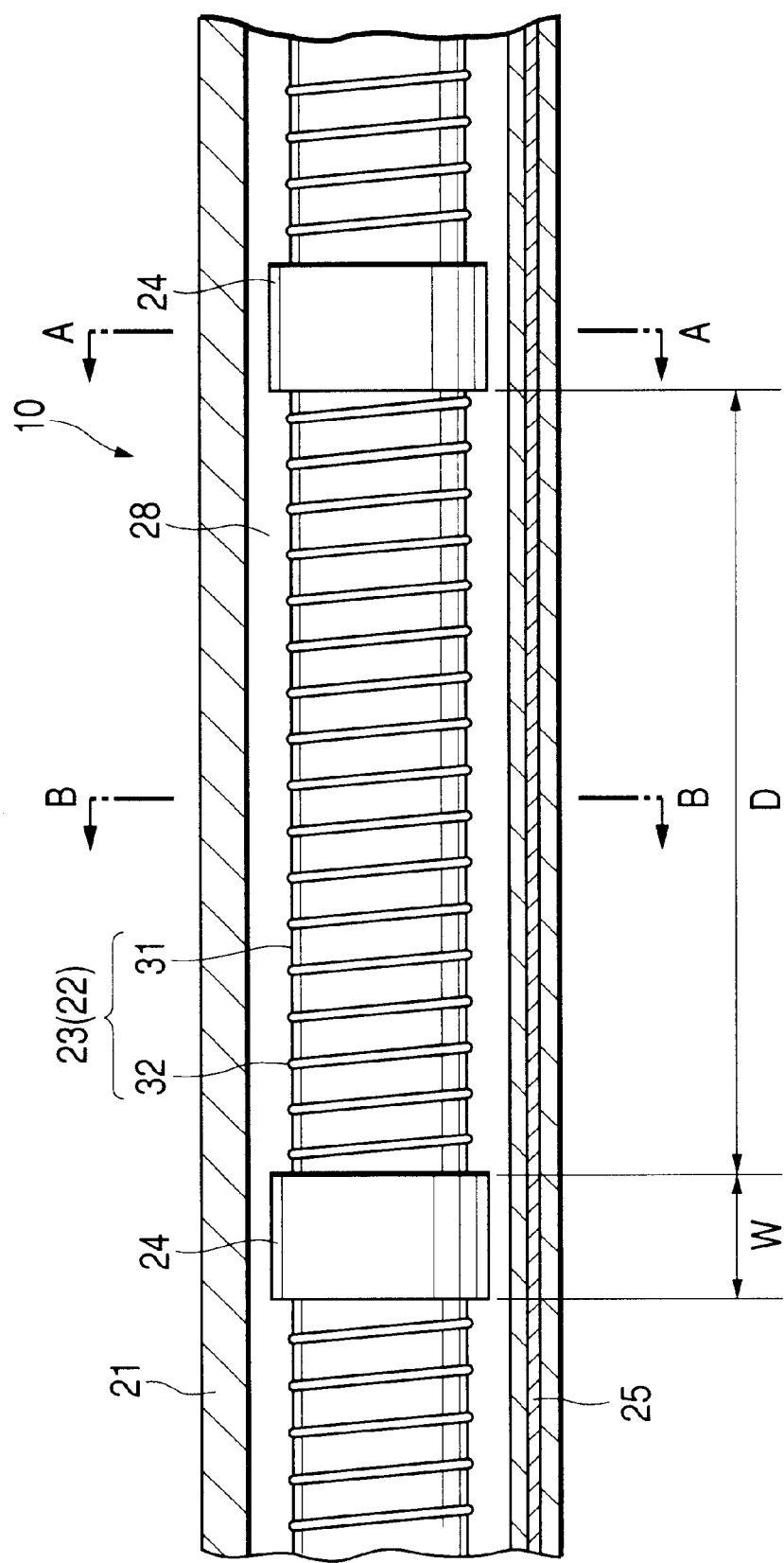

US 6,606,914 B2

LOAD SENSOR, LOAD SENSOR UNIT AND INSERTION DETECTION DEVICE

BACKGROUND OF THE INVENTION

1. Field of the Invention

The present invention relates to a load sensor, a load sensor unit, and an insertion detection device.

2. Description of the Related Art

A technique is available for a load sensor mounted within an automobile seat, such as a driver's seat, for detecting the presence of a seated person. An example, conventional load sensor of this type is shown in FIG. 52.

In the example, pressure sensors A1 to A4, B1 to B4, C1 to C4, D1 to D4 and E1 to E4 are located at the intersections of vertical axes 1 to 4 and horizontal axes A to E in a sheet S disposed within a seat. A controller 5 determines from pressure detection results, provided by the pressure sensors A1 to A4, B1 to B4, C1 to C4, D1 to D4 and E1 to E4, whether the seat is bearing a load, and transmits the load determination results to a predetermined driver 6. Pressure sensitive conductive material, having a resistance that varies in accordance with the pressure applied, is employed for the pressure sensors A1 to A4, B1 to B4, C1 to C4, D1 to D4 and E1 to E4.

For the load sensor in FIG. 52, the pressure sensors A1 to A4, B1 to B4, C1 to C4, D1 to D4 and E1 to E4, made of pressure sensitive conductive material, must be arranged as a matrix. Further, in order to detect pressure imposed at various points on the sheet S, multiple pressure sensors, A1 to A4, B1 to B4, C1 to C4, D1 to D4 and E1 to E4, are required. Thus, the resulting circuit is complicated, and the manufacturing costs are increased.

SUMMARY OF THE INVENTION

It is, therefore, one objective of the present invention to provide a load sensor, having a comparatively simple and inexpensive configuration and circuit structure, that can easily and accurately detect loads.

To achieve the above object, it is characterized by comprising:

an elastic tube, at least one part of which, in the circumferential direction, is a conductive portion;

an elongated insertion member that has longitudinally arranged first and second electrode members provided at a distance, and that is inserted into the elastic tube; and envelope members that are provided longitudinally, at a predetermined distance, to enclose the insertion member, and that, together with the insertion member, are inserted into the elastic tube to separate the insertion member from the elastic tube, wherein, while the elastic tube is in the normal state, the first and the second electrode members are so positioned, at a distance from the conductive portion of the elastic tube, that when an external load bends the elastic tube an electrical connection is established between the first and the second electrode members, with or without the conductive portion of the elastic tube.

Further, to achieve the objective, it is characterized by comprising:

an elastic tube, at least one part of which, in the circumferential direction, is a conductive portion;

an elongated insertion member that has longitudinally arranged electrode members provided at a distance, and that is inserted into the elastic tube; and envelope members that are provided longitudinally, at a predetermined distance, to enclose the insertion member, and that, together with the insertion member, are inserted into the elastic tube to separate the insertion member from the elastic tube, wherein, while the elastic tube is in the normal state, the electrode members are so positioned, at a distance from the conductive portion of the elastic tube, that when an external load bends the elastic tube an electrical connection is established between the electrode members and the conductive portion of the elastic tube, with or without the conductive portion of the elastic tube.

Preferably, for the envelope members, at least, one of the separating interval, the thickness, and the width in the longitudinal direction is set in accordance with the magnitude of the load that is to be detected.

Preferably, the envelope members are formed of insulating material.

Further, it is preferable that the envelope members be ring-shaped and externally engage the outer wall of the insertion member.

It is preferable that the envelope members be secured to the insertion member by an adhesive.

Preferably, the envelope members are thermally shrinking tubes.

Preferably, the envelope members are formed by winding insulating tape around the insertion member.

Preferably, the insulating tape is spirally and continuously wound around the insertion member in the longitudinal direction with a predetermined gap.

It is preferable that the envelope members each include a metal fixing member, attached via a predetermined insulating member to the outer wall of the insertion member, and a coated insulating member, fixed to and covering the outer wall of the metal fixing member.

It is preferable that the envelope members each include a metal fixing member, attached to the outer wall of the insertion member, and a coated insulating member, fixed to and covering the outer wall of the metal fixing member.

It is preferable that the insertion member includes, on the outer wall on which the first and the second electrode members are provided, the first and the second electrode members and an elastic insulating member.

Preferably, the load sensor further comprises a signal extraction output line that is electrically connected to the conductive portion of the elastic tube when the conductive portion, wound around the outer walls of the envelope members, is inserted into one end of the elastic tube.

In addition, preferably, the electrode members are formed of elastic conductive members through which hollow, longitudinal portions passes.

It is preferable that the conducive members be made of an elastic conductive material, a conductive metal, a compound material composed of an elastic conductive material and a conductive metal, or a compound material composed of a conducive metal and an insulating material.

It is preferable that the load sensor further include an exterior elastic tube enclosing the elastic tube.

Further, it is preferable that the load sensor include a load sensor body incorporating the elastic tube, the insertion member and the envelope member, and a substantially plate-shaped base member whereon the load sensor body is mounted.

It is preferable that the load sensor include a load sensor body incorporating the elastic tube, the insertion member and the envelope member, and two plate-shaped pressing members for vertically sandwiching and securing the load sensor body.

It is preferable that the electrode members be fashioned from flexible members, and that the electrode members constitute the insertion member.

Preferably, the electrode members have metal, longitudinally laid lines.

Preferably, the electrode members each include an elongated flexible core member and a metal line wound coil-like around the outer wall of the core member.

It is preferable that the core member be an insulating member of resin, rubber or a fibrous material, or a compound material incorporating several of these materials.

Preferably, the core member is formed of an elastic material, and the metal line is wound around and embedded in the outer wall of the core member.

It is preferable that a spiral groove into which the metal line is to be fitted is formed in the outer wall of the core member, and that the metal line is fitted into the groove when wound around the core member.

It is preferable that anticorrosive metal be employed for the metal line.

Preferably, the envelope members are integrally formed by molding resin or rubber on the outer wall of the electrode member.

Preferably, the sensitivity of the load sensor used to detect the load is adjusted by altering, at least, one of the interval between the envelope members for enclosing the electrode member, the width in the longitudinal direction of the electrode member, the distance between the metal, coil-like wound line and the elastic tube, the thickness of the elastic tube, and the outer diameter of the elastic tube.

Preferably, the signal extraction line is electrically connected, directly or via a predetermined conductive member, to the conductive portion that is positioned at one or both ends of the elastic tube, and to the electrode members that are positioned at one or both ends of the insertion member.

It is preferable that at both ends of the elastic tube the inner space of the elastic tube be protected from the outside by predetermined shielding means.

Preferably, the insertion means is divided into two segments at a specific location in the longitudinal direction.

Preferably, the two segments are positioned at a predetermined interval.

Furthermore, to achieve the objective, it is characterized by comprising: one or multiple load sensors according to one of second, nineteenth and twenty-seventh aspects; and an insulating base member whereon one or a multiple of the load sensors are mounted.

Preferably, the load sensors are securely fixed to the base member at the ends of the load sensor or at portions whereat the envelope members are inserted between the insertion member and the elastic tube.

Preferably, the base member is a sheet member, and one or a multiple of the load sensors and the base member constitute a sheet unit. The sensor unit includes the sheet unit and a sheet-shaped insulating bag member in which the sheet unit is included.

To achieve the objective, an insertion detection device, which detects the insertion of a foreign object when an opening is closed by an opening/closing member, comprises:

a load sensor according to one of nineteenth to twenty ninth aspects, which is provided on the inner wall of the opening or the outer wall of the opening/closing member that is opposite the inner wall; and a detector, for detecting the insertion of a foreign object by determining whether the conductive portion of the elastic tube is electrically connected to the electrode members of the insertion member via a predetermined signal line.

To achieve the above object, it is characterized by comprising:

an elastic tube, at least one part of which, in the circumferential direction, is a conductive portion;

an elongated insertion member, which has an electrode member provided longitudinally and which is inserted into the elastic tube;

envelope members, which are provided longitudinally at predetermined intervals to enclose the insertion member, and are inserted together with the insertion member into the elastic tube to separate the insertion member from the elastic tube; and a metal conductive line, laid in the longitudinal direction of the elastic tube, wherein the electrode member is located at a distance from the conductive portion of the elastic tube while the elastic tube is in the normal state, so that when the flexible elastic tube is bent by the application of an external load, an electrical connection is established by the electrode member, through or apart from the conductive portion of the elastic tube, and wherein the metal conductive line is so arranged that, when the elastic tube is bent by the external application of a load, at least the portion of the metal conducive line at the load application position is capable of being electrically connected to the conductive portion of the elastic tube.

Preferably, the arrangement of the metal conductive line is such that the line can directly contact the conductive portion of the elastic tube at individual longitudinal points.

Preferably, the load sensor further comprises:

an exterior tube, which is provided on the outer wall of the elastic tube to accommodate the elastic tube and which has, at the least, one circumferential part that faces the conductive portion of the elastic tube and that serves as a conductive portion, wherein the metal conductive line is provided so as to directly contact the conductive portion of the exterior tube at the individual longitudinal points, and wherein the metal conductive line can be electrically connected to the conductive portion of the elastic tube through the conductive portion of the exterior tube.

It is preferable that the electrode member be fashioned from flexible members, and that the electrode member constitute the insertion member.

Preferably, the electrode member has metal, longitudinally laid lines.

Preferably, the electrode member includes an elongated flexible core member and a metal line wound coil-like around the outer wall of the core member.

It is preferable that the core member be an insulating member of resin, rubber or a fibrous material, or a compound material incorporating several of these materials.

Preferably, the core member is formed of an elastic material, and the metal line is wound around and embedded in the outer wall of the core member.

It is preferable that a spiral groove into which the metal line is to be fitted is formed in the outer wall of the core member, and that the metal line is fitted into the groove when wound around the core member.

It is preferable that anticorrosive metal be employed for the metal line.

Preferably, the envelope members are integrally formed by molding resin or rubber on the outer wall of the electrode member.

To achieve the objective, an insertion detection device, which detects the insertion of a foreign object when an opening is closed by an opening/closing member, comprises:

a load sensor according to one of first to eleventh aspects, which is provided on the inner wall of the opening or the outer wall of the opening/closing member that is opposite the inner wall; and a detector, for detecting the insertion of a foreign object by determining whether the conductive portion of the elastic tube is electrically connected to the electrode member of the insertion member via a predetermined signal line.

BRIEF DESCRIPTION OF THE DRAWINGS

FIG. 3 is an axially parallel cross-sectional view of the load sensor.

FIG. 4 is a plan view of an insertion member and an envelope member provided for the load sensor.

FIG. 38 is a specific diagram showing the circuit structure of the essential portion of the insertion detection device in FIG. 36.

FIG. 39 is a perspective view of a specific example arrangement for the load sensor in FIG. 37.

FIG. 40 is an axially parallel cross-sectional view of a load sensor according to a sixth embodiment of the invention.

DETAILED DESCRIPTION OF THE PRESENT INVENTION

First Embodiment

Figure 1:
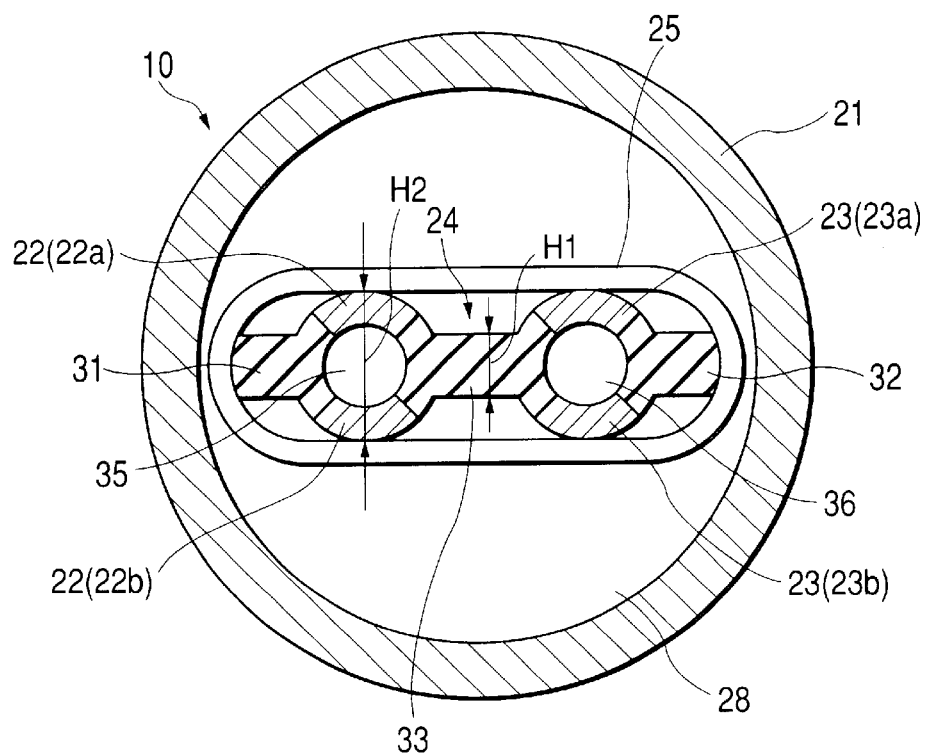
FIG. 1 is an axially orthogonal cross-sectional view of a load sensor according to a first embodiment of the present invention.
Figure 2:
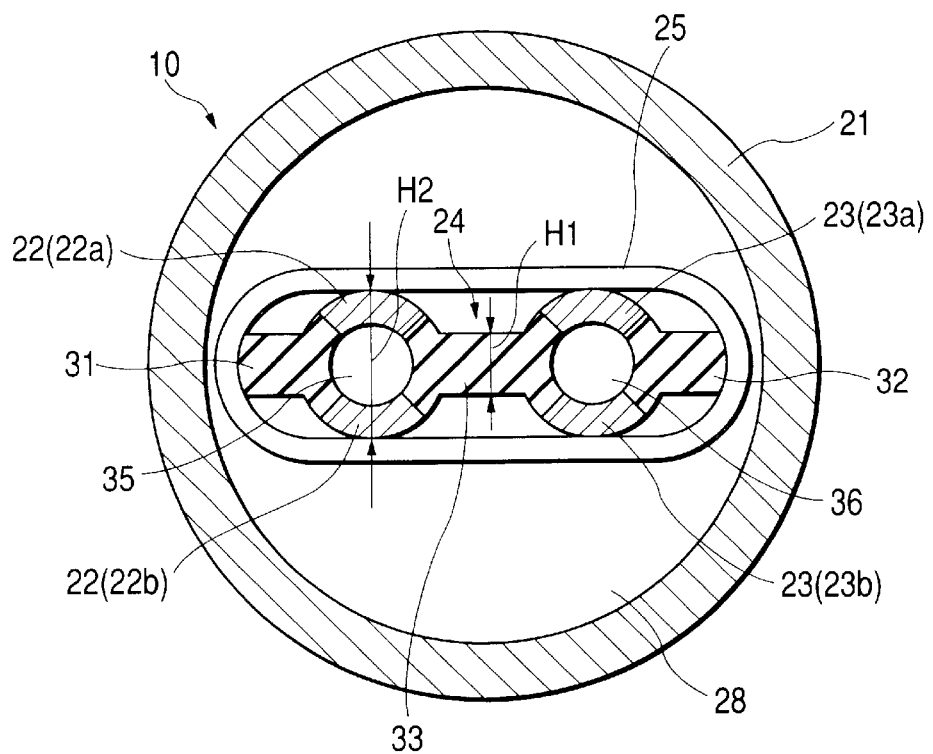
FIG. 2 is an axially orthogonal cross-sectional view of the load sensor according to the first embodiment of the present invention.

FIGS. 1 and 2 are axially orthogonal cross-sectional views of a load sensor 10 according to a first embodiment of the present invention. FIG. 3 is an axially parallel cross-sectional view of the load sensor 10 in FIG. 1, and FIG. 4 is a plan view of an insertion member 24 and an envelope member 25 provided for the load sensor 10 in FIG. 1. It should be noted that the cross-sectional view in FIG. 1 is taken along line A—A and the cross-sectional view in FIG. 2 is taken along line B—B in FIG. 3.

As is shown in FIGS. 1 to 4, the load sensor 10 comprises a hollow elastic conductive tube (elastic tube) 21; the elongated and elastic insertion member 24, which includes first and second electrode members 22 and 23 having positive and negative polarities and is inserted into the elastic tube 21; and multiple envelope members 25, which are provided on the outer wall of the insertion member 24.

As is shown in FIGS. 1 to 4, the elastic conductive tube 21 is a substantially tubular member having a hollow portion 28, and is entirely formed of an elastic conductive material, such as conductive rubber. In this embodiment, the entire portion serves as the conductive portion.

As is shown in FIGS. 1 to 4, the insertion member 24 includes: insulating side members 31 and 32, which in cross section are formed at respective side ends; an insulating center member 33, which in cross section is centrally positioned; the first electrode member 22, which is arranged between the insulating side member 31 and the insulating center member 33; and the second electrode member 23, which is arranged between the insulating side member 32 and the insulating center member 33.

The electrode members 22 and 23 are formed, as is the elastic conductive tube 21, of a conductive elastic material, such as conductive rubber, and are positioned at a distance by the insulating center member 33. While hollow portions 35 and 36 are respectively formed in the electrode members 22 and 23 to provide elasticity. With this arrangement, external pressure can easily bend the insertion member 24. In the example in FIGS. 1 and 2, the electrode members 22 and 23 are divided by the hollow portions 35 and 36 into upper electrode members 22*a* and 23*a* and lower electrode members 22*b* and 23*b*. However, these upper electrode members 22*a* and 23*a* may be connected around the hollow portions 35 and 36 to the lower electrode members 22*b* and 23*b*.

Figure 8:
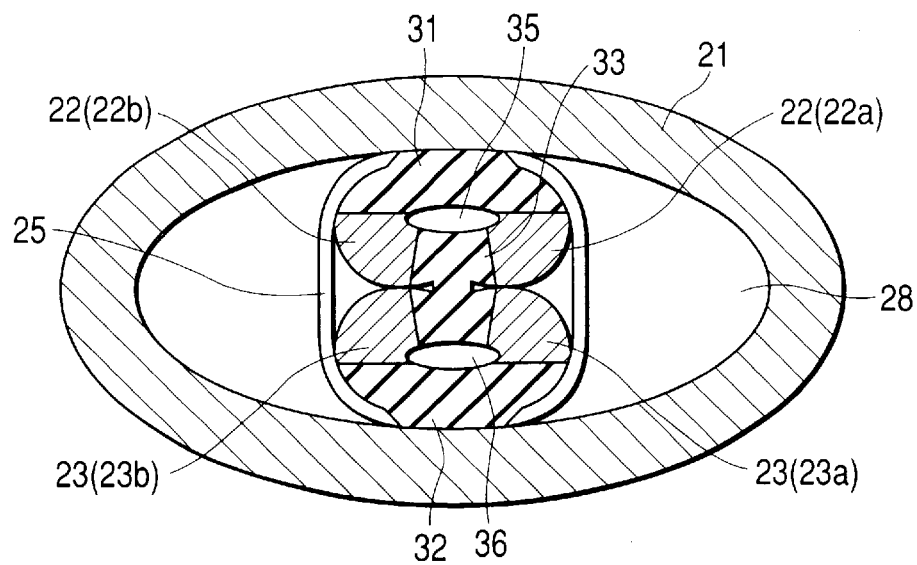
FIG. 8 is a cross-sectional view of the load sensor when a load is applied.

As is shown in FIG. 2, the height (thickness) H1 of the insulating center member 33 in the vertical direction (in the direction of the thickness of the insertion member 24) is set so it is less than the height (outer diameter: thickness) H2 of each electrode member 22 and 23. Therefore, in cross section the insulating center member 33 is recessed at the insertion member 24. Therefore, when a load is imposed across the width of the insertion member 24, the electrode members 22 and 23 directly contact each other, as is shown in FIG. 8, which will be referred to later.

An insulating, thermal shrinkage tubes, which are shrunk by heat, are employed for the envelope members 25. As is shown in FIGS. 1 to 4, the envelope members 25 are securely fitted around the outer wall of the insertion member 24 at predetermined intervals D in the longitudinal direction. To secure the envelope members 25, they are fitted at fixed positions along the insertion member 24 and are heat shrunk so they squeeze the insertion member 24 tightly. When the envelope members 25 have been mounted around the outer wall of the insertion member 24, together with the insertion member 24 they are inserted into the elastic conductive tube 21, while maintaining a distance between the insertion member 24 and the elastic conductive tube 21 so that the electrode members 22 and 23 do not inadvertently contact the elastic conductive tube 21. In this embodiment, at least one of the interval D, separating the envelope members 25, the thickness T1 (see FIG. 1), and the width W, in the longitudinal direction of the insertion member 24, of an envelope member 25 is set in accordance with the magnitude of the load to be detected by the load sensor 10, as will be described later.

Figure 5:
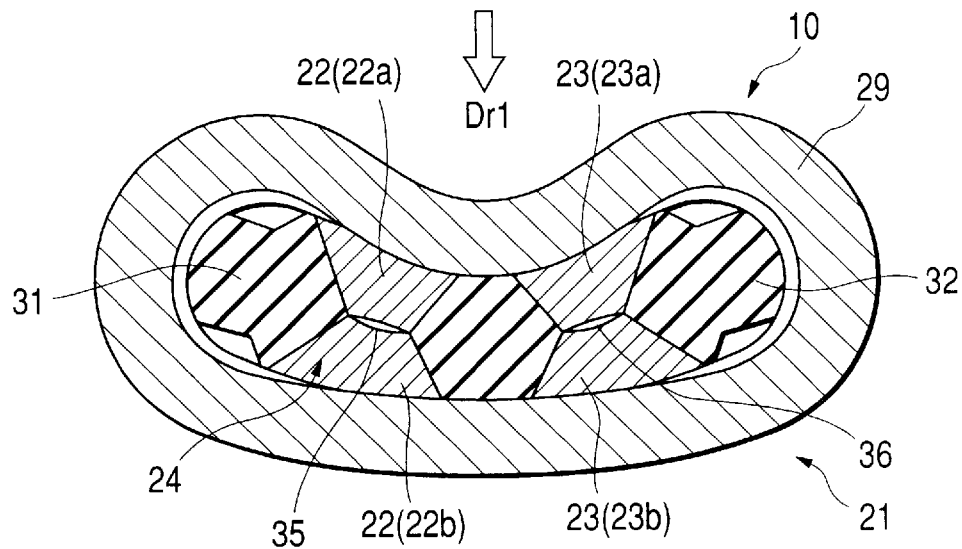
FIG. 5 is a cross-sectional view of the load sensor when a load is applied.

When a load is imposed on this arrangement from above, the direction of thickness of the insertion member 24 in FIGS. 1 and 2 (direction Dr1 indicated by an arrow in FIG. 5), the elastic conductive tube 21 and the insertion member 24 are bent as shown in FIG. 5, and the first electrode member 22 (22*a* and 22*b*) and the second electrode member 23 (23*a* and 23*b*) contact the elastic conductive tube 21. Thus, the first and second electrode members 22 and 23 are electrically connected via the elastic conductive tube 21. And of course, when the elastic conductive tube 21 returns to its tubular, normal shape, the insertion member 24 returns to its original state.

The magnitude of the load (i.e., the sensitivity of the load sensor 10), which is required for bending and bringing the elastic conductive tube 21 into contact with the electrode members 22 and 23, is closely related to the interval D between envelope members 25, and the thickness T1 and the width of an envelope member 25. For example, as the interval D between envelope members 25 is increased, the length of the elastic conductive tube 21 between the envelope members 25 is extended, and a smaller pressing force is required to bend that portion in so it contacts the electrode members 22 and 23. Further, when the thickness T1 of envelope members 25 is increased, in the normal state the distance between the electrode members 22 and 23 and the elastic conductive tube 21 is extended, so that a greater pressing force is required to bend the elastic conductive tube 21 inward and bring it into contact with the electrode members 22 and 23. In addition, in a case wherein envelope members 25 are also pressed down and compressed when a load is applied and the elastic conductive tube 21 contacts the electrode members 22 and 23, as the envelope member 25 width W is increased, a stronger pressing force is required to press down and compress envelope members 25, making it is difficult for the elastic conductive tube 21 to contact the electrode members 22 and 23.

In this embodiment, therefore, the focus is on the sensitivity adjustment function for the envelope members 25, and a desired sensitivity for the load sensor 10 is set by adjusting, at least, one of the interval D between envelope members 25, the thickness T1 of the envelope member 25, and the width W thereof.

Figure 6:
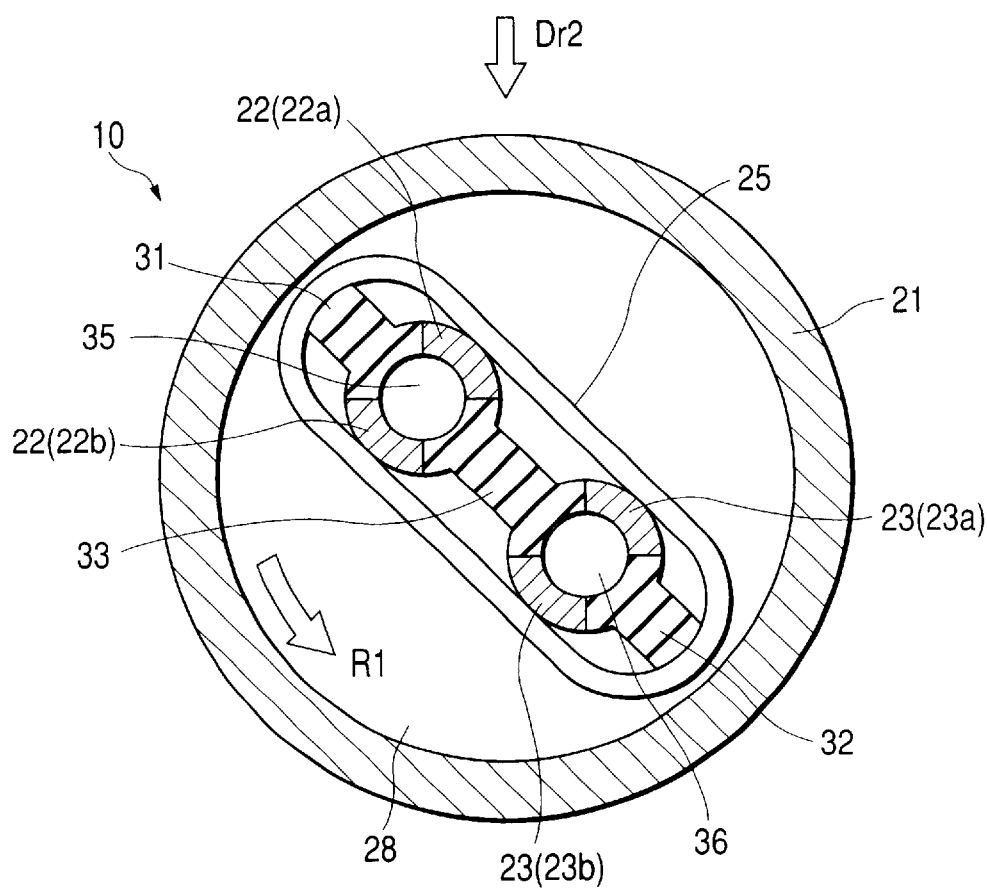
FIG. 6 is a cross-sectional view of the state wherein the insertion member within the elastic conductive tube is tilted.
Figure 7:
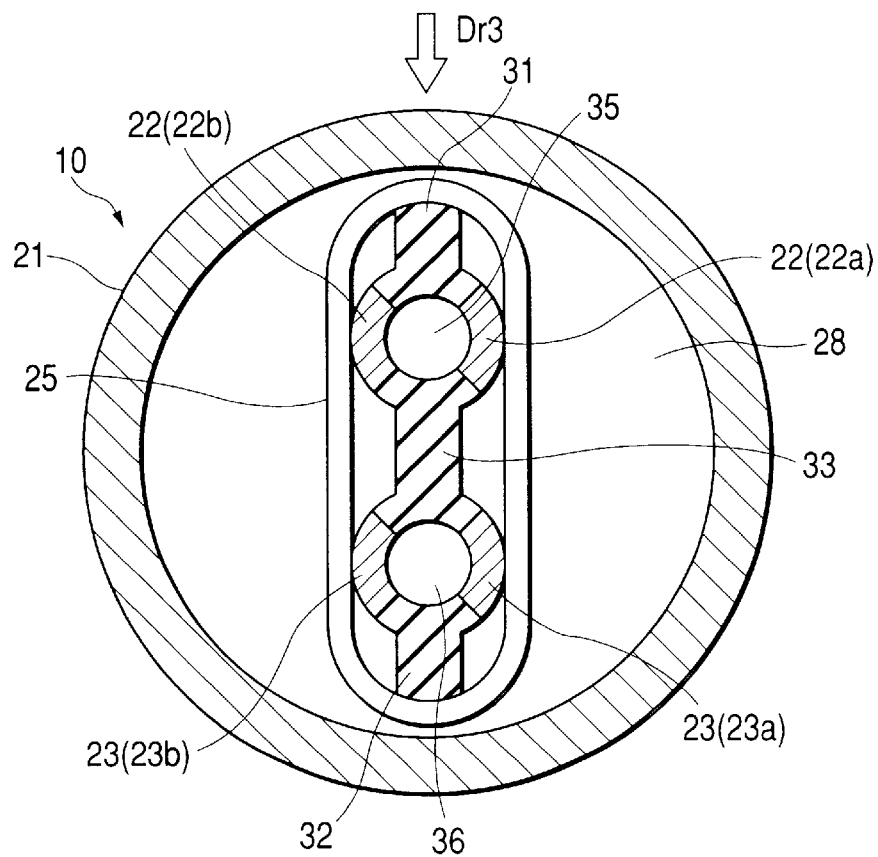
FIG. 7 is a cross-sectional view of the state wherein the insertion member within the elastic conductive tube has been rotated 90 degrees.

The insertion member 24 may be rotated in the elastic conductive tube 21. For example, as is shown in FIG. 6, when the insertion member 24 is obliquely positioned from upper left to lower right in the hollow portion 28 of the elastic conductive tube 21, and a pressing force is exerted from above the elastic conductive tube 21 (direction Dr2, indicated by an arrow in FIG. 6), the insertion member 24 is easily rotated in direction R1 (counterclockwise), as indicated by an arrow in FIG. 6. Until finally, the insertion member 24 is set as is shown in FIG. 5, with the first and second electrode members 22 and 23 electrically connected via the elastic conductive tube 21. However, as is shown in FIG. 7, when the insertion member 24 is rotated exactly 90 degrees in the hollow portion 28 of the elastic conductive tube 21, so that the insulating side members 31 and 32 and the insulating center member 33 are aligned vertically, if a pressing force is exerted from above (direction Dr3, indicated by an arrow in FIG. 7) in the widthwise direction of the elastic conductive tube 21, the insertion member 24 may not be rotated either clockwise or counterclockwise. In this case, as is shown in FIG. 8, the insertion member 24 is depressed vertically, as are the hollow portions 35 and 36, which are sandwiched between the insulating side members 31 and 32 and the insulating center member 33. Accordingly, the electrode members 22 and 23 are curved, so that the first upper electrode 22a directly contacts the second upper electrode 23a, and the first lower electrode 22b directly contacts the second lower electrode 23b. As a result, the first and second electrode members 22 and 23 are electrically connected.

Figure 9:
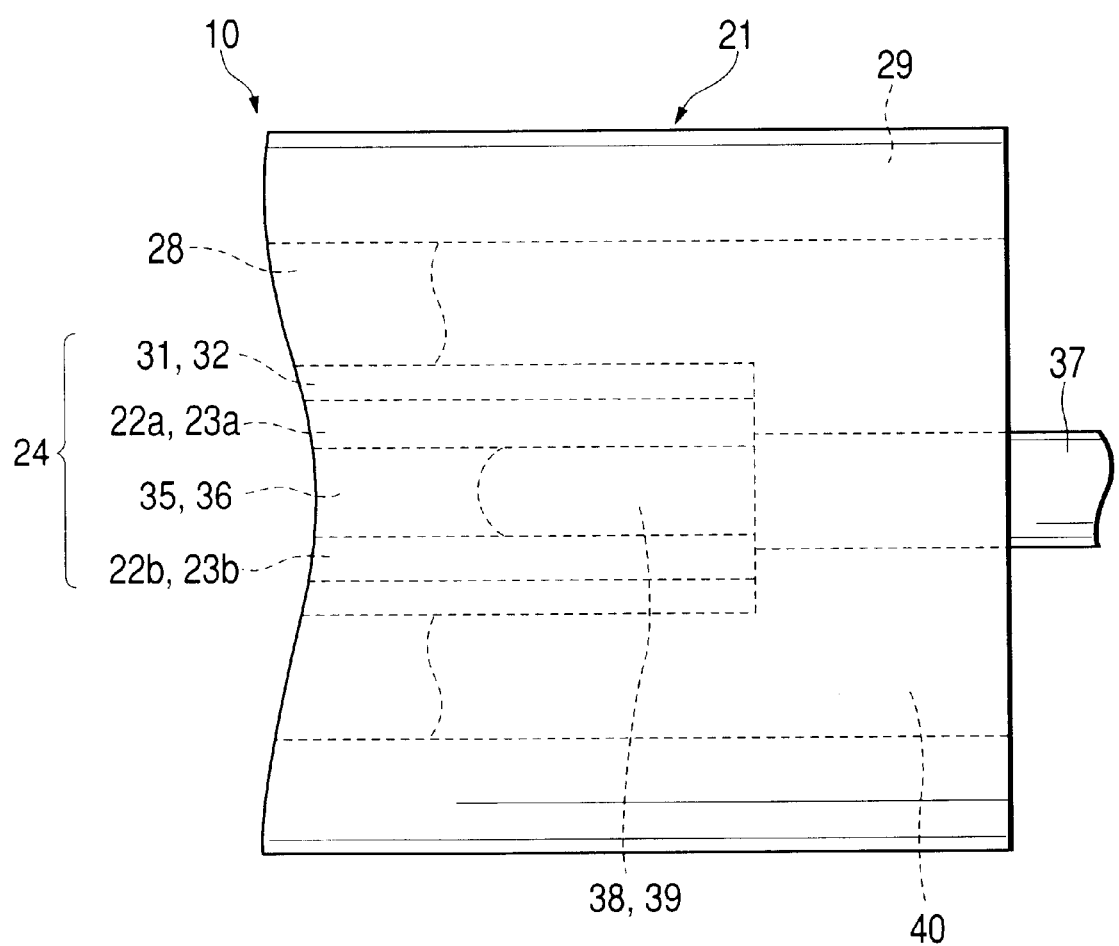
FIG. 9 is a side view of the end of the load sensor.

At one end of the insertion member 24, as is shown in FIG. 9, connectors 38 and 39, attached to a double-core lead line 37 for an external connection, are inserted into the hollow portions 35 and 36 of the insertion member 24. That is, the connector 38 is connected to the first electrode member 22 (22a and 22b), and the connector 39 is connected to the second electrode member 23 (23a and 23b), and the lead line 37 is extended therefrom to an external, predetermined detection circuit 41 (see FIG. 10). It should be noted that reference numeral 40 in FIG. 9 denotes a waterproof sealing member (shielding means), but this may be not provided when waterproofing is not particularly required.

Figure 10:
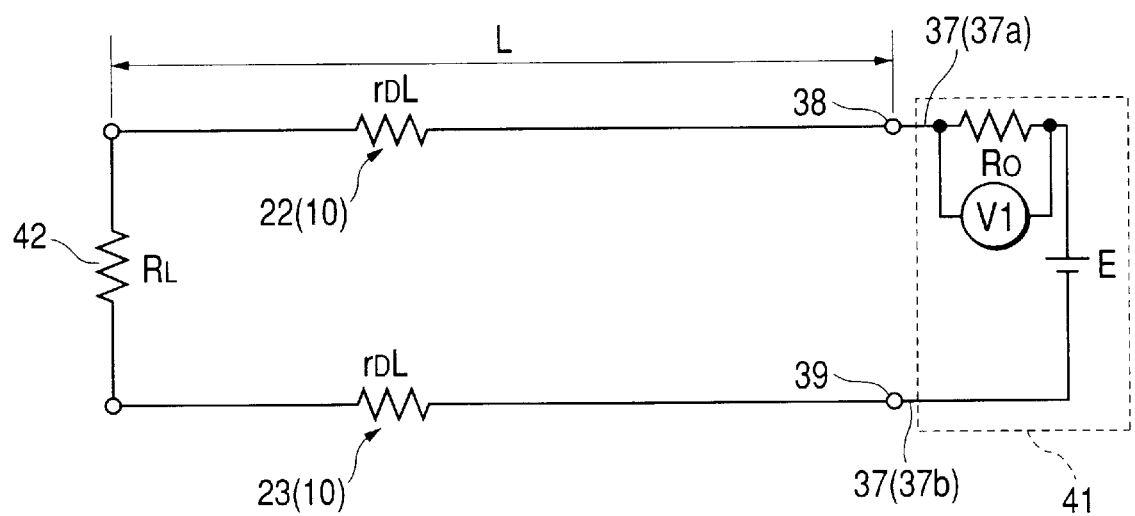
FIG. 10 is a circuit diagram showing the load sensor when no load is applied.

At the other end of the insertion member 24, as is shown in FIG. 10, an end terminal resistor 42 having a predetermined resistance $R_L$ is disposed so as to electrically connect the other ends of the electrode members 22 and 23. The end terminal resistor 42 has a failure detection function for the disconnection of a conductive path constituted by the electrode members 22 and 23.

FIG. 10 is an equivalent circuit diagram showing the connection between the electrode members 22 and 23, the detection circuit 41 and the end terminal resistor 42 when no load is applied. In FIG. 10, one end of the first electrode member 22 of the load sensor 10 is connected to the positive side of a power source E via the connector 38, the lead line 37a and a pull down resistor $R_0$, and one end of the second electrode member 23 is connected to the negative side of the power source E via the connector 39 and the lead line 37b. The other ends of the electrode members 22 and 23 are connected via the end terminal resistor 42. The detection circuit 41 detects divided voltages (V1 in FIG. 10 and V2 in FIGS. 12 an 13) that are applied to the pulldown resistor $R_0$. In this embodiment, normally the divided voltages applied to the pulldown resistor $R_0$ are detected; however, the intermediate voltage between the pulldown resistor $R_0$ and the connector 39 may be detected.

When no load is applied, as is shown in FIG. 1, the electrode members 22 and 23 of the insertion member 24 are separated, at a distance from each other, and are also separated from the elastic conductive tube 21 by the envelope members 25 that are fitted around the outer wall of the insertion member 24. Therefore, the circuit in this case that is constituted by the electrode members 22 and 23, the detection circuit 41 and the end terminal resistor 42 is as is shown in FIG. 10. Wherein L denotes the length of each electrode member 22 or 23 that constitutes a conductive path for the load sensor 10, $r_D$ denotes the resistance for the unit length of the conductive paths (electrodes 22 and 23) and $R_L$ denotes the resistance of the end terminal resistor 42, and the input resistance $R_1$, viewed from the detection circuit 41 that is constituted by the electrode members 22 and 23 and the end terminal resistor 42, is $$R1 = 2r_D L + R_L \qquad (1).$$

Therefore, the voltage level V1 detected by the detection circuit 41 is represented by the following expression (2).

$$V1 = R_0 E/(wr_D L + R_{L+R0}) \qquad (2)$$

where it is assumed that $$R_L > r_D L \qquad (3)$$

$$R_0 < R_L \qquad (4)$$

are established.

Figure 11:
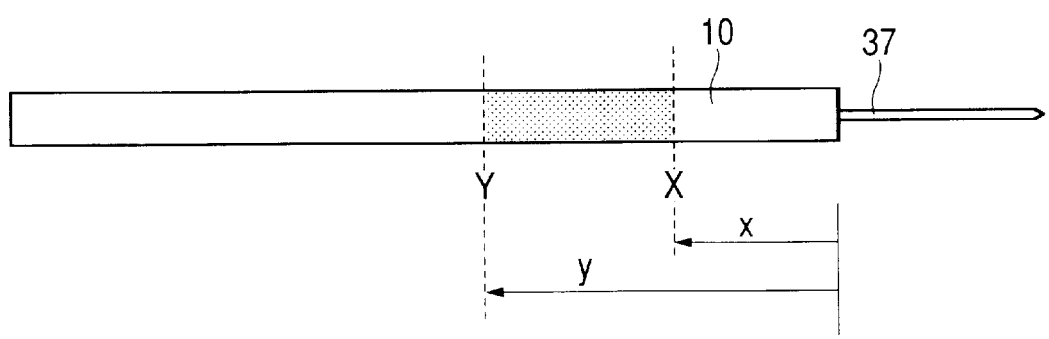
FIG. 11 is a side view of the load sensor.
Figure 12:
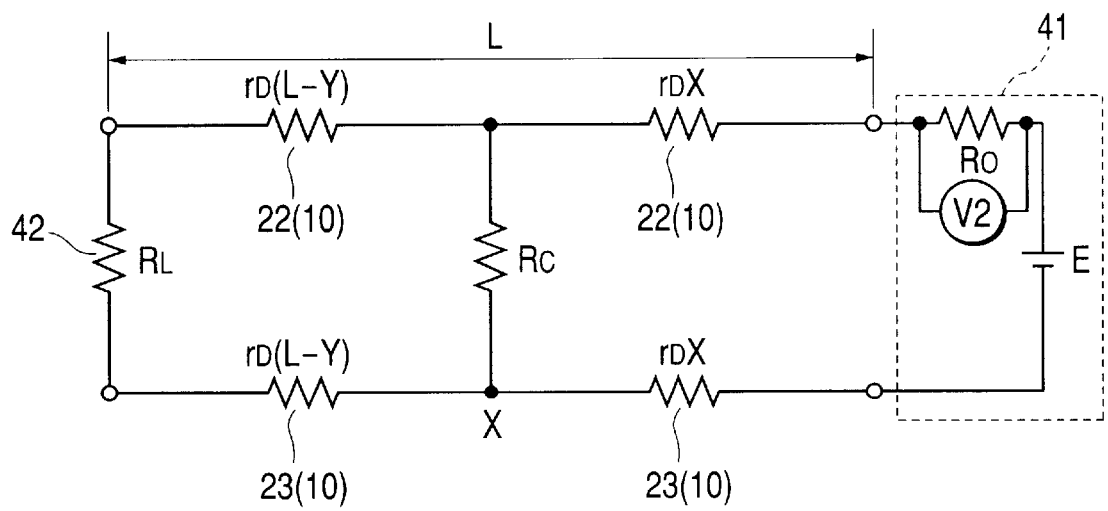
FIG. 12 is a circuit diagram showing the load sensor when a load has been applied and both electrode members are connected to the elastic conductive tube.

When, as is shown in FIG. 11, the load is applied to the area (a dotted portion in FIG. 11) between points X and Y in the load sensor 10, as is shown in FIG. 5, the elastic conductive tube 21 is bent in this area and contacts the first and second electrode members 22 and 23. When the resistance of the elastic conductive tube 21 in this case is defined as $R_0$, and the distance from the end of the load sensor 10 in FIG. 11 to the point X is defined as x, the circuit constituted by the electrode members 22 and 23, the detection circuit 41 and the end terminal resistor 42 is as is shown in FIG. 12, and the input resistance R2, viewed from the detection circuit 41, is substantially $$R2 = 2r_D x + R_D \qquad (5),$$

where it is assumed that $$R_L >> R_D \qquad (6)$$

is established, and the resistance of the end terminal resistor 42 is approximated as being infinite (disconnection).

From expression (5), the voltage V2 output to the detection circuit 41 is obtained as $$V2 = R_0 E/(2r_D x + R_D + R_0) \qquad (7).$$

Since the distance x from the end of the load sensor 10 in FIG. 11 to the point X is variously changed from 0 to L as the point whereat the load is applied is changed, the output voltage is changed from $$V2 = R_0 E/(R_D + R_0) \qquad (8)$$

to $$V2 = R_0 E/(2r_D L + R_D + R_0) \qquad (9).$$

Since expressions (7) to (9), unlike expression (2), do not include the element $R_L$, and since $R_L$ is much greater than $R_D$, as in expression (6), a large output change is obtained between V1 (expression (2)) and V2 (expressions (7) to (9)). Therefore, the load application can be quickly detected.

Figure 13:
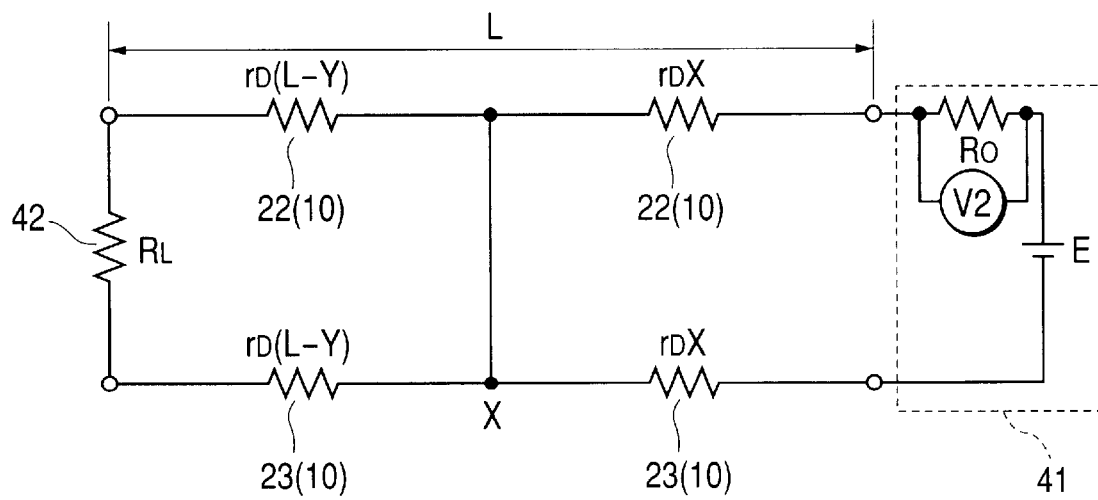
FIG. 13 is a circuit diagram showing a load sensor upon the application of a load when electrode members are directly connected and no elastic conductive tube is supplied.

When the load sensor 10 is set to the state in FIG. 8, the electrode members 22 and 23 are connected directly without the elastic conductive tube 21 being involved. The equivalent circuit in this case is as shown in FIG. 13. Since the current flows through the circuit without passing through the elastic conductive tube 21, the resistance $R_D$ is substantially equal to zero, and the voltage V2 output to the detection circuit 41 is substantially represented by expression (10) as a special solution of expression (7).

$$V2=R_0E/(2r_Dx+R_0) \tag{10}$$

A large output change, as in expression (7), is obtained for V1 (expression (2)), and the load application can be quickly detected.

The end terminal resistor 42 ($R_L$), which connects the terminal ends of the two conductive paths that are constituted by the electrode members 22 and 23, provides a failure detection function for the disconnection of the conducive path. When upon the application of a predetermined voltage a voltage drop is detected at the terminal end resistor 42, whether the conductive paths are rendered on can be easily detected, even without the application of a load, and especially when the paths are not conductive, the occurrence of a disconnection can be easily detected. Since a conductive elastic material is used for the conductive paths, the reliability of the disconnection detection function is extremely high. When the failure detection function for the disconnection is not necessary, the terminal end resistor 42 can be removed.

When the load is removed from the load sensor 10, it is returned to the original state shown in FIG. 1 by the recovery forces of the elastic conductive tube 21 and the insertion member 24, and the conductive paths are easily rendered off.

Therefore, the detection circuit 41 monitors the state of the voltage value V2, and can determine whether a load has been applied and whether the electrode members 22 and 23 are disconnected.

Figure 14:
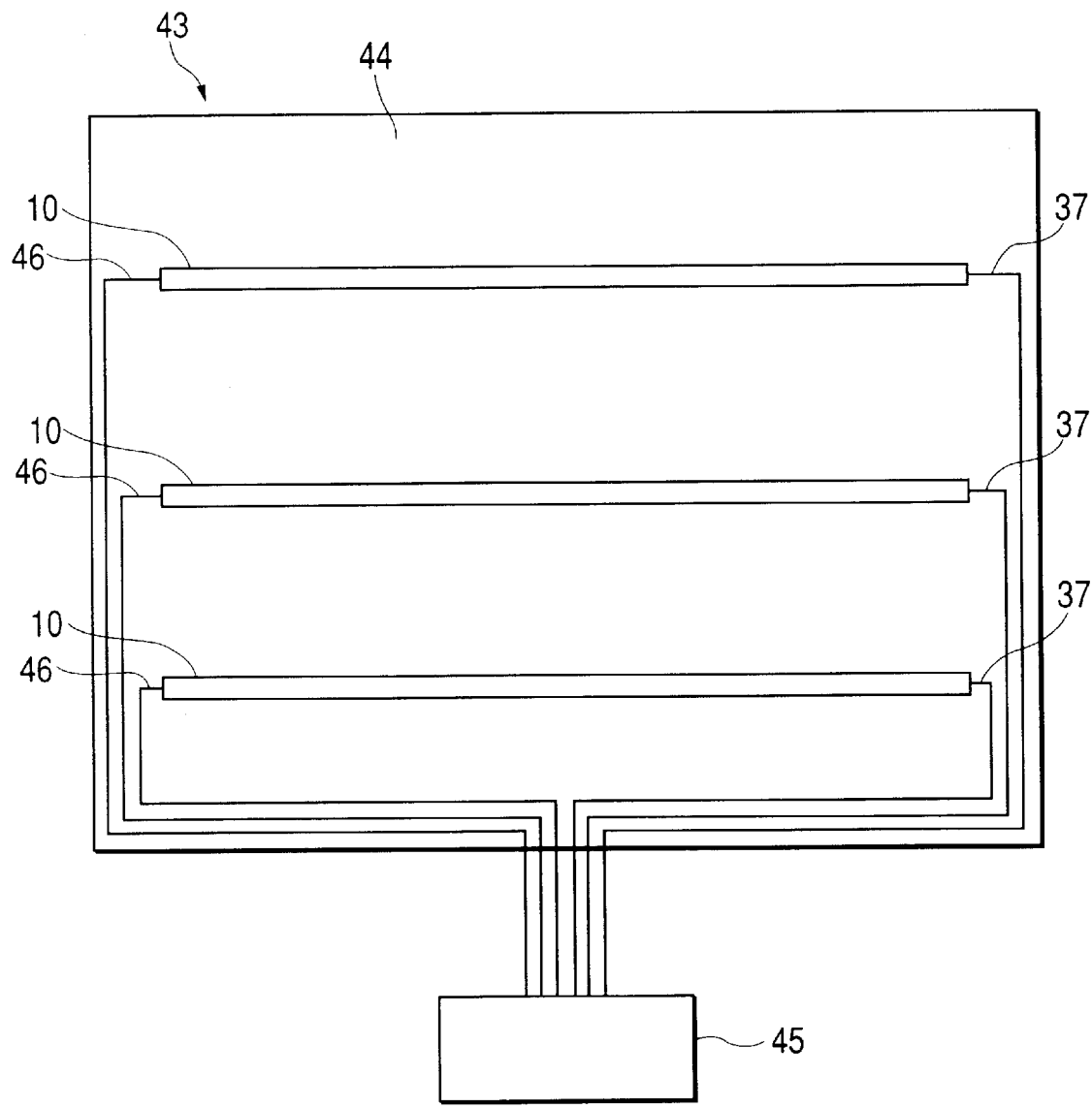
FIG. 14 is a plan view of a load detection sheet for which the load sensor in FIG. 1 is applied.

An example wherein the load sensor 10 of this embodiment is applied will now be described while referring to FIG. 14. FIG. 14 is a plan view of a load detection sheet 43 for which the load sensor 10 of this embodiment is employed. The load detection sheet 43 includes multiple load sensors 10, a sheet member (base member) 44, which is an elastic member whereon the load sensors 10 are arranged on a plane (in this case, in parallel at intervals), and a detector 45, which includes the detection circuit 41. In this example, the load sensors are arranged on the sheet member 44; they may, however, be embedded in the sheet member 44. Further, although here load sensors 10 are arranged on a plane, a single curved, U-shaped load sensor 10 may be arranged on a plane.

The load sensors 10 and the detector 45 are connected by the lead lines 37 and 46. The lead lines 37 are used to connect the electrode members 22 and 23 of the load sensors 10 to the detection circuit 41 (provided in the detector 45). The end terminal resistors 42 of the load sensors 10 are also provided in the detector 45. The lead lines 46 are used to connect the ends of the electrode members 22 and 23 to the terminal end resistors 42 in the detector 45. Thus the lead lines 46, as well as the lead lines 37, are connected to the electrode members 22 and 23. It should be noted that in order to detect the load applied state of the load sensor 10 by detecting the conductive state between the electrode members 22 and 23 and the elastic conductive tube 21, lead lines must be provided that connect both ends of the elastic conductive tube 21 of each load sensor 10 to the detector 45.

Further, multiple detection circuits 41 may be provided in the detector 45 and may be individually connected to the load sensors 10, or a single detection circuit 41 may be provided and the electrode members 22 and 23 of the load sensors 10 may be connected in parallel to the detection circuit 41.

When a load is applied to one of the load sensors 10, the detector 45 detects the connection of the electrode members 22 and 23 of the pertinent sensor 10, and in this manner detects that the load has been applied.

As is described above, according to the embodiment, the application of a load can be detected by determining whether the first and the second electrode members 22 and 23 are connected electrically. As a result, it is possible to provide a load sensor having a comparatively simple and inexpensive configuration and a circuit structure that can easily and accurately detect a load.

The envelope members 25 are fitted around the insertion member 24 at the predetermined intervals D in the longitudinal direction, and the envelope members 25, together with the insertion member 24, are inserted into the elastic conductive tube 21 while maintaining a gap between the insertion member 24 and the elastic conductive tube 21. Therefore, the sensitivity of the load sensor 10 can be easily controlled by adjusting, at least, one of the thickness T1 of the envelope member 25, the width W thereof, and the interval D between the envelope members 25.

Furthermore, since an envelope member 25 is ring-shaped, when mounting the envelope members 25 on the insertion member 24 they need only be fitted around the insertion member 24, and the mounting positions of the envelope members 25 can be easily adjusted merely by sliding them in the longitudinal direction.

Further, since the envelope members 25 are thermally shrinking tubes, the envelope members 25 that are fitted around the insertion member 24 need merely be heated so that they shrink and squeeze the insertion member 24 tightly and are securely fixed to the insertion member 24. Thus, the envelope members 25 can be easily secured.

In addition, since not only the insulating members 31 to 33 that constitute the insertion member 24, but also the electrode members 22 and 23 are formed of an elastic material, the insertion member 24 can be bent comparatively easily, and as a result, the load sensor 10 can be arranged in a curved state. Therefore, the degree of freedom afforded for the shape of the arrangement of the load sensor 10 is improved.

Since the electrode members 22 and 23 have the hollow portions 35 and 36 that pass through in the longitudinal direction, the electrode members 22 and 23 can flexibly cope with the bending of the load sensor 10, and can be easily connected to the lead lines 37 merely by inserting the terminals 38 and 39 of the lead line 37 into the hollow portions 35 and 36.

Moreover, since the inner space of the elastic conductive tube 21 is shielded from the outside by the sealing member 40, the entry into the elastic conductive tube 21 of foreign objects, such as dust or liquids, can be prevented.

Second Embodiment

Figure 15:
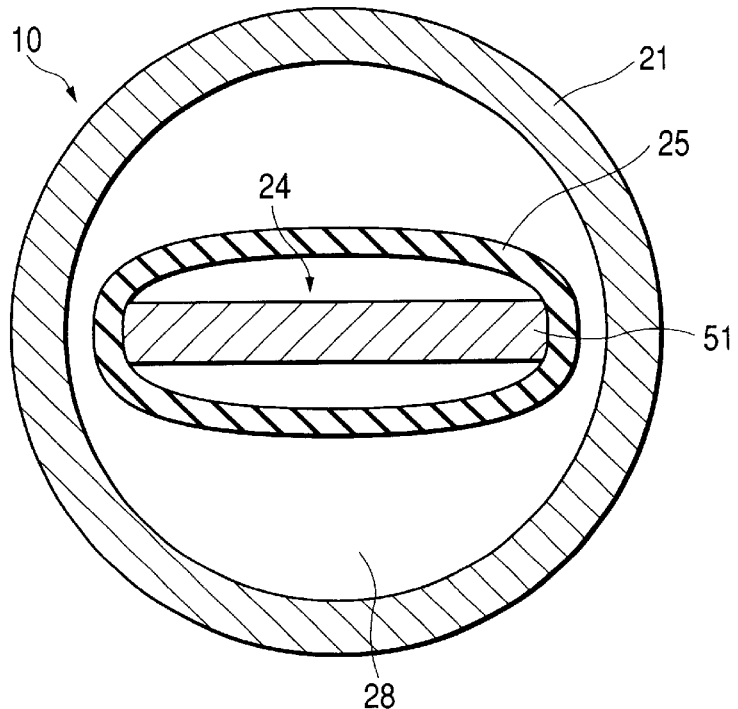
FIG. 15 is an axially orthogonal cross-sectional view of a load sensor according to a second embodiment of the present invention.

FIG. 15 is an orthogonal cross-sectional view of a load sensor 10 according to a second embodiment of the present invention. The same reference numerals as are used for the load sensor 10 in the first embodiment are also used to denote corresponding portions of the load sensor 10 in the second embodiment.

The load sensor 10 in the second embodiment differs greatly from the load sensor 10 in the first embodiment in that an electrode member 51 having either a positive or negative polarity is provided for an insertion member 24, and in that an elastic conductive tube 21 functions as an electrode member having the other polarity.

In this embodiment, the electrode member 51, which is an elongated plate made of an elastic conductive material such as conductive rubber, serves as the insertion member 24. In this embodiment, in order to provide flexibility, a flexible metal conductor is employed for the electrode member 51; however, an elongated conductive metal plate may also be used for the electrode member 51. In this invention, the metal conductor includes a conductor of a metal, such as copper, having a low resistance, a conductor of a metal, such as a dichromic alloy, having a high resistance, or a twisted metal line composed of multiple metal lines having a low resistance or a comparatively high resistance.

The structures of the elastic conductive tube 21 and the envelope members 25 are the same as those used for the first embodiment. In this embodiment, the envelope members 25 are formed as thermally shrinking tubes, and together with the insertion member 24 are inserted into the elastic conductive tube 21 after the envelope members 25 are fitted to the outer wall of the insertion member 24 (electrode member 51) at predetermined distances D in the longitudinal direction. Thus, in the normal state wherein no load is applied, as is shown in FIG. 15, the electrode member 51 is separated from the elastic conductive tube 21 by the envelope members 25.

The lead line for signal extraction is connected to the ends of the electrode member 51 and the elastic conductive tube 21, and the elastic conductive tube 21 is pressed down and bent by the application of a load. When the electrode member 51 contacts the elastic conductive tube 21, the electrical connection of these two is detected by the lead line, and the application of the load is thus detected.

Like the load sensor 10 of the first embodiment, both ends of the elastic conductive tube 21 are sealed by a sealing member 40.

Therefore, the same effect can be obtained in this embodiment as in the first, in that the sensitivity of the load sensor 10 can be easily controlled by adjusting, at least, one of the thickness T1 of the envelope member 25, the width W thereof, and the interval D between envelope members 25.

The sensitivity of the load sensor 10 can also be easily controlled by altering, at least, one of the thickness T1 of the envelope member 25, the width W thereof, the interval D between envelope members 25, the distance between the electrode member 51 and the elastic conductive tube 21, the thickness of the elastic conductive tube 21, and the outer diameter of the elastic conductive tube 21.

Further, since the electrode member 51 is made of a flexible material, such as an elastic conductive material (in this case a flexible conductive material is used), the electrode member 51 can be flexibly bent with the elastic conductive tube 21. As a result, a load sensor 10 can be provided that can be bent and shaped in accordance with various arrangements, and that is strong enough not to break when it is bent.

Furthermore, since the insertion member 24 is constituted by the electrode member 51, when the elastic conductive tube 21 is bent by a load applied from any direction, the electrode member 51 can accurately eclectically contact the elastic conductive tube 21, and a load applied from any direction can be detected correctly. Further, substantially without having to ascertain the direction around the axis in which the electrode member 51 is facing, the assembly and the arrangement of the load sensor 10 can be easily performed.

When the electrode member 51 is formed of a material having a low resistance, such as a metal line, the resistance of the electrode member 51 can be reduced, and the electrode member 51 can serve as a low noise conductive path. As a result, the detection circuit can overall have a digital circuit structure.

Modifications of the First and Second Embodiments

Figure 16:
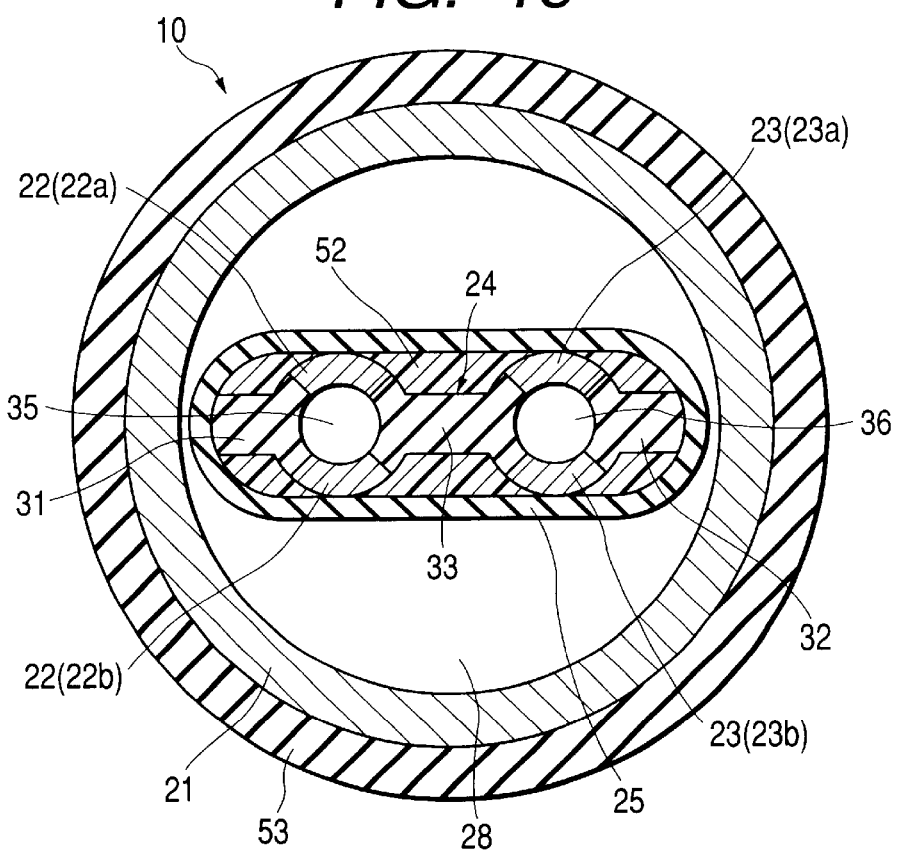
FIG. 16 is a diagram showing a modification for the load sensor according to the first embodiment.

A modification of the load sensor 10 in the first embodiment is shown in FIG. 16. In this modification, the envelope members 25 are ring members (may be thermally shrinking tubes) made of an insulating material, and are fixed to the insertion member 24 by an adhesive 52. Because of the adhesive 52, the envelope members 25 can be more easily and securely fixed.

Further, in this modification, an exterior elastic tube 53 is provided to cover the outside of the elastic conductive tube 21. The conductive elastic tube 21 is protected by the exterior tube 53, and since the elasticity of the elastic conductive tube 21 is reinforced by the exterior tube 53, the function of the elastic conductive tube for recovering to the normal state when the pressing force is released is improved. Thus, when the pressing force is released, the electrode members 22 and 23 and the elastic conductive tube 21 is precisely disconnected.

The technique of this modification may be employed for the load sensor 10 for the second embodiment.

Figure 17:
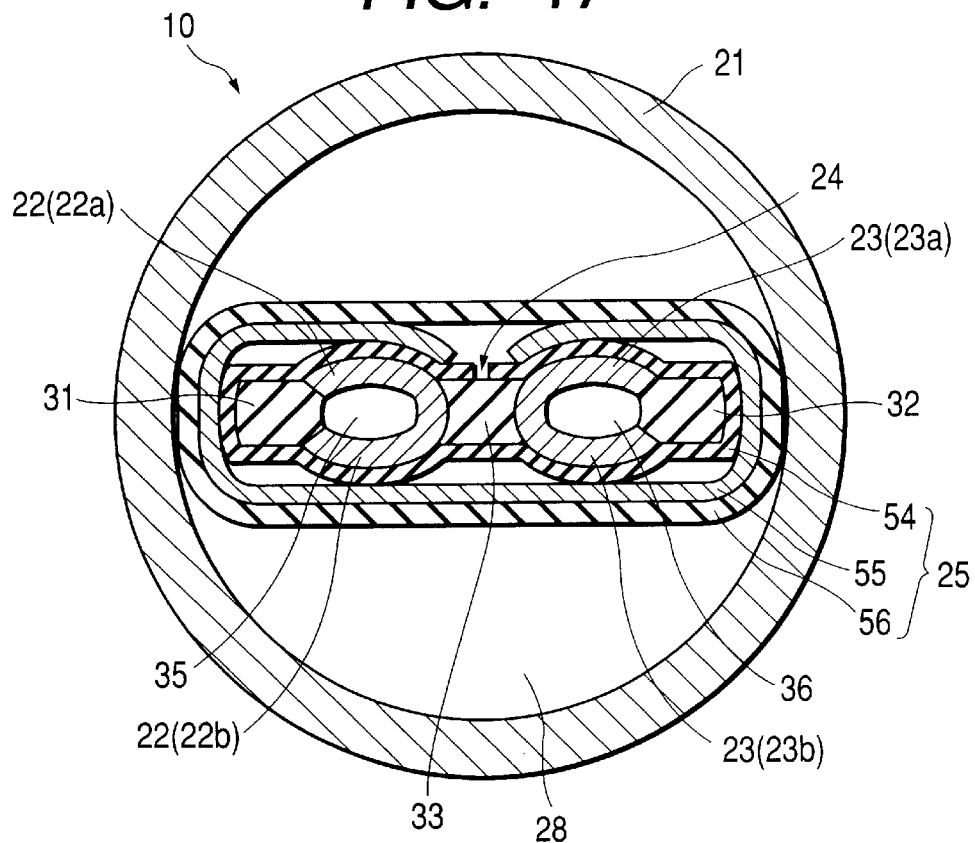
FIG. 17 is a diagram showing a modification for the load sensor according to the first embodiment.

A modification of the load sensor 10 in the first embodiment is shown in FIG. 17. In this modification, the envelope member 25 includes: an insulating member 54, which is shaped like a sheet and is located at a location on the outer wall of the insertion member 24 whereat the envelope member 25 is arranged; a metal fixing member 55, which is fitted (securely attached) around the outer wall of the insertion member 24 via the insulating member 54; and a coating insulating member 56 (a thermally shrinking tube or a viscous insulating tape may be employed), which is fixed to the outer wall of the metal fixing member 55 and covers the metal fixing member 55. Therefore, the envelope member 25 can be securely fixed to the insertion member 24 by the metal fixing member 55. In this modification, the upper electrode members 22a and 23a of the electrode members 22 and 23 are respectively connected to the lower electrode members 22b and 23b at the outer walls of the hollow portions 35 and 36 adjacent to the insulating center member 33.

The technique for this modification may be employed for the load sensor 10 for the second embodiment. It should be noted, however, that in this case the insulating member 54 may be removed.

Figure 18:
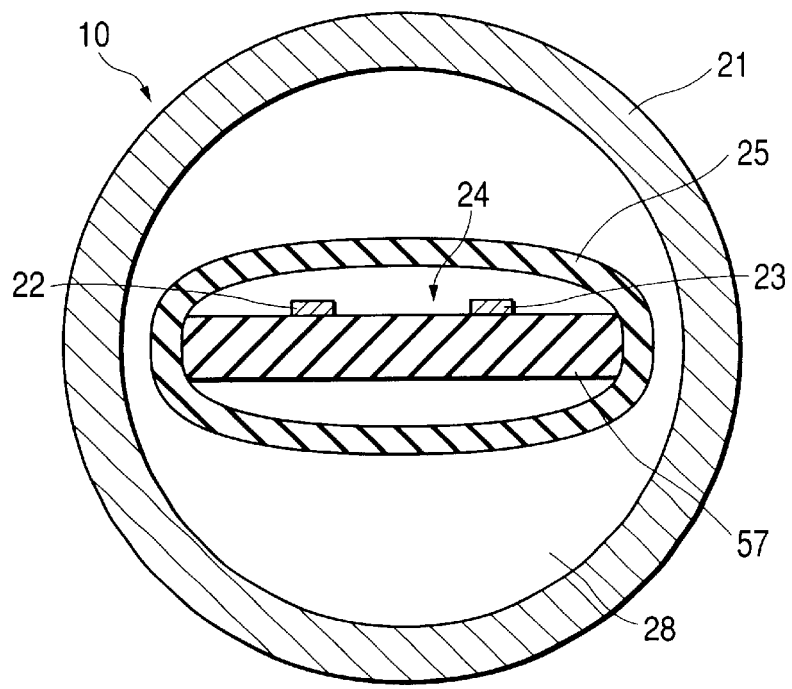
FIG. 18 is a diagram showing a modification for the load sensor according to the first embodiment.

A modification of the load sensor 10 for the first embodiment is shown in FIG. 18. In this modification, the insertion member 24 includes: an elongated base plate 57, made of an insulating material; and a first electrode member 22 and a second electrode member 23, which are arranged on the base plate 57 at an interval in the longitudinal direction. The base plate 57 need not always be elastic; however, in order to obtain flexibility, an elastic material is preferable. Further, although the electrode members 22 and 23 may be formed of conductive metal, in order to provide flexibility, an elastic conductive material, such as conductive rubber, is preferable.

Figure 19:
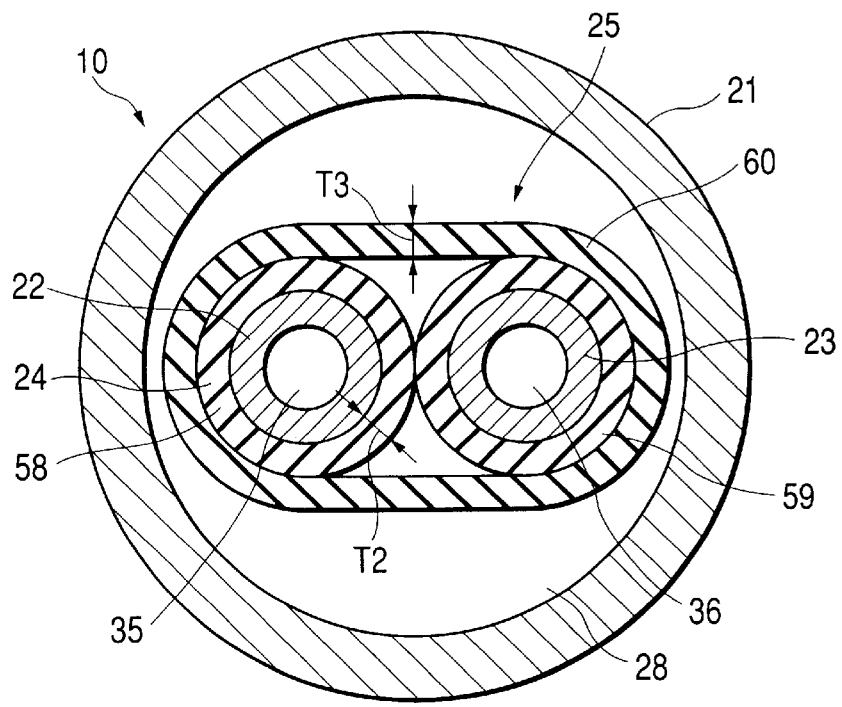
FIG. 19 is a diagram showing a modification for the load sensor according to the first embodiment.
Figure 20:
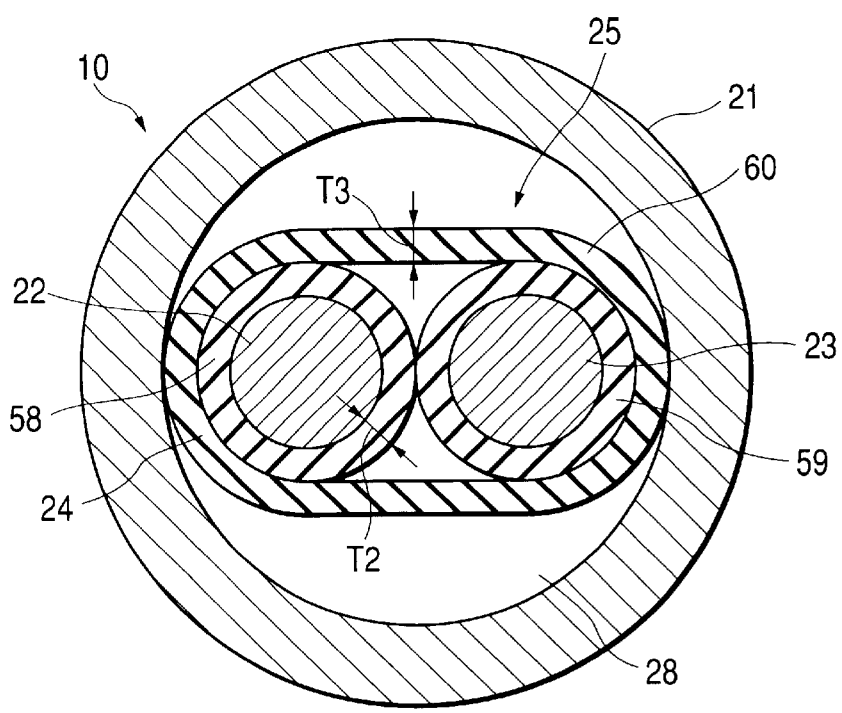
FIG. 20 is a diagram showing a modification for the load sensor according to the first embodiment.

Modifications shown in FIGS. 19 and 20 are for the load sensor 10 according to the first embodiment. In these modifications, the insertion member 24 is constituted by elongated first and second electrode members 22 and 23 that are arranged in parallel. The envelope member 25 includes: insulating members 58 and 59, which have a ring shape and which cover the portions of the outer wall of the envelope members 22 and 23 where the envelope members 25 are located; and a ring member (preferably, may be insulating) 60, which is securely fitted around the insulating members 58 and 59 over the outer walls of the electrode members 22 and 23. Under a condition wherein no load is applied, the insulating members 58 and 59 hold the electrode members 22 and 23 separate at an interval in the elastic conductive tube 21.

In the structure shown in FIG. 19, the electrode members 22 and 23 have a cylindrical hollow shape through which the hollow portions 35 and 36 pass in the longitudinal direction. In the structure shown in FIG. 20, the electrode members 22 and 23 have a solid cylindrical shape without the hollow portions 35 and 36. Furthermore, the electrode members 22 and 23 are formed of an elastic conductive material, such as conductive rubber; however, in the structure in FIG. 20, the electrode members 22 and 23 may be formed of metal conductors.

In the thus arranged modifications, when, at least, one of the interval D between envelope members 25, the thickness T2 of the insulating members 58 and 59, the width W thereof, and the thickness T3 of the ring member 50 is adjusted, when by the application of a load the electrode members 22 and 23 contact the elastic conductive tube 21, the sensitivity can be easily controlled. Further, in these modifications, when either the interval D between envelope members 25 or the thickness T2 of the insulating members 58 and 59 is adjusted, when by application of a load the electrode members 22 and 23 directly contact each other, the sensitivity can also be easily controlled.

Figure 21:
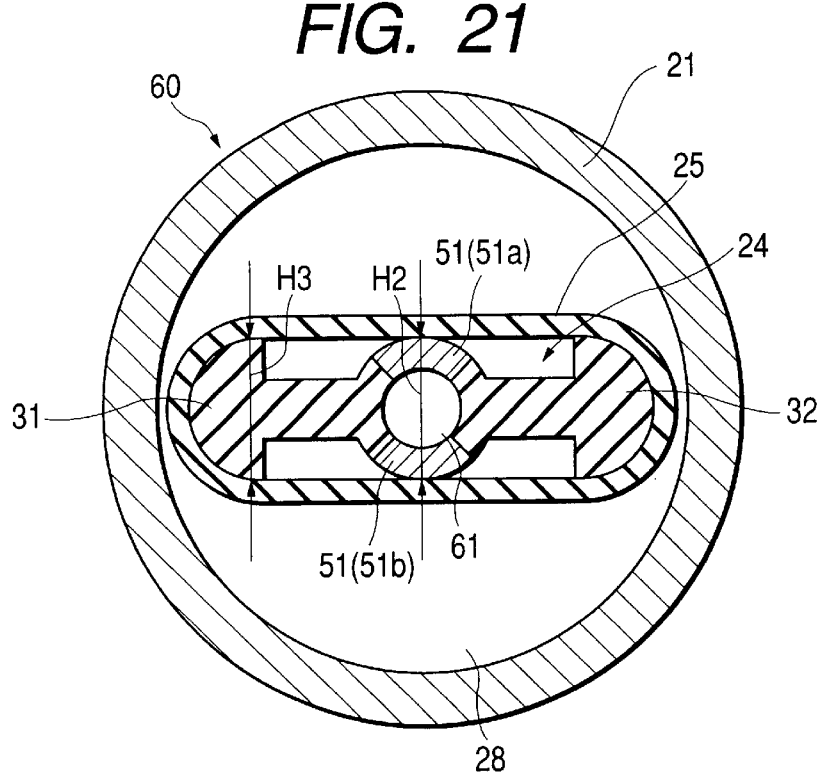
FIG. 21 is a diagram showing a modification for the load sensor according to the second embodiment.

A modification shown in FIG. 21 is for the load sensor 10 according to the second embodiment. In this modification, the insertion member 24 is so constituted that electrode member 51 (51a and 51b), which is made of an elastic conductive material such as conductive rubber and which has either a positive or a negative polarity, is provided in the center between the side insulating members 31 and 32. The electrode member 51 in FIG. 21 is formed of the upper electrode member 51a and the lower electrode member 51b having arced shapes in cross section. The upper and lower electrode members 51a and 51b face each other and define a hollow portion 1 between them to connect the side insulating members 31 and 32.

The outer ends of the side insulating members 31 and 32 are so set that the vertical height H3 is substantially equal to the vertical height H2 (thickness) of the electrode member 51. Thus, the squeezing force of the envelope members 25, which are, for example, thermally shrinking tubes, is applied at the outer end of the side insulating members 31 and 32 in order to prevent the electrode member 51 from being pressed down by the force.

Since the outer ends of the side insulating members 31 and 32 relative to the elastic conductive tube 21 have an arced shape that corresponds to the inner wall of the elastic conductive tube 21, the insertion member 24 can be smoothly rotated within the elastic conductive tube 21.

Figure 22:
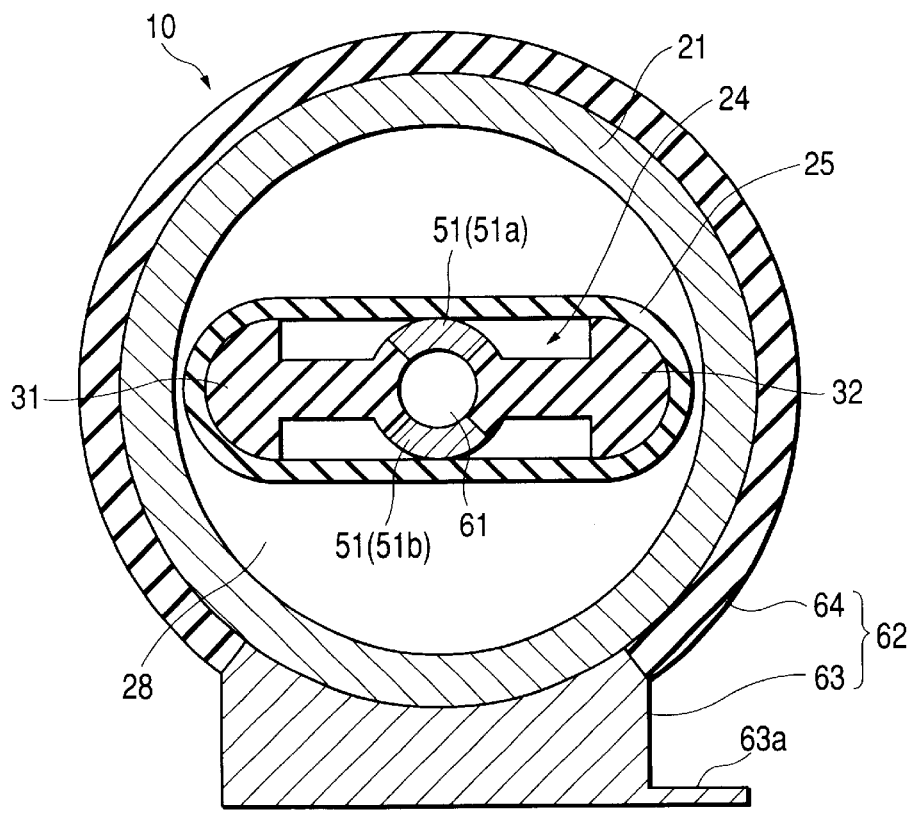
FIG. 22 is a diagram showing a modification for the load sensor according to the second embodiment.

In the modification in FIG. 22, based on the modification in FIG. 21, an elastic exterior tube 62, for enclosing the elastic conductive tube 21, is provided for the outer wall of the elastic conductive tube 21. One circumferential portion of the exterior tube 62 serves as a conductive portion 63 and is made of an elastic conductive material, such as conductive rubber, and the other portion is a non-conductive portion 63 made of an insulating elastic material. A raised portion 63a for lead line connection is projected from the conductive portion 63, and with this, the lead line can be connected by an easy method, such as connecting the raised portion 63a to a bonding terminal used for a lead line connection. The connected lead line is electrically connected to the elastic conductive tube 21 via the conductive portion 63.

Figure 23:
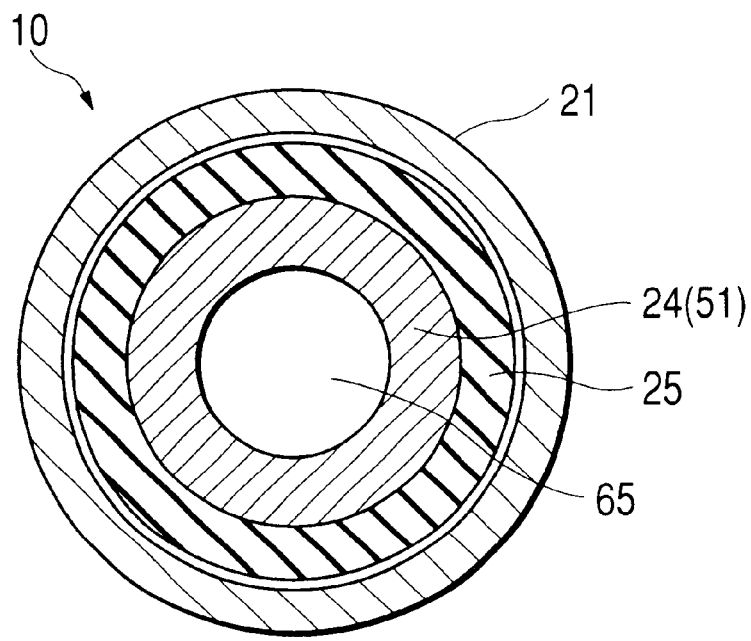
FIG. 23 is a diagram showing a modification for the load sensor according to the second embodiment.
Figure 24:
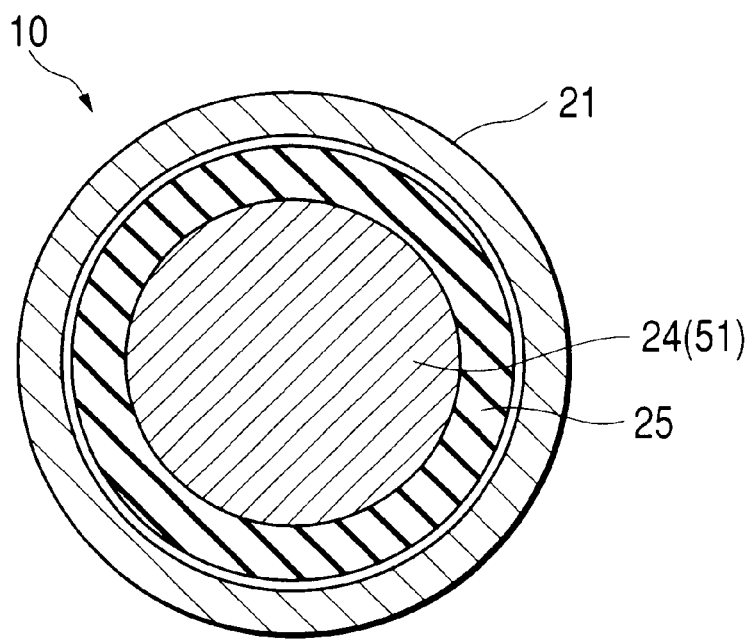
FIG. 24 is a diagram showing a modification for the load sensor according to the second embodiment.

Modifications shown in FIGS. 23 and 24 are for the load sensor 10 for the second embodiment. In the modifications, the insertion member 24 is constituted by the electrode member 51 having a cylindrical shape through which a hollow portion 65 passes in the longitudinal direction, or having a solid cylindrical shape with no hollow portion 65. The electrode member 51 is made of an elastic conductive material, such as conductive rubber. In the structure shown in FIG. 24, however, the electrode member 51 may be formed of a metal conductor or of a compound member composed of a metal conductor and an insulator, or may be made of a twisted metal line composed of multiple metal lines. It should be noted that it is preferable that a material be employed that can provide flexibility for the electrode member 51.

In these modifications, the envelope members 25 are closely attached to the outer wall of the electrode member 51, and a predetermined gap (a small gap in this case) is defined between the outer wall of the envelope member 25 and the inner wall of the elastic conductive tube 21. The envelope member 25 may be formed by molding a predetermined insulating resin on the outer wall of the electrode member 51.

Figure 25:
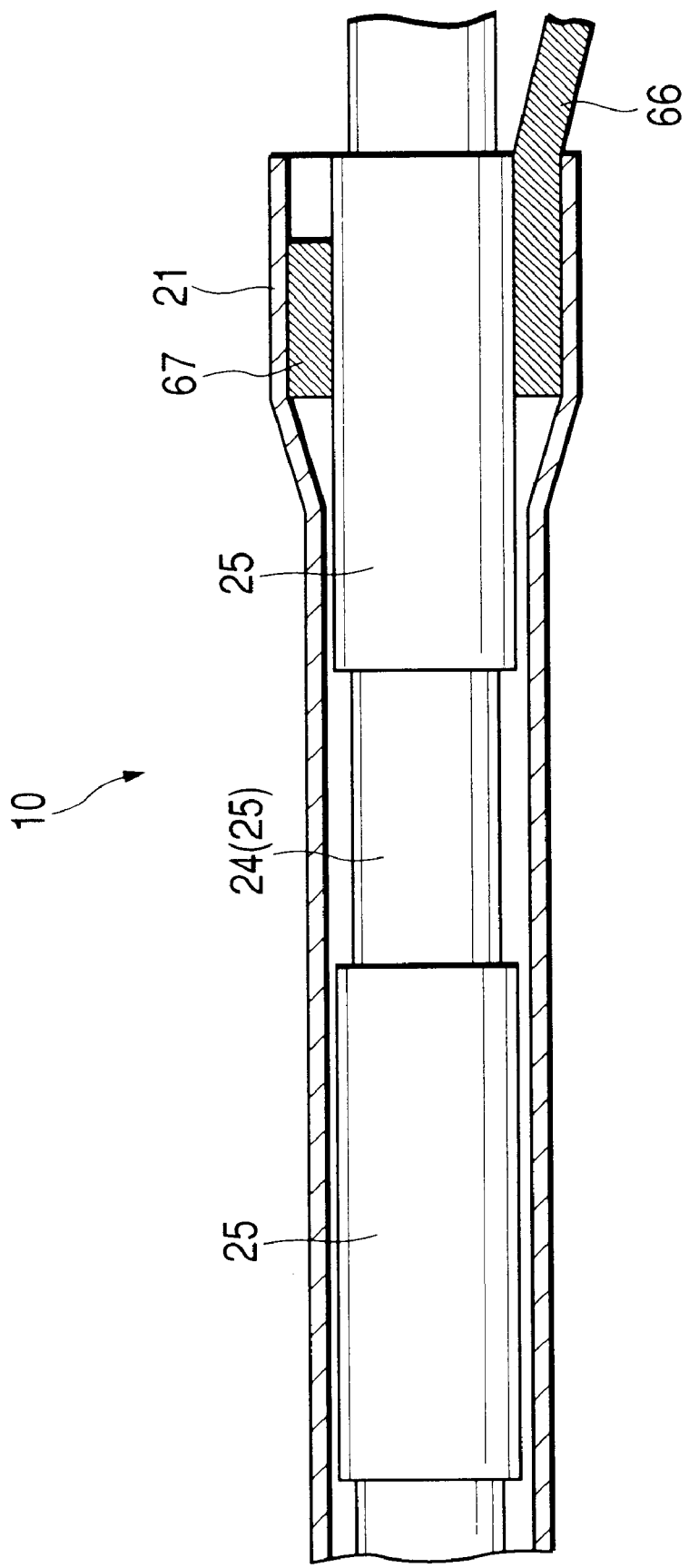
FIG. 25 is a diagram showing a modification for the load sensor according to the second embodiment.

In the modifications, the connection of the elastic conductive tube 21 and the lead line is performed as follows. As is shown in FIG. 25, while the conductor of a lead line 66 is wound around the outer wall of the envelope member 25 that is located at the longitudinal end of the insertion member 24, together with the insertion member 24 and the envelope member 25, a wound portion 67 of the conductor is inserted into the elastic conductive tube 21 and is securely sandwiched between the envelope member 25 and the elastic conductive tube 21. Thus, the lead line 66 is connected to the elastic conductive tube 21 and is securely held. In this manner, a simple operation can be used to perform the connection and the fixing of the lead line.

Figure 26:
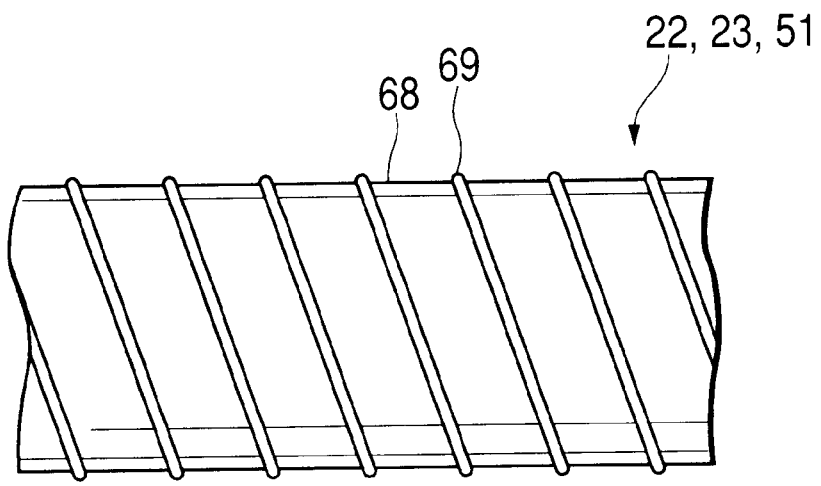
FIG. 26 is a diagram showing a modification for the load sensor according to the second embodiment.

A modification shown in FIG. 26 is designed so that in the modifications in FIGS. 19, 20, 23 and 24, the electrode members 22, 23 and 51 include an elastic member (insulator) 68 formed of a hollow cylinder or a solid cylinder, and a conductive line (metal conductor) 69 that is spirally wound around the outer wall of the elastic member 68.

Figure 27:
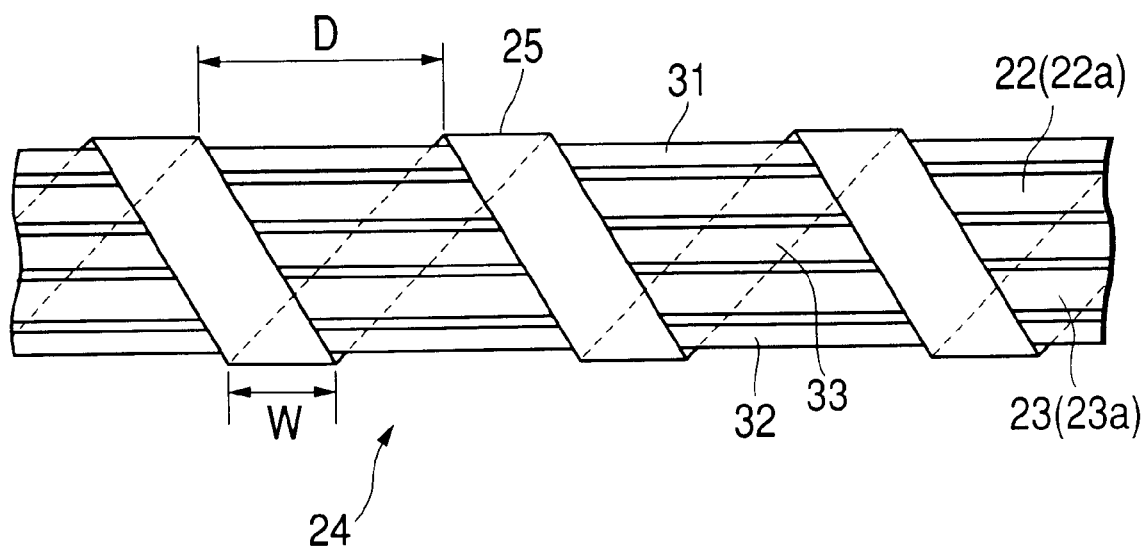
FIG. 27 is a diagram showing a modification for the load sensor according to the first embodiment.

A modification in FIG. 27 is for the load sensor 10 of the first embodiment. In this modification, the envelope member 25 is an insulating tape (e.g., a viscous insulating tape) that is continuously and spirally wound around the outer wall of the insertion member 24 at predetermined intervals D in the longitudinal direction. According to this arrangement, the insulating tape need only be continuously and spirally wound around the insertion member at predetermined intervals in the longitudinal direction, for the function of the envelope member 25 to be easily provided.

The technique relating to this modification may be applied for the load sensor 10 in the second embodiment.

Figure 28:
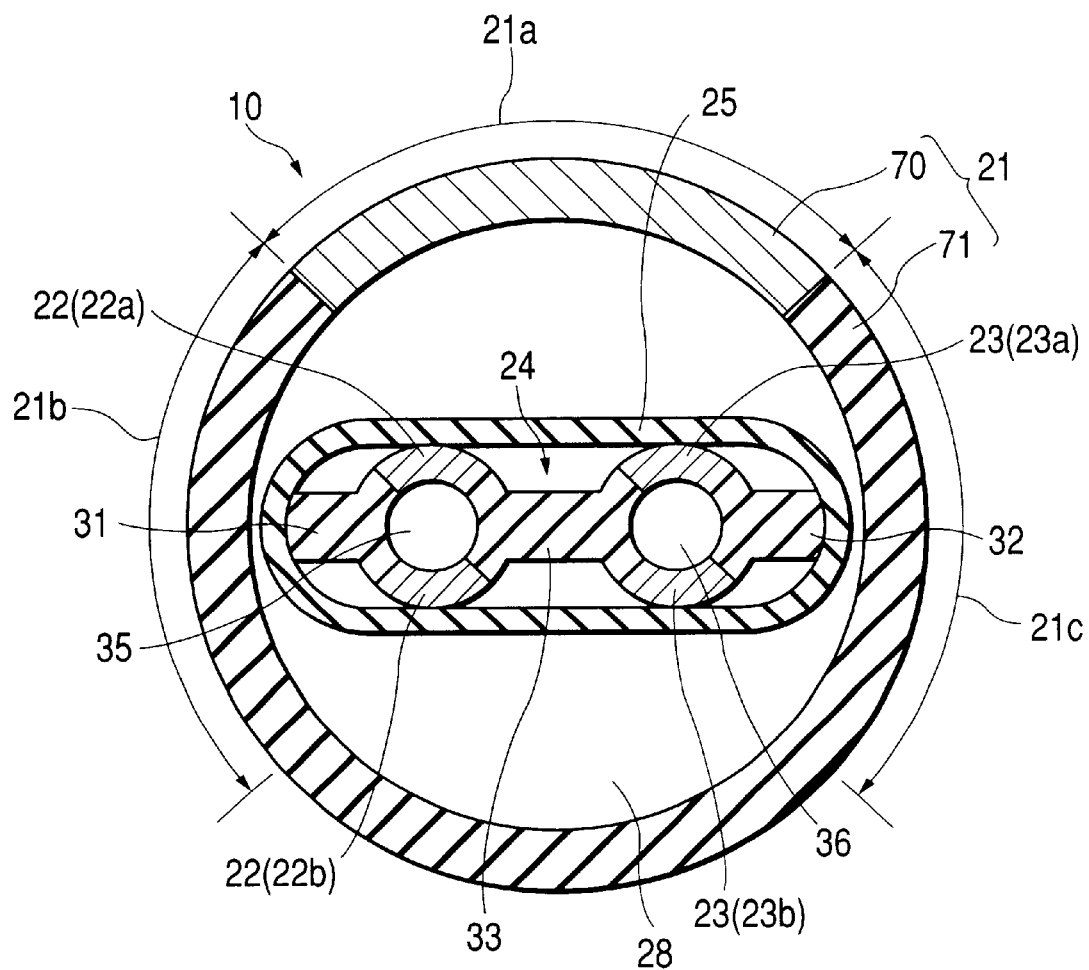
FIG. 28 is a diagram showing a modification for the load sensor according to the first embodiment.

A modification in FIG. 28 is for the load sensor 10 in the first embodiment. In this modification, one circumferential portion (an upper portion 21a in this case) of the elastic conductive tube 21 is defined as a conductive portion 70, and the other portion is defined as a non-conductive portion 71. Both the conductive portion 70 and the non-conductive portion 71 are integrally formed of elastic materials, with an elastic conductive material, such as conductive rubber, being employed for the conductive portion 70.

To cope with this formation, the insertion member 24 is substantially prevented from rotating in the elastic conductive tube 21, while the electrode members 22 and 23 face the conductive portion 70 of the elastic conductive tube 21, so that they can contact the conductive portion 70 while the elastic conductive tube 21 is being elastically bent.

The stiffness of the conductive portion 70, made, for example, of conductive rubber, tends to be increased due to an effect of its conductive content, so that the conducive portion 70 may be less flexible. However, since a non-conductive portion 71 that is satisfactorily flexible is used to form the elastic conductive tube 21, an adequate flexibility is obtained for the elastic conductive tube 21, and thus, even a small load can be accurately detected. In this modification, the elastic conductive tube 21 especially is acutely bent by the application of a load from above, and the left and right side portions 21b and 21c of the elastic conductive tube 21 for which flexibility is particularly required are the non-conductive portions 71 that can satisfactorily furnish the necessary flexibility. Thus, the elastic conductive tube 21 can be adequately bent, even by only a small load.

Figure 29:
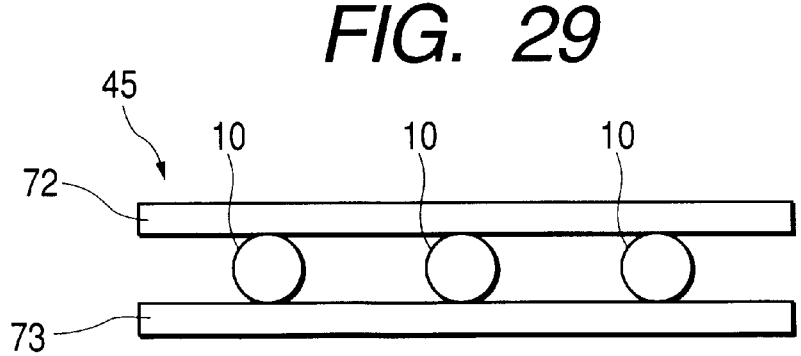
FIG. 29 is a diagram showing a modification of the load detection sheet in FIG. 14.

A modification in FIG. 29 is one for the load detection sheet 43 in FIG. 14, and includes multiple (three in this case) load sensors 10 that are arranged in parallel at predetermined intervals on a plane, and two substantially plate shaped flexible pressing members 72 and 73 that vertically sandwich the load sensors 10.

In the first embodiment, the detection circuit 41 is connected via the signal output lead lines 37 to one end of each of the electrode members 22 and 23, and the terminal end resistor 42 is connected to the other end. The detection circuit 41 may be connected to the end via the lead line 37 so that a load a load can be detected via both ends of each electrode member 22 or 23. Thus, even when a disconnection occurs along one connection path, such as the lead line 37, since load detection can be performed via the other connection path reliability is increased.

Similarly, in the second embodiment, the signal output lead line is connected to one end of each of the electrode member 51 and the elastic conductive tube 21, and load detection is performed via that end. The signal output lead line may also be connected to the other end so as to detect a load via that end.

Third Embodiment

Figure 30:
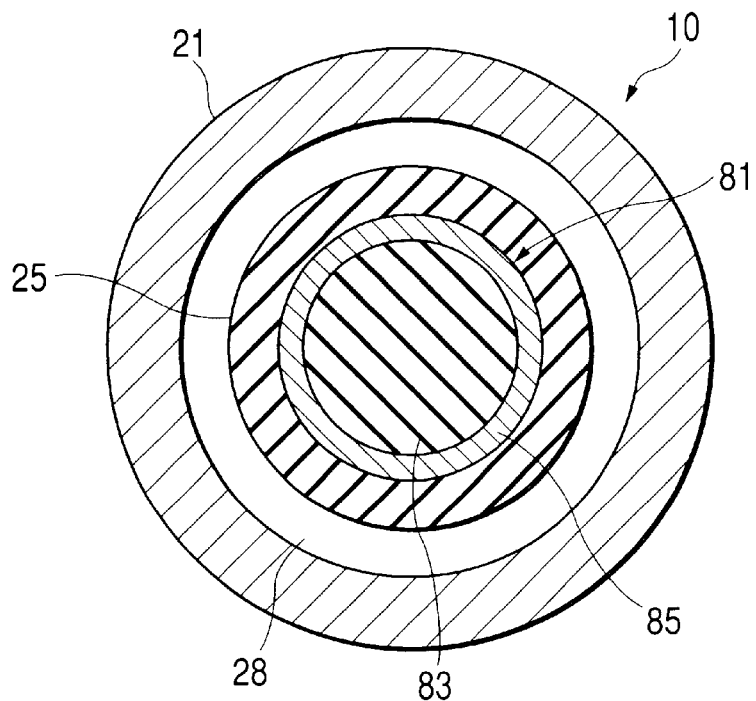
FIG. 30 is across-sectional view of a load sensor according to a third embodiment of the present invention.
Figure 31:
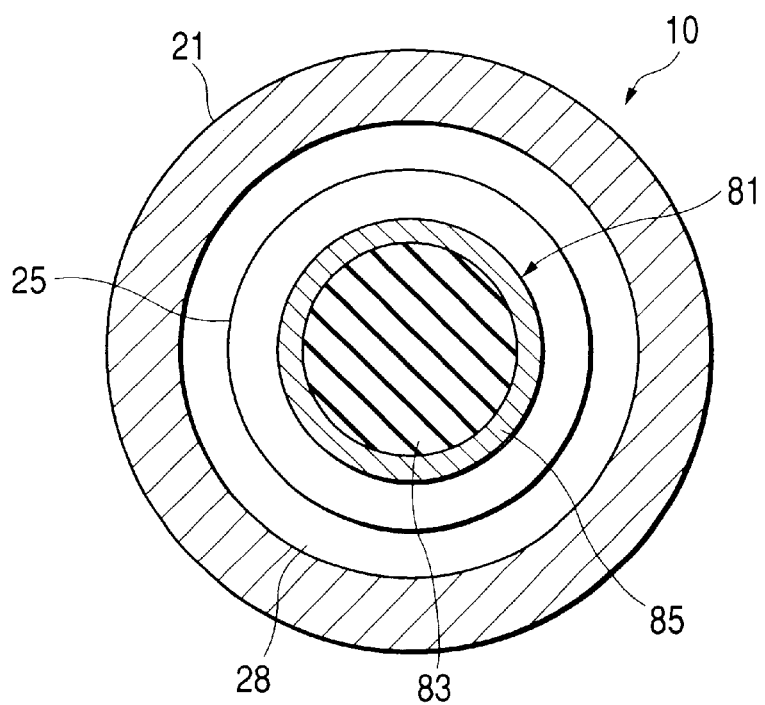
FIG. 31 is a cross-sectional view of a load sensor according to the third embodiment of the present invention.

FIGS. 30 and 31 are cross-sectional views, taken at different positions, of a load sensor 10 according to a third embodiment of the present invention. For the load sensor 10 in this embodiment, the structure shown in FIG. 26 will be described in more detail, and since the same reference numerals are used to denote components corresponding to those of the load sensor 10 in the first and second embodiments, no further explanation for them will be given.

Figure 32:
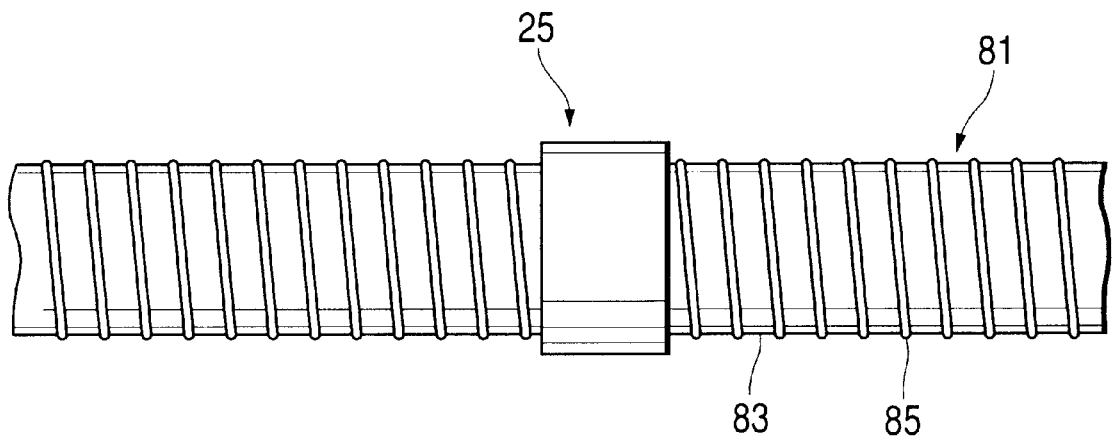
FIG. 32 is a plan view of the electrode member and the envelope member of the load sensor in FIG. 30.

In this embodiment, an electrode member 81 serves as an insertion member, and as is shown in FIGS. 30 to 32, the electrode member 81 includes an elongated flexible core member 83 and a metal line 85 that is wound coil-like around the outer wall of the core member 83. The electrode member 81 serves as an electrode having either a positive or a negative polarity, while an elastic conductive tube 21 serves as the electrode having the other polarity.

The core member 83 is an insulating member made of a resin, rubber or a fiber material, or a material compounded of several of these materials. In this embodiment, extrusion molding is used to deposit a coating of an elastic insulating material, such as a silicon rubber resin, a fluorocarbon resin or EPDM, on the center reinforcement line of a fiber, such as a carbon fiber.

Figure 33:
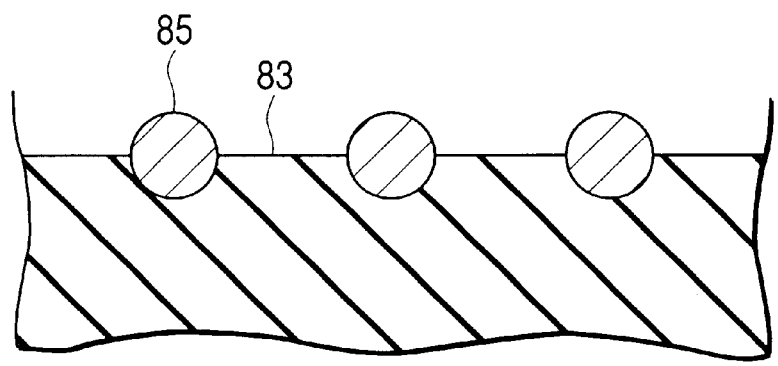
FIG. 33 is an enlarged cross-sectional view of the essential portion of the electrode member in FIG. 33.

An anticorrosive metal line, such as a dichromic line, a stainless steel line or a tin plated copper line, is used for the metal line 85, and as is shown in FIG. 33, the metal line 85 is wound around and embedded in the outer wall of the core member 83 (in this case, about half of the metal line 85, in cross section, is embedded). As a modification, a spiral groove may be formed in the outer wall of the core member 83 into which the metal line 85 is fitted when it is wound around the core member 83.

Further, in this embodiment an envelope member 25 made of a resin or rubber is integrally molded on the outer surface of an electrode member 81. As the shape of the arrangement, as is shown in FIG. 3, the ring-shaped envelope members 25 may be arranged at predetermined intervals in the longitudinal direction or as is shown in FIG. 27, a spirally formed envelope member 25 may be wound around the outer wall of the electrode member 81.

As is described above, the same effects as are provided by the second embodiment are provided by this embodiment. Further, since the coil-shaped metal line 81 is fully exposed on the outer wall of the electrode member 81, when the elastic conductive tube 21 is bent by the application of a load in any direction, the metal line 85 can correctly contact the elastic conductive tube 21, and loads applied from various directions can be accurately detected. In addition, the assembly and the arrangement of the load sensors can be easily performed without there being any need to ascertain the direction, around the axis, in which the electrode member 81 is facing.

Furthermore, the signal extraction lead line can be easily connected to the metal line 85 that is wound around the core member 83, and also there is little contact resistance when it is connected to the metal line 85.

Further, for the electrode member 81 of this embodiment, the metal line 85 is wound coil-like around the outer wall of the core member 83. Since the electrode member 81 made of a different material from the elastic conductive tube 21 contacts the elastic conductive tube 21 upon the application of a load, upon the release of the load, the electrode member 81 is easily separated from the elastic conductive tube 21, so that the reliability of the load sensor 10 is improved.

Since the core member 83 is made of an insulating material, merely by adjusting the outer diameter of the core member 83, the length of the area around which the metal line 85 is wound, which corresponds to the unit length of the electrode member 81, can be controlled, and the resistance per unit length of the electrode member 81 can be easily adjusted.

Further, since the metal line 85 is wound coil-like around the outer wall of the core member 83, when the coil of the metal line 85 is brought into contact with the elastic conductive tube 21 by application of a load, conductive points on the coil of the metal line 85 and the elastic conductive tube 21 are positioned exactly at the load application portion, so that these two can accurately be rendered conductive.

Since the metal line 85 is wound round and embedded in the outer wall of the core member 83, sliding of the metal line 85 along the outer wall of the core member can be prevented, and a stable wound state can be maintained for the metal line 85.

Further, since the core member 83 is made of an elastic material, the electrode member 81 bends more flexibly. As a result, it is possible to provide a strong load sensor 10 that is not destroyed and can be returned to its original shape even when the it is bent 180°, or is folded at random.

Furthermore, since an anticorrosive metal is used for the metal line 85, an anticorrosive and reliable load sensor can be provided.

In this embodiment, molding is used to integrally form the envelope member 25, made of resin or rubber, on the outer wall of the electrode member 81. Therefore, the inner wall of the envelope member 25 faces the electrode member 81 in which the coil of the metal line 85 is embedded, and the envelope member can be securely fixed to the outer wall of the electrode member 81. In addition, since the metal line 85 is pressed by the envelope member 25, the metal line 85 is prevented from being released from the core member 83.

Fourth Embodiment

Figure 34:
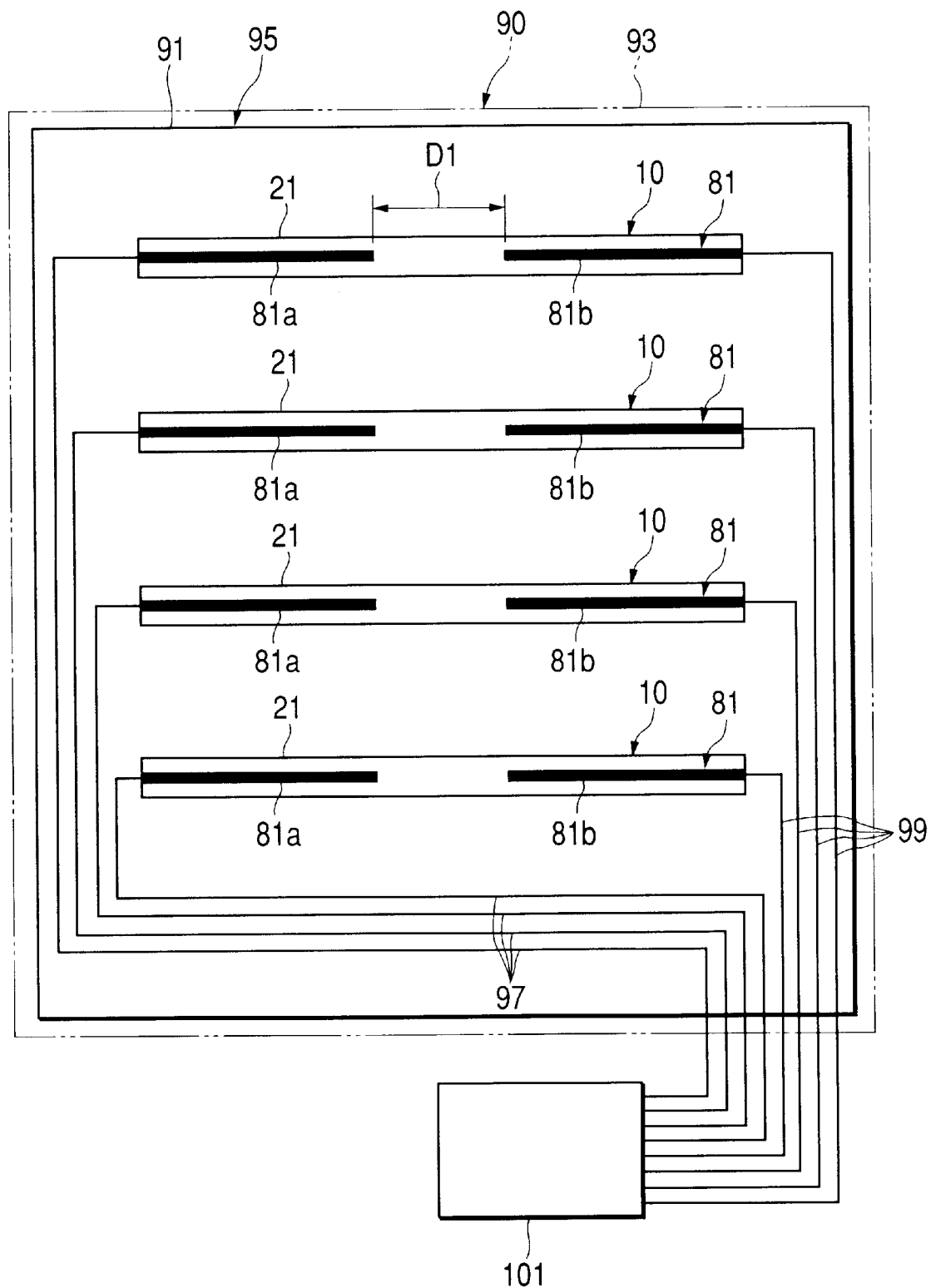
FIG. 34 is a specific plan view of the structure of a load sensor unit according to a fourth embodiment of the present invention.
Figure 35:
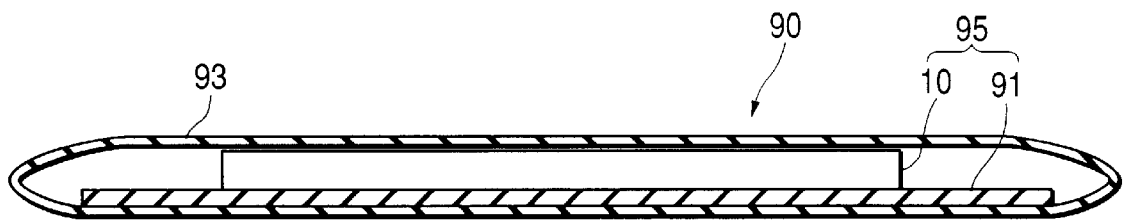
FIG. 35 is a cross-sectional view of the load sensor unit in FIG. 34.

FIG. 34 is a plan view of a specific structure for a load sensor unit 90 according to a fourth embodiment of the present invention. FIG. 35 is a cross-sectional view of the load sensor unit 90 in FIG. 34. The only difference between the load sensor 10 used for the load sensor unit 90 of this embodiment that of the third embodiment is that an electrode member 81 is substantially divided into two segments. Thus, the same reference numerals are used to denote corresponding components, and no further explanation for them will be given.

As is shown in FIG. 34, in the load sensor 10 of this embodiment, the electrode member 81 to be inserted into an elastic conductive tube 21 is divided into two segments, 81a and 81b, at a specific longitudinal position (the center in this embodiment). The two segments 81a and 81b are separated by a predetermined interval D1 in the elastic conductive tube 21. In FIG. 34, while for convenience sake envelope members 25 are not shown, they are provided on the outer walls of the segments 81a and 81b. Or, for the load sensor 10 of the first and second embodiments and their modifications, the insertion member 24 may be divided into two segments at a predetermined position in the same manner as in this embodiment.

Preferably, the segments 81a and 81b be fixed to the elastic conductive tube 21 only at the outer ends of the elastic conductive tube 21.

The load sensor unit 90 in this embodiment includes a multiple (four in this embodiment) of the thus arranged load sensors 10, a sheet member (base member) 91 and a bag member 93.

The sheet member 91 is made of a flexible insulating material, and four load sensors 10 are arranged on its surface. In this case, the four load sensors 10 on the sheet member 91 are arranged in parallel at predetermined intervals. Together, the four load sensors 10 and the sheet member 91 constitute a sheet unit 95. As a modification of the embodiment, instead of this load sensor the load sensors in the first and second embodiments, and their modifications, may be employed to constitute the sheet unit 95.

Using bonding means, such as an adhesive or viscous tape, the load sensor 10 is partially bonded, at both its ends, to the sheet member 91, and as needed, at its portion whereat the envelope members 25 are arranged between the electrode member 81 and the elastic conductive tube 21.

The bag member 93 is a bag having a sheet shape that is formed of an insulating material that bends flexibly, and holds the sheet unit 95, which is inserted through a predetermined opening.

Further provided for the sheet member 91 are multiple lead lines 97 and lead lines 99 for signal extraction. One end of each lead line 97 or 99 is connected to outer side ends of the segments 81a and 81b that are positioned at the ends of the load sensor 10, and the other end is pulled out of the bag member 93 and connected to a detection circuit 101. Also provided for the sheet member 91, although not shown in FIG. 34, are multiple lead lines for connecting the individual ends of the elastic conductive tube 21 of each load sensor 10 to the detection circuit 101.

The detection circuit 101 detects, via the lead lines 97 and 99, the conductive state existing between the segments 81a and 81b of each load sensor 10 and the elastic conductive tube 21, so that conditions wherein loads are applied to the load sensor 10 can be detected by individual load sensors 10.

As is described above, according to the embodiment, in addition to the effects obtained by each embodiment, since the electrode member 81 of the load sensor 10 is divided into the two segments 81a and 81b, when upon application of a load the sheet member 95 is bent in the normal direction relative to the face, and a tension force is exerted on the electrode member 81, disconnection of the electrode member 81 (segments 81a and 81b) seldom occurs.

Further, there are many cases wherein the satisfactory load detection function of the load sensor 10 can be obtained even when the electrode member 81 is not continuously arranged along the entire elastic conductive tube 21. Thus, when two segments 81a and 81b are arranged at intervals D in an elastic conductive tube 21, within a range wherein load detection can be performed without fail, the material costs for the electrode member 81 can be reduced by an amount equivalent to the distance D1 between the segments 81a and 81b.

In addition, since multiple load sensors 10 are provided for the sheet member 91, these load sensors 10 and the sheet member 91 can be handled as a single unit, and the management and the attachment of parts can be easily performed.

Since the load sensor 10 is partially bonded, at both ends, to the sheet member 91, and as needed, at its portion whereat the envelope member 25 is located between the electrode member 81 and the elastic conducive tube 21, the load sensor 10 can be fixed to the sheet member 91 without deteriorating the load detection function of the load sensor 10.

Furthermore, since the sheet unit 95 that includes multiple load sensors 10 and the sheet member 91 is included in the bag member 93, the sheet unit 95 and the bag member 93 can be handled as a single unit, and the management and attachment of parts can be easily performed.

Further, since the sheet unit 95 is included in the bag member 93, the load sensor 10 is protected by the bag member 93.

Fifth Embodiment

Figure 36:
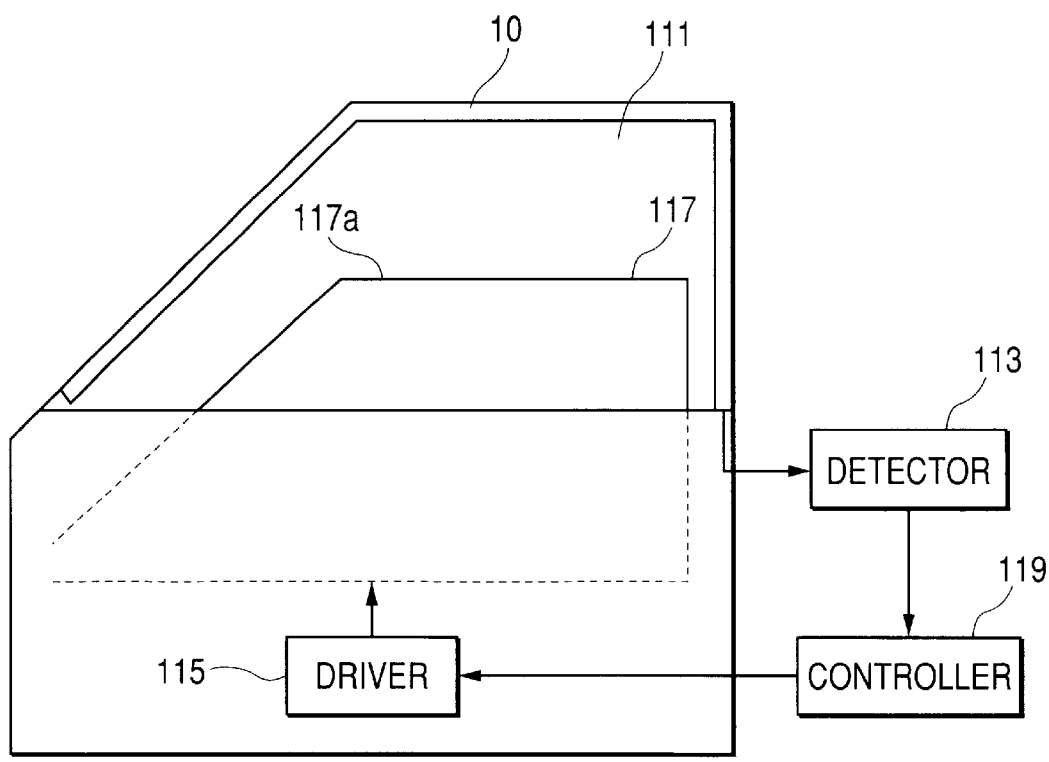
FIG. 36 is a block diagram showing an insertion detection device according to a fifth embodiment of the present invention.
Figure 37:
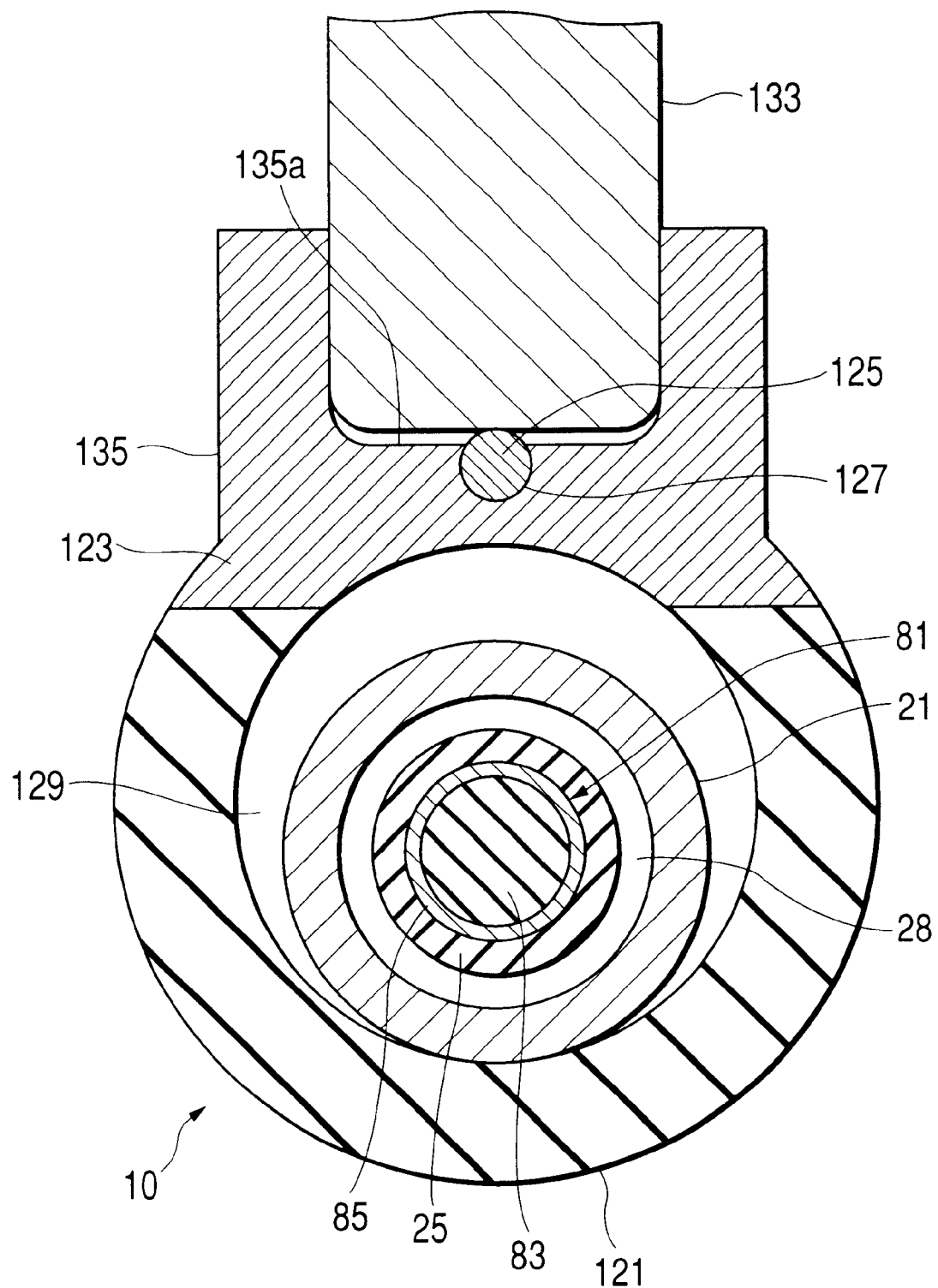
FIG. 37 is a cross-sectional view of the structure and the arrangement of a load sensor provided for the insertion detection device in FIG. 36.

FIG. 36 is a block diagram showing an insertion detection device according to a fifth embodiment of the present invention. FIG. 37 is a cross-sectional view of the structure and the shape of the arrangement of a load sensor that is provided for the insertion detection device in FIG. 36. FIG. 38 is a specific diagram showing the circuit structure of the essential portion of the insertion detection device in FIG. 36.

The insertion detection device according to this embodiment is used to prevent the insertion of a power window of a vehicle, and comprises a load sensor 10 arranged for the internal portion of a car window 111, and a detector (detection circuit) 113 for detecting the insertion via the load sensor 10.

The car window 111 is opened or closed by using a window glass (opening and closing member) 117 that is opened or closed by a driver 115. Control for the driver 115 is provided by a controller 119. The controller 119 refers to detection results obtained by the detector 113, and controls the driver 115 based on an entry received from a console unit (not shown) to open or close the window glass 117.

As is shown in FIGS. 37 and 38, in the third embodiment the load sensor 10 has the same structure, with the exception that an exterior tube 121 is added. The exterior tube 121 is a member formed of an elastic material, such as rubber, one circumferential portion of which is a conductive portion 123 formed of an elastic conductive member, such as conductive rubber. In the conductive portion 123, a groove (a groove 127), or a through hole, in which a metal line 125 is to be inserted is extended in the longitudinal direction, and the elastic conductive tube 21 is inserted into a hollow portion 129 of the exterior tube 121. In this embodiment, one part of the exterior tube 121 is made of an elastic conductive material; however, the entire exterior tube 121 maybe formed of an elastic conductive material and may be defined as the conductive portion 123.

In this embodiment, a twisted line composed of multiple metal wire lines is used as the metal line 125. However, multiple non-twisted metal wire lines, or a single metal line may also be employed. The metal line 125 is used to reduce the resistance in the longitudinal direction of the conductive portion 123; however, when a short load sensor 10 is used, or when there is no need to reduce the resistance in the longitudinal direction of the conducive portion 123, the metal line 125 need not be employed. Or, in order to reduce the resistance in the longitudinal direction of the elastic conductive tube 21, a groove or a through hole may be formed in the elastic conductive tube 21 for the insertion of a longitudinally extended metal line, and the metal line may then be fitted into the groove or inserted into the through hole.

The load sensor 10 is attached to the inner wall of the car window 111 that faces a downstream end 117a in the direction in which the window glass 117 is closed, or is attached to the downstream end 117a facing the direction in which the window glass 117 is opened. As a specific example where the load sensor 10 is provided for the inner wall of the car window 111, the load sensor 10 is arranged at the window frame of the car window 111 shown in FIG. 36, or at the inner side edge of a side visor 131 shown in FIG. 39.

Further, in this embodiment, an attachment portion 135 is formed on the outer wall of the exterior tube 121 (the conductive portion 123), and a holding groove 135a is formed in the attachment portion 135 for the insertion of a support member 133, to which the load sensor 10 is attached.

The circuit structure for the load sensor 10 and the detector 113 will now be described while referring to FIG. 38. The load sensor 10 is connected to the detector 113 by lead lines 137 and 139. One end of the lead line 137 is connected to one end of an electrode member 81, while the other end is connected to the detector 113. One end of the lead line 139 is connected to one end of the metal line 125 that is provided for the conductive portion 123 of the exterior tube 121, while the other end is connected to the detector 113.

In the load sensor 10, the other end of the electrode member 81 and the other end of the metal line 125 are connected to each other via the end terminal resistor 141, and one end of the elastic conductive tube 21 is connected to one end of the metal line 125. The resistance for the end terminal resistor 141 is set greater than the resistance for the electrode member 81, the resistance for the elastic conductive tube 21, the resistance for the conductive portion 123 of the exterior tube 21, the resistance for the metal line 125 and the contact resistance between these members when insertion occurs.

In the detector 113, the other end of the lead line 137 is connected to a power source line 145 via a reference resistor 143, while the other end of the lead line 139 is grounded.

With this circuit structure, since the electrode member 81 is separated from the elastic conductive tube 21 in the state wherein no insertion occurs, as is indicated by an arrow 147, the current supplied along the power source line 145 flows to the ground via the reference resistor 143, the lead line 137, the electrode member 81, the end terminal resistor 141, the metal line 125 and the lead line 139. In this case, since the resistance of the end terminal resistor 141 is high, only a tiny current flows, via the reference resistor 143, from the power source line 145 to the load sensor 10.

When a foreign object is inserted at position (load application position) P, located at a distance x from one end of the load sensor 10, and when the exterior tube 121 and the elastic conductive tube 21 are pressed against and bent by the load exerted by the foreign object, at the load application position P, the electrode member 81 contacts the elastic conductive tube 21 and the elastic conductive tube 21 contacts the conductive portion 123 of the exterior tube 121. Then, in addition to the circuit indicated by the arrow 147, in the load sensor 10 a circuit, indicated by an arrow 149, is opened across which a current supplied via the power source line 145 flows to the ground through the reference resistor 143, the lead line 137, the electrode member 81, the contact portion of the electrode member 81 and the elastic conductive tube 21, the elastic conductive tube 21, the contact portion of the elastic conductive tube 21 and the conductive portion 123, the conductive portion 123, the contact portion of the conductive portion 123 and the metal line 125, the metal line 125, and the lead line 139.

At this time, since the resistance in the circuit indicated by the arrow 149 is considerably smaller than the resistance in the circuit indicated by the arrow 147, a considerably larger current flows from the power source line 145 through the reference resistor 143 to the load sensor 10. Thus, the value of the current supplied by the power source line 145 to the reference resistor 143, and the value of the voltage drop that occurs at the reference resistor 143 vary, depending on whether an insertion has occurred, so that only a change in the current value and a change in the voltage drop need be detected to determine whether an insertion has occurred.

In this embodiment, whether an insertion has occurred is detected when a determiner 151, included in the detector 113, detects a change in the potential at the end Q of the reference resistor 143, which is nearer the load sensor 10. That is, since the ground potential at the end Q is drastically reduced upon the occurrence of an insertion, the determiner 151 need only determine whether the potential is higher or lower than a predetermined reference voltage for the occurrence of an insertion to be detected. Further, the determiner 151 sequentially outputs the determination results to the controller 119.

When the determination results obtained bey the determiner 151 indicate that an insertion has not occurred, control of the driver 115 is provided by the controller 119 based on an opening/closing instruction entered at the console unit (not shown) and the window glass 117 is opened or closed. When an insertion is detected by the determiner 151, in response, the controller 119 inhibits the closing of the window glass 117, regardless of the instruction received from the console unit, and preferably, controls the driver 115 so that opening of the window glass 117 continues until it has reached the fully open position.

As is described above, since according to the embodiment the load sensor 10 is constituted by using the electrode member 81 of the third embodiment, it is possible to provide a reliable insertion detection device having an inexpensive structure that can accurately detect a load exerted in various directions by a foreign object.

Further, since the elastic conductive tube 21 is inserted into the hollow portion 129 of the exterior tube 121, the elastic conductive tube 10 and the internal structure thereof can be protected by the exterior tube 121, and the durability of the load sensor 10 improved.

Furthermore, since the metal line 125 is provided for the conductive portion 123 of the exterior tube 121, in the longitudinal direction the resistance of the conducive portion 123 can be considerably reduced, so that the conductive portion 123 can be constituted as a low-noise conductive path.

In this embodiment, the exterior tube 121 is provided on the outer wall of the elastic conductive tube 21; however, the exterior tube 121 may be removed, and the elastic conductive tube 21 may be directly fixed to the inner wall of the car window 111.

In addition, in this embodiment, the insertion prevention device of this invention is employed to prevent the insertion of a power window of a vehicle. However, this device can also be used for a function which opens or closes an electric sliding door or the sunroof of a vehicle. Or also, the insertion prevention device can be used to prevent an insertion at an opening that is opened or closed by an arbitrary opening/closing member, such as the door of a building.

Sixth Embodiment

Figure 41:
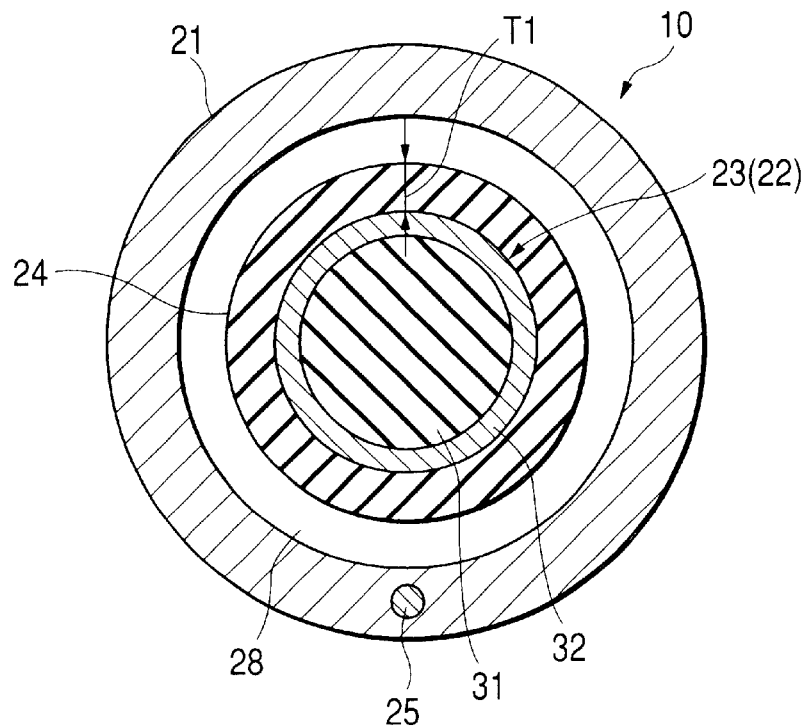
FIG. 41 is a cross-sectional view of the load sensor in FIG. 40 taken along the line A—A.
Figure 42:
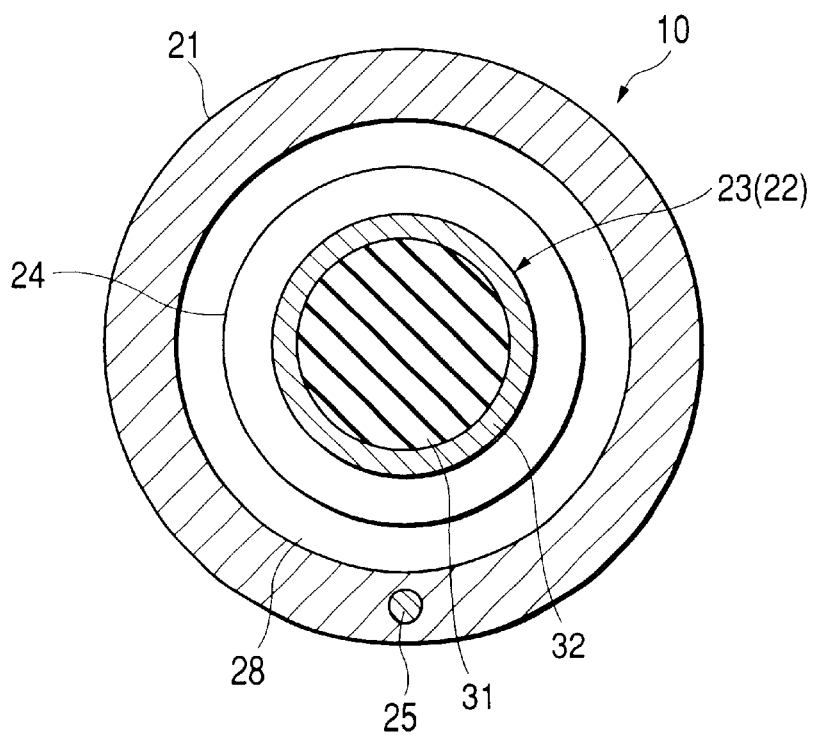
FIG. 42 is a cross-sectional view of the load sensor in FIG. 40 taken along the line B—B.
Figure 43:
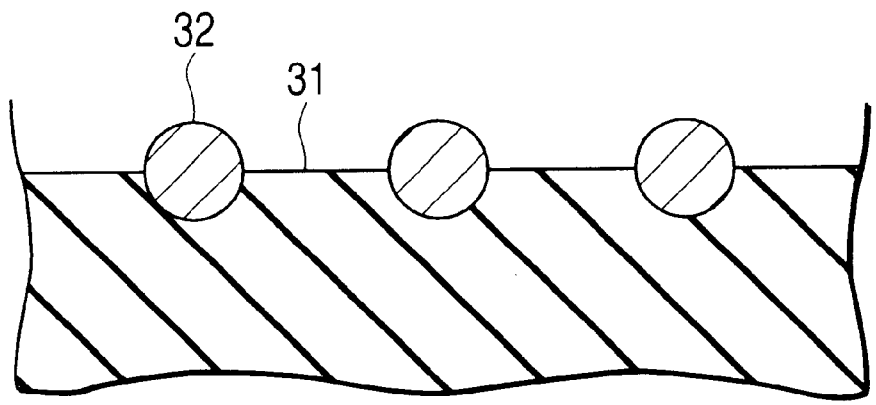
FIG. 43 is an enlarged cross-sectional view of the essential portion of an electrode member.

FIG. 40 is an axially parallel cross-sectional view of a load sensor according to a sixth embodiment of the invention. FIG. 41 is a cross-sectional view of the load sensor in FIG. 40 taken along the line A—A. FIG. 42 is a cross-sectional view of the load sensor in FIG. 40 taken along the line B—B. And FIG. 43 is an enlarged cross-sectional view of the essential portion of an electrode member.

As is shown in FIGS. 40 to 42, a load sensor 10 comprises a hollow, elastic conductive tube (elastic tube) 21; an electrode member 23 that is inserted as an insertion member 22 into the elastic conductive tube 21; multiple envelope members 24 provided on the outer wall of the electrode member 23; and a metal conductive line 25 having a low resistance that is longitudinally arranged on the elastic conductive tube 21. In this embodiment, the insertion member 22 is constituted by the electrode member 23; however, the insertion member 22 may be formed of an insulating elastic member and a conductive electrode member.

The elastic conductive tube 21 is a substantially tubular member having a hollow portion 28, and is formed entirely of an elastic conductive material, such as conductive rubber. In this embodiment, the entire elastic conductive tube 21 constitutes a conductive portion since in this embodiment it is formed, in its entirety, of an elastic conductive material. However, only one circumferential part of the elastic conductive member 21 may be formed of an elastic conductive material for use as a conductive portion, while the remainder is formed of an elastic insulating member, such as rubber.

The electrode member 23 includes an elongated flexible core member 31 and a metal line 32 that is wound coil-like around the outer wall of the core member 31. The electrode member 23 serves as an electrode having either a positive or a negative polarity, while an elastic conductive tube 21 serves as the electrode having the other polarity.

The core member 31 is an insulating member made of a resin, rubber or a fiber material, or a material compounded of several of these materials. In this embodiment, extrusion molding is used to deposit a coating of an elastic insulating material, such as a silicon rubber resin, a fluorocarbon resin or EPDM, on the center reinforcement line of a fiber, such as a carbon fiber.

An anticorrosive metal line, such as a dichromic line, a stainless steel line or a tin plated copper line, is used for the metal line 32, and as is shown in FIG. 4, the metal line 32 is wound around and embedded in the outer wall of the core member 31 (in this case, about half of the metal line 32, in cross section, is embedded). As a modification, a spiral groove may be formed in the outer wall of the core member 31 into which the metal line 32 is fitted when it is wound around the core member 31.

Each of the envelope members 24 is used to separate the electrode member 23 from the elastic conductive tube 21 under a condition wherein no load is applied. The envelope members 24, which are shaped like rings, are positioned, in the longitudinal direction of the electrode member 23, at intervals D on the outer wall of the electrode member 23, and together with the electrode member 23 are inserted into the elastic conductive tube 21. In this embodiment, using a resin or rubber, the envelope members 24 are integrally formed, by molding, on the outer wall of the electrode member 23. According to another form of the arrangement, the envelope members 24 may be spirally arranged on the outer wall of the electrode member 23. In this embodiment the molding method is employed to form the envelope members 24; however, as the envelope members 24, insulating thermally shrinking tubes may be used that are heat shrunk after being mounted on the outer wall of the electrode 23.

In this embodiment, one, at least, of the interval D between envelope members 24, the thickness T1 (see FIG. 2) of an envelope member 24, and the width W of an envelope member 24 in the longitudinal direction of the electrode member 23 is set in accordance with the magnitude of the load to be detected by the load sensor 10, as will be described later.

The conductive line 25 is used to reduce the resistance of the elastic conductive tube 21 that functions as a conductive path, and is formed of a set of multiple metal wire lines, or of a single, comparatively thick metal wire line. When multiple metal wire lines are used to form the conductive line 25, they may be twisted. However, regardless of whether multiple metal wire lines or a single metal wire line is used to form the conductive line 25, the conductive line 25 must be flexible so as not to interfere with the bending of the elastic conductive tube 21.

This conductive line 25 must be so arranged that, at least when the elastic conductive tube 21 is bent by the external application of a load, the portion of the conductive line 25 at the load application position can be electrically connected to the elastic conductive tube 21. In this embodiment, the conductive line 25 is laid longitudinally along the elastic conductive tube 21, so that substantially the entire conductive line 25 constantly and directly contacts the elastic conductive tube 21. More specifically, the conductive line 25 is so arranged that it is embedded in the wall of the elastic conductive tube 21.

In this embodiment, the conductive line 25 is arranged so that it is embedded in the wall of the elastic conductive tube 21. However, the conductive line 25 may be inserted into the through hole that is longitudinally formed in the wall of the elastic conductive tube 21, or it may be fitted into a groove that is longitudinally formed in the outer wall of the elastic conductive tube 21 or in the inner wall that faces the hollow portion 28.

Figure 44:
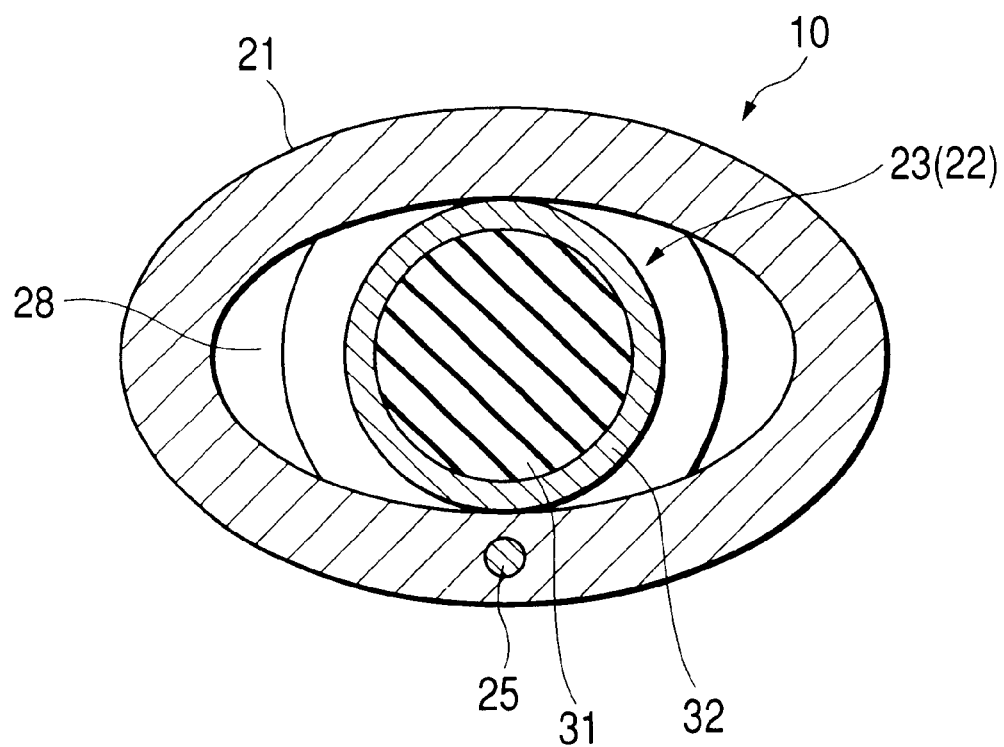
FIG. 44 is a diagram showing the state wherein a load is applied to the load sensor in FIG. 1.

With this arrangement, when a load is applied to the load sensor 10, the elastic conductive tube 21 is bent as is shown in FIG. 44, and the electrode member 23 and the elastic conductive tube 21 contact each other and are electrically connected. Of course, when the load is released, the elastic conductive tube 21 is returned to its normal tubular shape, and as a result, the electrode member 23 and the elastic conductive tube 21 are disconnected. Therefore, only the conductive state existing between the electrode member 23 and the elastic conductive tube 21 must be detected to determine whether a load has been applied.

The magnitude of the load (i.e., the sensitivity of the load sensor 10), which is required for bending and bringing the elastic conductive tube 21 into contact with the electrode member 23, is closely related to the interval D between envelope members 24, and the thickness T1 and the width of an envelope member 24. For example, as the interval D between envelope members 24 is increased, the length of the elastic conductive tube 21 between the envelope members 24 is extended, and a smaller pressing force is required to bend that portion in so it contacts the electrode member 23. Further, when the thickness T1 of envelope members 24 is increased, in the normal state the distance between the electrode member 23 and the elastic conductive tube 21 is extended, so that a greater pressing force is required to bend the elastic conductive tube 21 inward and bring it into contact with the electrode member 23. In addition, in a case wherein envelope members 24 are also pressed down and compressed when a load is applied and the elastic conductive tube 21 contacts the electrode member 23, as the envelope member 24 width W is increased, a stronger pressing force is required to press down and compress envelope members 24, making it is difficult for the elastic conductive tube 21 to contact the electrode member 23.

In this embodiment, therefore, the focus is on the sensitivity adjustment function for the envelope members 24, and a desired sensitivity for the load sensor 10 is set by adjusting, at least, one of the interval D between envelope members 24, the thickness T1 of the envelope member 24, and the width W thereof.

Figure 45:
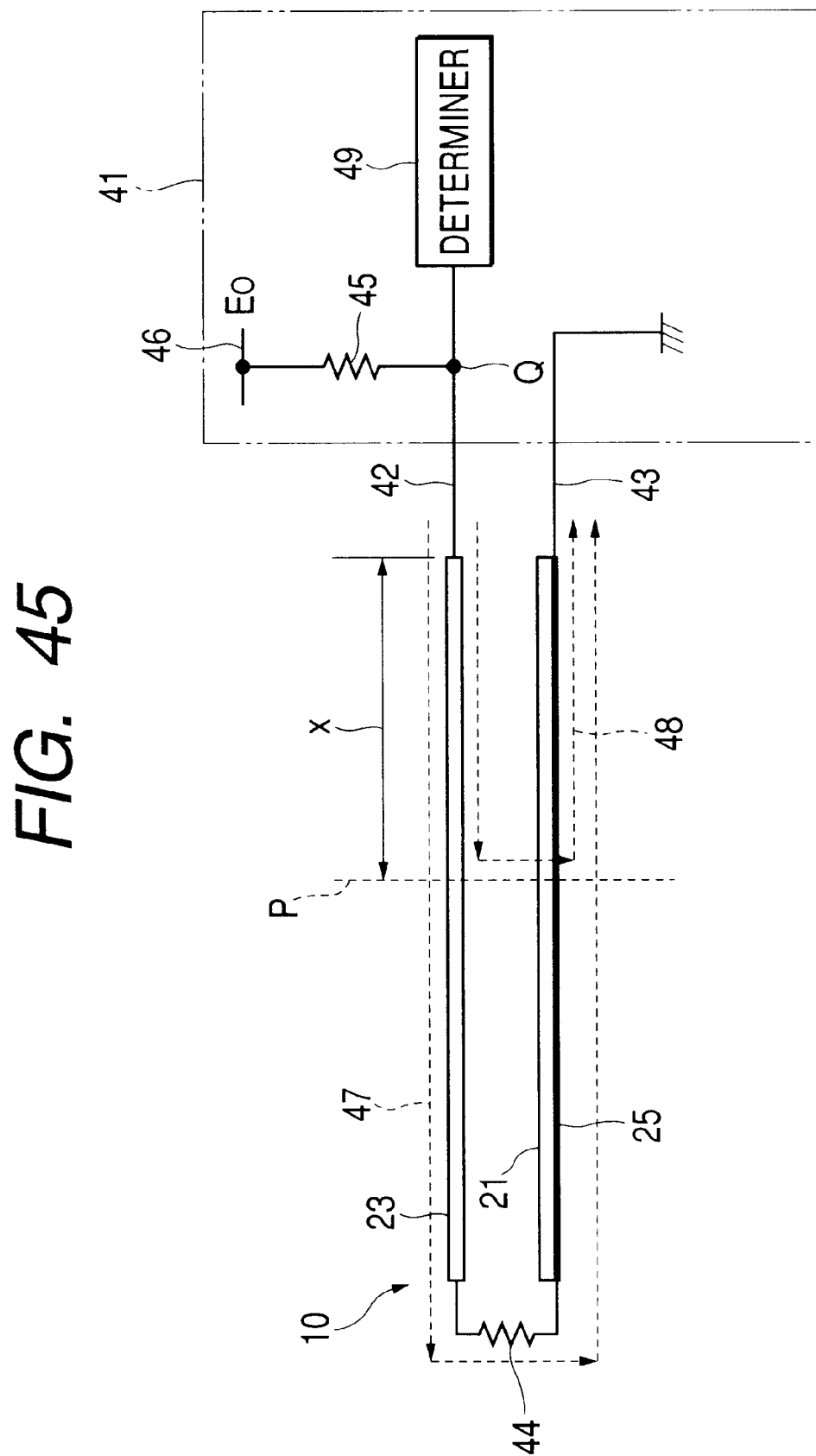
FIG. 45 is a specific diagram showing the load sensor in FIG. 40 and the circuit structure of a detection circuit connected thereto.

FIG. 45 is a specific diagram showing the load sensor 10 for this embodiment and the circuit structure of a detector (detection circuit) 41 connected to the load sensor 10.

The load sensor 10 is connected to the detector 41 by lead lines 42 and 43. One end of the lead line 42 is connected to one end of the electrode member 23, while the other end is connected to the detector 41. One end of the lead line 43 is connected to one end of the conductive line 25, while the other end is connected to the detector 41.

In the load sensor 10, the other end of the electrode member 23 and the other end of the conductive line 25 are connected to each other via the end terminal resistor 44. The resistance for the end terminal resistor 44 is set greater than the resistance for the electrode member 23, the resistance for the elastic conductive tube 21, the resistance for the conducive line 25 and the contact resistance between these members when the load is applied.

In the detector 41, the other end of the lead line 42 is connected to a power source line 46 via a reference resistor 45, while the other end of the lead line 43 is grounded.

With this circuit structure, since the electrode member 23 is separated from the elastic conductive tube 21 in the state wherein no load is applied, as is indicated by an arrow 47, the current supplied along the power source line 45 flows to the ground via the reference resistor 45, the lead line 42, the electrode member 23, the end terminal resistor 44, the conductive line 25 and the lead line 43. In this case, since the resistance of the end terminal resistor 44 is high, only a tiny current flows, via the reference resistor 45, from the power source line 46 to the load sensor 10.

When a load is applied to the load sensor 10 at position (load application position) P, located at a distance x from one end of the load sensor 10, and when the elastic conductive tube 21 is pressed against and bent by the load, the electrode member 23 contacts the elastic conductive tube 21. Then, in addition to the circuit indicated by the arrow 47, in the load sensor 10 a circuit, indicated by an arrow 48, is opened across which a current supplied via the power source line 46 flows to the ground through the reference resistor 45, the lead line 42, the electrode member 23, the contact portion of the electrode member 23 and the elastic conductive tube 21, the elastic conductive tube 21, the contact portion of the elastic conductive tube 21 and the conductive line 25, the conductive line 25 and the lead line 43.

At this time, since the resistance in the circuit indicated by the arrow 48 is considerably smaller than the resistance in the circuit indicated by the arrow 47, a considerably larger current flows from the power source line 46 through the reference resistor 45 to the load sensor 10. Thus, the value of the current supplied by the power source line 46 to the reference resistor 45, and the value of the voltage drop that occurs at the reference resistor 45 vary, depending on whether a load has been applied, so that only a change in the current value and a change in the voltage drop need be detected to determine whether an insertion has occurred.

In this embodiment, whether a load has been applied is detected when a determiner 49, included in the detector 41, detects a change in the potential at the end Q of the reference resistor 45, which is nearer the load sensor 10. That is, since the ground potential at the end Q is drastically reduced upon the application of a load, the determiner 49 need only determine whether the potential is higher or lower than a predetermined reference voltage for the occurrence of an insertion to be detected.

As is described above, according to the embodiment, the application of a load can be detected by determining whether the electrode member 23 is electrically connected to the elastic conductive tube 21. As a result, it is possible to provide a load sensor having a comparatively simple and inexpensive configuration and a circuit structure that can easily and accurately detect a load.

Further, the metal conductive line 25 is so arranged in the longitudinal direction of the elastic conductive tube 21 that, substantially, the entire conductive line 25 constantly and directly contacts the elastic conductive tube 21. Thus, when this low resistance conductive line 25 is used as a conductive path for a load detection signal, a low-noise conductive path can be provided. And when, for example, a load is applied at a location (a location at distance x, having a great value, in FIG. 45) distant from the end of the load sensor 10, a satisfactory load detection output signal can be extracted.

The envelope members 24 are fitted around the electrode member 23 at the predetermined intervals D in the longitudinal direction, and the envelope members 24, together with the electrode member 23, are inserted into the elastic conductive tube 21 while maintaining a gap between the electrode member 23 and the elastic conductive tube 21. Therefore, the sensitivity of the load sensor 10 can be easily controlled by adjusting, at least, one of the thickness T1 of the envelope member 24, the width W thereof, and the interval D between the envelope members 24.

The sensitivity of the load sensor 10 can also be easily controlled by altering, at least, one of the thickness T1 of the envelope member 24, the width W thereof, the interval D between envelope members 24, the distance between the electrode member 23 and the elastic conductive tube 21, the thickness of the elastic conductive tube 21, and the outer diameter of the elastic conductive tube 21.

Furthermore, since the insertion member 22 is constituted by the electrode member 23, when the elastic conductive tube 21 is bent by a load applied from any direction, the electrode member 23 can accurately eclectically contact the elastic conductive tube 21, and a load applied from any direction can be detected correctly. Further, substantially without having to ascertain the direction around the axis in which the electrode member 23 is facing, the assembly and the arrangement of the load sensor 10 can be easily performed. Especially, since the coil-shaped metal line 32 is fully exposed on the outer wall of the electrode member 23, when the elastic conductive tube 21 is bent by the application of a load in any direction, the metal line 32 can correctly contact the elastic conductive tube 21, and loads applied from various directions can be accurately detected.

Furthermore, the signal extraction lead line 42 can be easily connected to the metal line 32 that is wound around the core member 31, and also there is little contact resistance when it is connected to the metal line 32.

Further, for the electrode member 23 of this embodiment, the metal line 32 is wound coil-like around the outer wall of the core member 31. Since the electrode member 23 made of a different material from the elastic conductive tube 21 contacts the elastic conductive tube 21 upon the application of a load, upon the release of the load, the electrode member 23 is easily separated from the elastic conductive tube 21, so that the reliability of the load sensor 10 is improved.

Since the core member 31 is made of an insulating material, merely by adjusting the outer diameter of the core member 31, the length of the area around which the metal line 32 is wound, which corresponds to the unit length of the electrode member 23, can be controlled, and the resistance per unit length of the electrode member 23 can be easily adjusted.

Further, since the metal line 32 is wound coil-like around the outer wall of the core member 31, when the metal line 32 coil is brought into contact with the elastic conductive tube 21 by application of a load, conductive points on the coil of the metal line 32 and the elastic conductive tube 21 are positioned exactly at the load application portion, so that these two can accurately be rendered conductive.

Since the metal line 32 is wound round and embedded in the outer wall of the core member 31, sliding of the metal line 32 along the outer wall of the core member can be prevented, and a stable wound state can be maintained for the metal line 32.

Further since the core member 31 is made of an elastic material, the electrode member 23 bends more flexibly. As a result, it is possible to provide a strong load sensor 10 that is not destroyed and can be returned to its original shape even when the it is bent 180°, or is folded at random.

Furthermore, since an anticorrosive metal is used for the metal line 32, an anticorrosive and reliable load sensor can be provided.

In this embodiment, molding is used to integrally form the envelope member 24, made of resin or rubber, on the outer wall of the electrode member 23. Therefore, the inner wall of the envelope member 24 faces the electrode member 23 in which the coil of the metal line 32 is embedded, and the envelope member can be securely fixed to the outer wall of the electrode member 23. In addition, since the metal line 32 is pressed by the envelope member 24, the metal line 32 is prevented from being released from the core member 31.

When the electrode member 23 includes the metal line 32 longitudinally provided in a coil shape, the resistance of the electrode member 23 can be reduced, and the electrode member 23 can serve as a low noise conductive path. As a result, the detection circuit can overall have a digital circuit structure.

Seventh Embodiment

Figure 46:
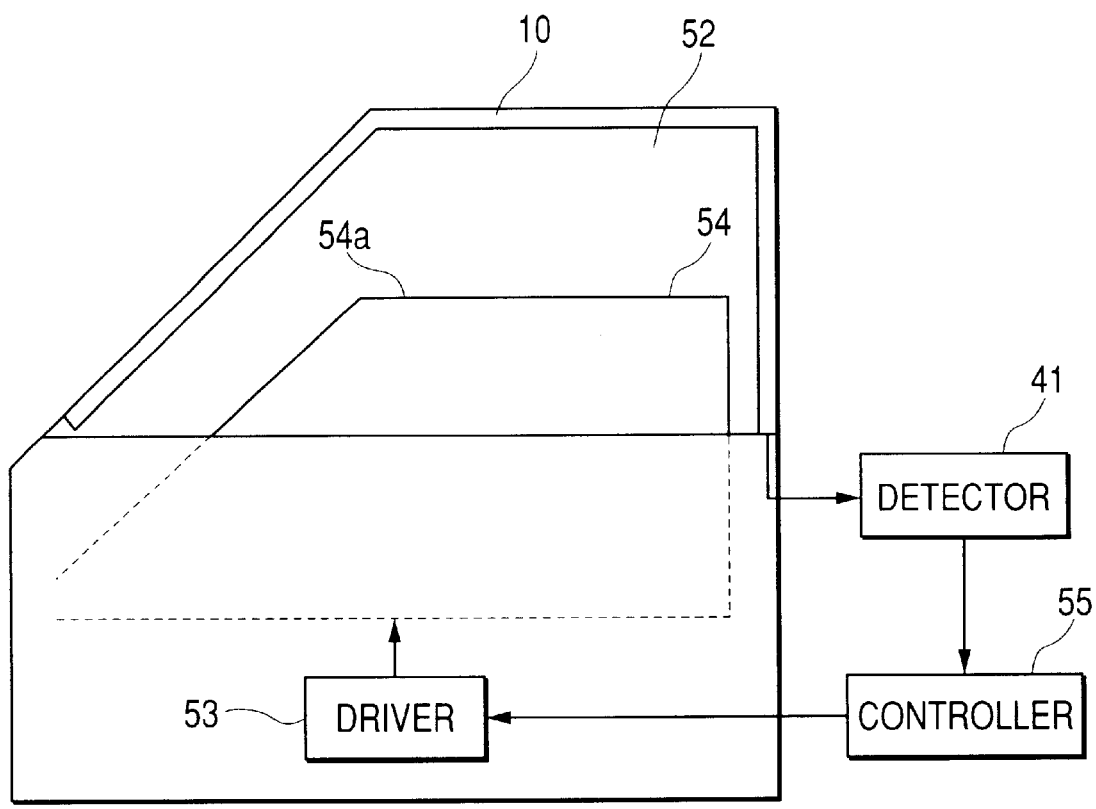
FIG. 46 is a block diagram showing an insertion detection device according to a seventh embodiment of the present invention.
Figure 47:
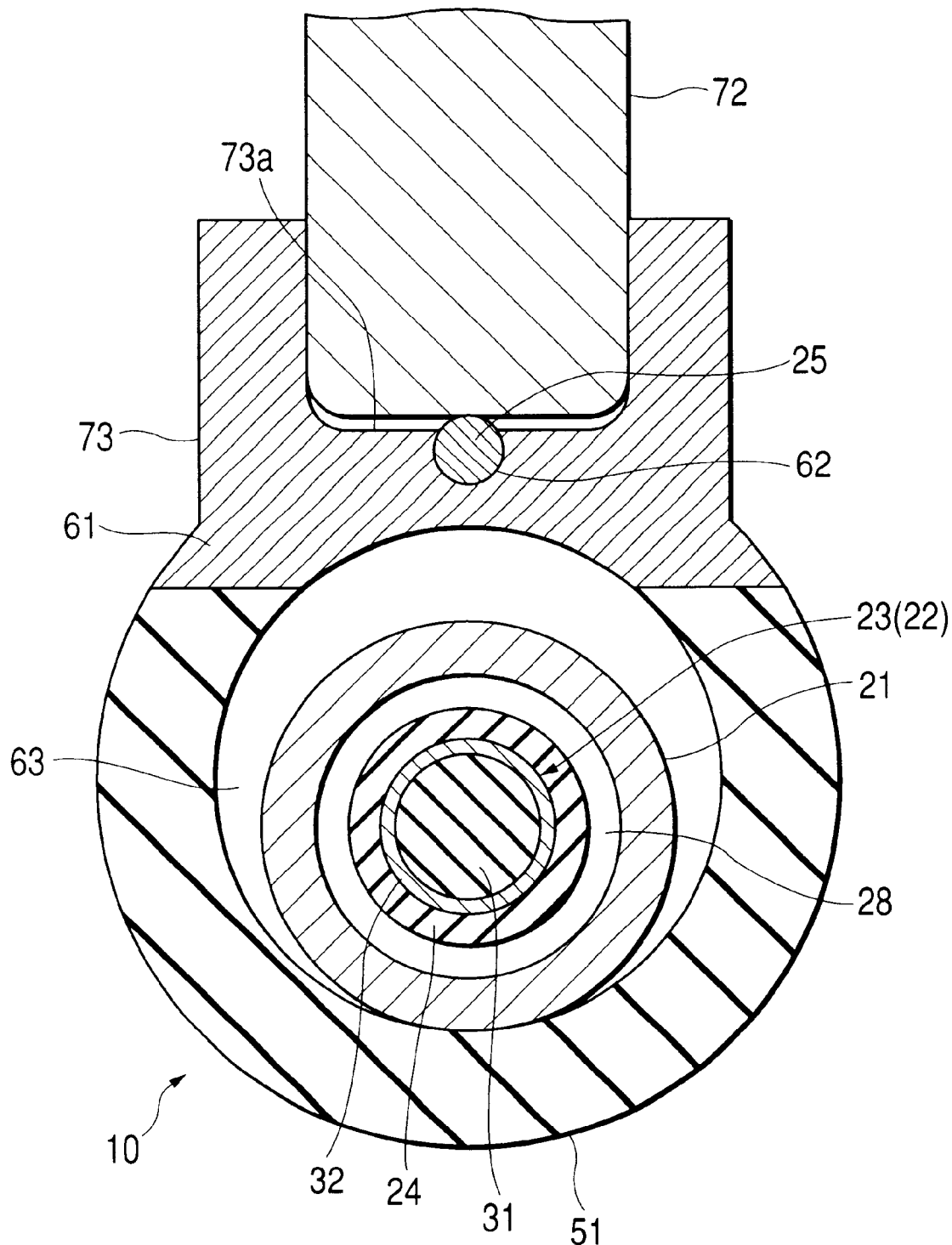
FIG. 47 is a cross-sectional view of the structure and the arrangement of a load sensor provided for the insertion detection device in FIG. 46.
Figure 48:
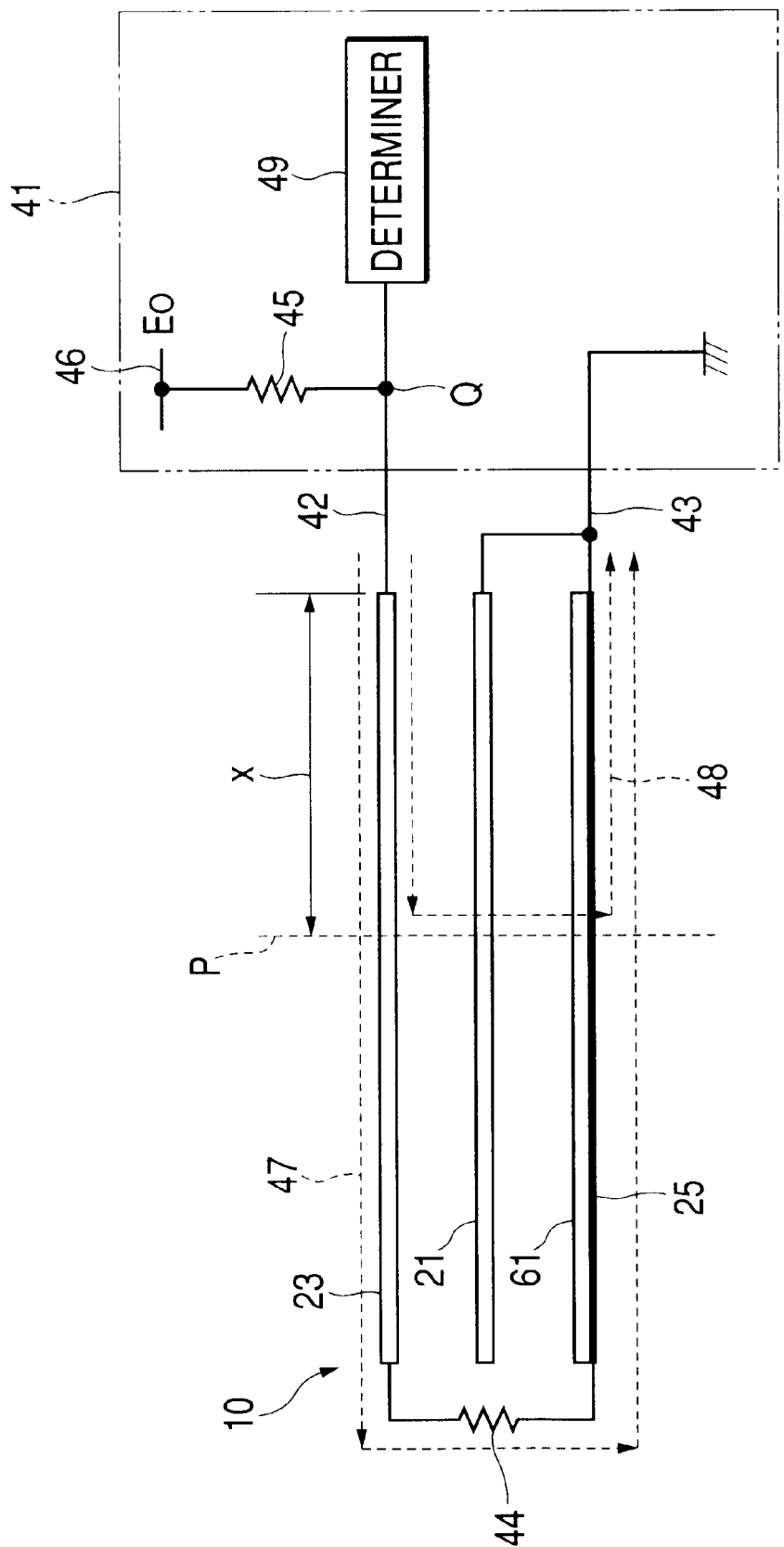
FIG. 48 is a specific diagram showing the circuit structure of the essential portion of the insertion detection device in FIG. 46.

FIG. 46 is a block diagram showing an insertion detection device according to a seventh embodiment of the present invention. FIG. 47 is a cross-sectional view of the structure and the form of the arrangement of a load sensor that is provided for the insertion detection device in FIG. 46. And FIG. 48 is a specific diagram showing the circuit structure of the essential portion of the insertion detection device in FIG. 46. The only differences between the load sensor 10 of this embodiment and the load sensor 10 in the sixth embodiment are the form wherein a conductive line 25 is arranged and the provision of an exterior tube 51 on the outer wall of the elastic tube 21. The same reference numerals are used to denote corresponding components, and no further explanation for them will be given. Further, in the circuit structure in FIG. 48, the same reference numerals used for the circuit structure in FIG. 45 are also used to denote corresponding components, and no further explanation for them will be given.

The insertion detection device according to this embodiment is used to prevent the insertion of a power window of a vehicle, and comprises a load sensor 10 arranged for the internal portion of a car window 52, and a detector (detection circuit) 41 for detecting the insertion via the load sensor 10.

The car window 52 is opened or closed by using a window glass (opening and closing member) 54 that is opened or closed by a driver 53. Control for the driver 53 is provided by a controller 55. The controller 55 refers to detection results obtained by the detector 41, and controls the driver 53 based on an entry received from a console unit (not shown) to open or close the window glass 54.

As is shown in FIGS. 46 and 47, in the sixth embodiment the load sensor 10 has the same structure, with the exception that the arrangement form of the conductive line 25 is changed and an exterior tube 51 is added. The exterior tube 51 is a member formed of an elastic material, such as rubber, one circumferential portion of which is a conductive portion 61 formed of an elastic conductive member, such as conductive rubber. In the conductive portion 61, a groove 62 is extended in the longitudinal direction, and a conductive line 25 is fitted to the groove 62. At this time, substantially the conductive line 25 is electrically connected to the entire conductive portion 61. The elastic conductive tube 21 is inserted into a hollow portion 63 of the exterior tube 51. In this embodiment, one part of the exterior tube 51 is made of an elastic conductive material; however, the entire exterior tube 51 may be formed of an elastic conductive material and may be defined as the conductive portion 61.

In this embodiment, the conductive line 25 does not directly contact the elastic conductive tube 21, but is electrically connected to the elastic conductive tube 21 via the conductive portion 61 of the exterior tube 51. Furthermore, in this embodiment, since the elastic conductive tube 2 is separated from the conductive portion 61 of the exterior tube 51 in the normal state, wherein no load is applied, the elastic conductive tube 21 and the conductive line 25 are set in the non-conductive state. But when, upon application of a load, the exterior tube 51 is pressed in and bent and the elastic conductive tube 21 therefore contacts the conductive portion 61, the portion of the conductive line 25 that corresponds to the load application position is electrically connected to the elastic conductive tube 21 via the conductive portion 61.

In this embodiment, the conductive line 25 is fitted into the groove 62 formed in the conductive portion 61 of the exterior tube 51. However, the conductive line 25 may be embedded in the conductive portion 61, or may be inserted into the through hole formed in the conductive portion 61.

Figure 49:
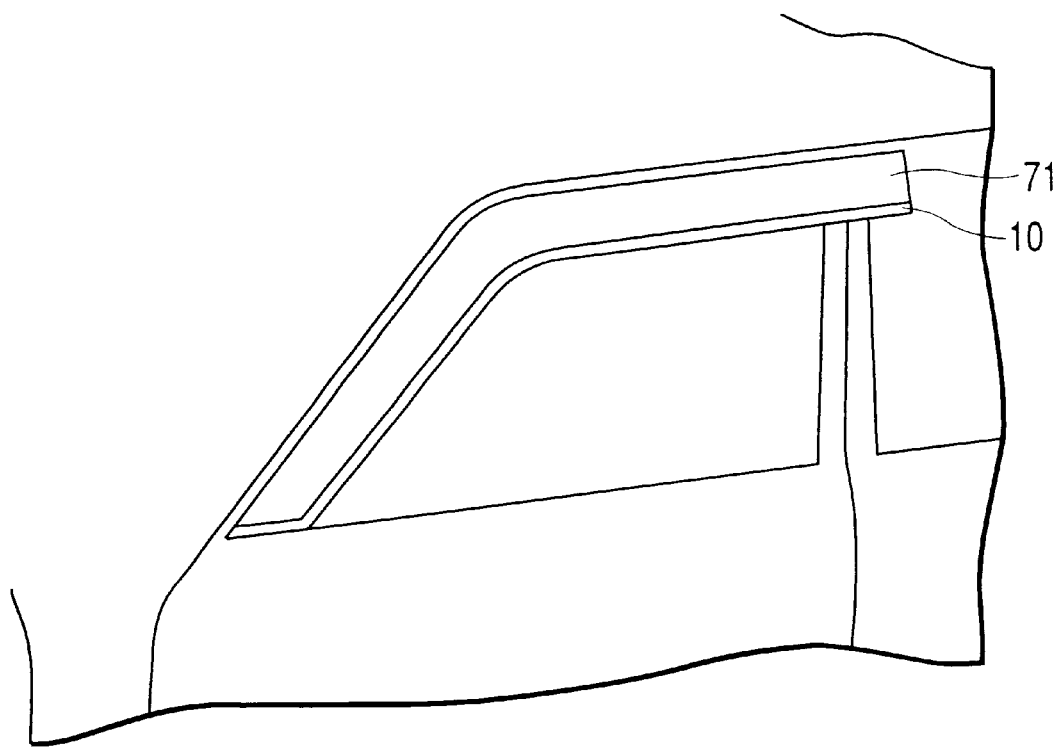
FIG. 49 is a perspective view of a specific example arrangement for the load sensor in FIG. 47.

The load sensor 10 is attached to the inner wall of the car window 52 that faces a downstream end 54a in the direction in which the window glass 54 is closed, or is attached to the downstream end 54a facing the direction in which the window glass 54 is opened. As a specific example where the load sensor 10 is provided for the inner wall of the car window 52, the load sensor 10 is arranged at the window frame of the car window 52 shown in FIG. 46, or at the inner side edge of a side visor 71 shown in FIG. 49.

Further, in this embodiment, an attachment portion 73 is formed on the outer wall of the exterior tube 51 (the conductive portion 61), and a holding groove 73a is formed in the attachment portion 73 for the insertion of a support member 72, to which the load sensor 10 is attached.

The circuit structure for the load sensor 10 and the detector 41 will now be described while referring to FIG. 48. Only the difference from the circuit structure in FIG. 45 will now be described. In this embodiment, in the load sensor 10, the other end of the electrode member 23 and the other end of the conducive line 25 are connected to each other via the end terminal resistor 44, and one end of the elastic conductive tube 21 is connected to one end of the conductive line 25. The resistance for the end terminal resistor 44 is set greater than the resistance for the electrode member 23, the resistance for the elastic conductive tube 21, the resistance for the conductive portion 61 of the exterior tube 51, the resistance for the conductive line 25 and the contact resistance between these members when insertion occurs.

With this circuit structure, since the electrode member 23 is separated from the elastic conductive tube 21 in the state wherein no insertion occurs, as is indicated by the arrow 47, the current supplied along the power source line 46 flows to the ground via the reference resistor 45, the lead line 42, the electrode member 23, the end terminal resistor 44, the conductive line 25 and the lead line 43. In this case, since the resistance of the end terminal resistor 44 is high, only a tiny current flows, via the reference resistor 45, from the power source line 46 to the load sensor 10.

When a foreign object is inserted at position (load application position) P, located at a distance x from one end of the load sensor 10, and when the exterior tube 51 and the elastic conductive tube 21 are pressed against and bent by the load exerted by the foreign object, at the load application position P, the electrode member 23 contacts the elastic conductive tube 21 and the elastic conductive tube 21 contacts the conductive portion 61 of the exterior tube 51. Then, in addition to the circuit indicated by the arrow 47, in the load sensor 10 a circuit, indicated by the arrow 48, is opened across which a current supplied via the power source line 46 flows to the ground through the reference resistor 45, the lead line 42, the electrode member 23, the contact portion of the electrode member 23 and the elastic conductive tube 21, the elastic conductive tube 21, the contact portion of the elastic conductive tube 21 and the conductive portion 61, the conductive portion 61, the contact portion of the conductive portion 61 and the conductive line 25, the conductive line 25, and the lead line 43.

At this time, since the resistance in the circuit indicated by the arrow 48 is considerably smaller than the resistance in the circuit indicated by the arrow 47, a considerably larger current flows from the power source line 46 through the reference resistor 45 to the load sensor 10. Thus, the value of the current supplied by the power source line 46 to the reference resistor 45, and the value of the voltage drop that occurs at the reference resistor 45 vary, depending on whether an insertion has occurred, so that only a change in the current value and a change in the voltage drop need be detected to determine whether an insertion has occurred. Then, the determiner 49 sequentially outputs the determination results to the controller 55.

When the determination results obtained bey the determiner 49 indicate that an insertion has not occurred, control of the driver 53 is provided by the controller 55 based on an opening/closing instruction entered at the console unit (not shown) and the window glass 54 is opened or closed. When an insertion is detected by the determiner 49, in response, the controller 55 inhibits the closing of the window glass 54, regardless of the instruction received from the console unit, and preferably, controls the driver 53 so that opening of the window glass 54 continues until it has reached the fully open position.

As is described above, in this embodiment also, since the low resistant conductive path can be constituted by the conductive line 25, the same effects can be obtained as in the sixth embodiment. Further, since the elastic conductive tube 21 is inserted into the hollow portion 63 of the exterior tube 51, the elastic conductive tube 21 and the internal structure thereof can be protected by the exterior tube 51, and improved durability provided for the load sensor 10.

Furthermore, since the conductive line 25 is provided for the conductive portion 61 of the exterior tube 51, in the longitudinal direction the resistance of the conducive portion 61 can be considerably reduced, so that the conductive portion 61 can be constituted as a low-noise conductive path.

In this embodiment, the exterior tube 51 is provided on the outer wall of the elastic conductive tube 21; however, the exterior tube 51 may be removed, and the load sensor 10 in the sixth embodiment may be directly fixed to the inner wall of the car window 52.

Figure 50:
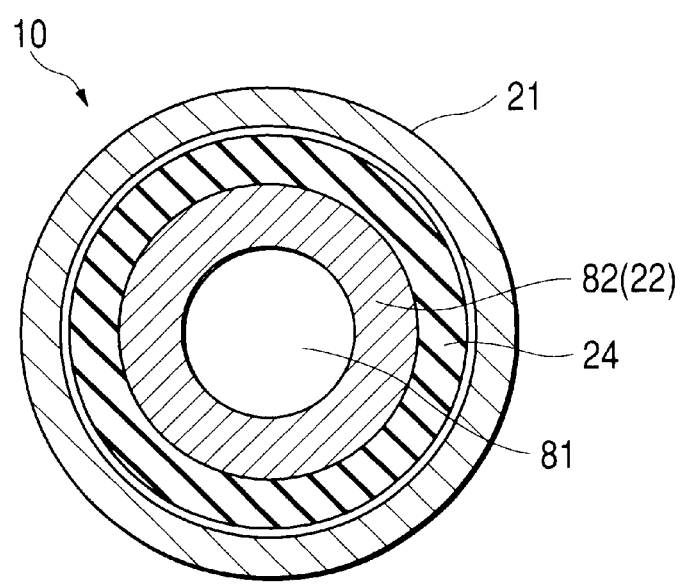
FIG. 50 is a diagram showing a modification of the load sensor according to the first and seventh embodiment.
Figure 51:
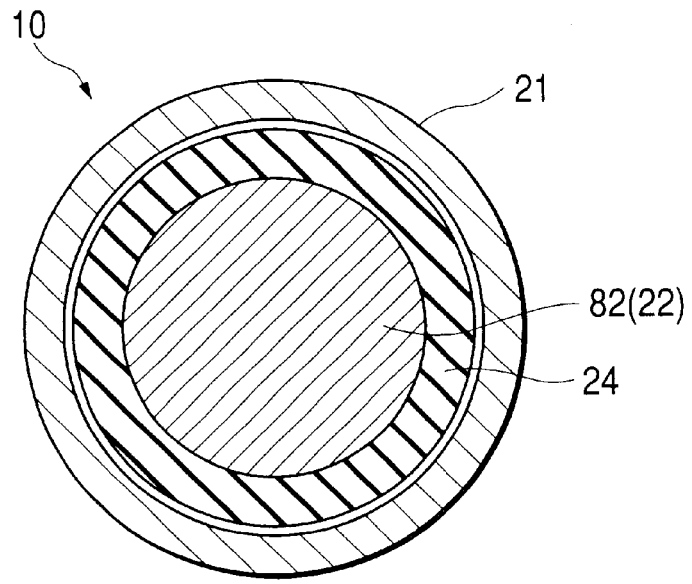
FIG. 51 is a diagram showing a modification of the load sensor according to the first and seventh embodiment.
Figure 52:
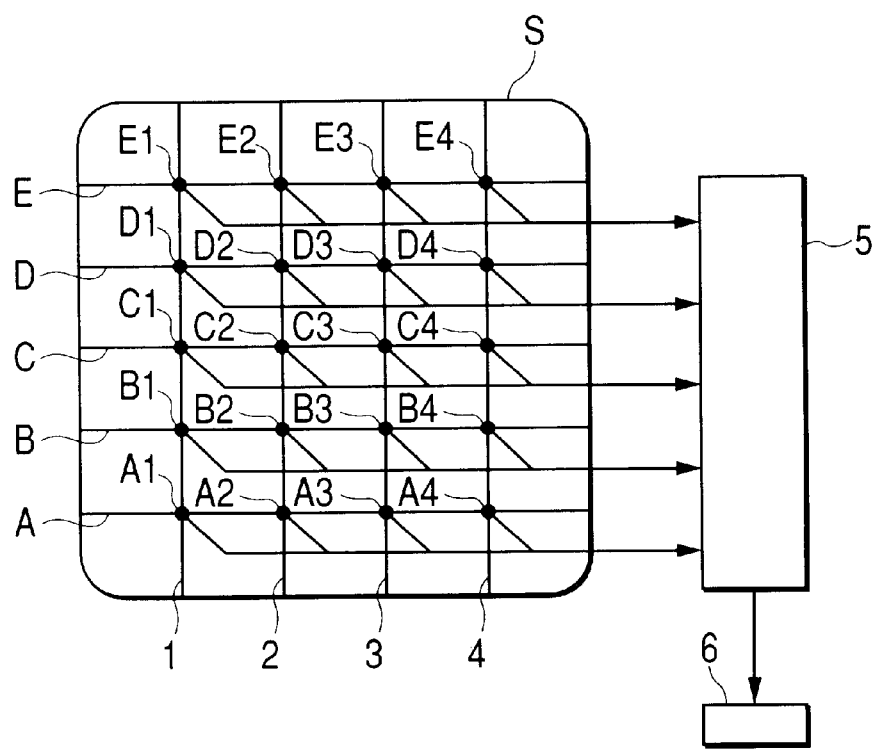
FIG. 52 is a diagram showing a conventional load sensor.

Further modifications of the load sensors 10 of the embodiments are shown in FIGS. 50 and 51. For convenience sake, the conductive line 25 is not shown in FIGS. 50 and 51.

In these modifications, the insertion member 22 is constituted by an electrode member 82 having a cylindrical shape through which a hollow portion 81 passes in the longitudinal direction, or having a solid cylindrical shape with no hollow portion 81. The electrode member 82 is made of an elastic conductive material, such as conductive rubber.

In the structure shown in FIG. 51, however, the electrode member 51 may be formed of a metal conductor or of a compound member composed of a metal conductor and an insulator, or may be made of a twisted metal line composed of multiple metal lines. It should be noted that it is preferable that a material be employed that can provide flexibility for the electrode member 82.

According to the invention, while the elastic tube is in the normal state, the first and second electrode members are located at a distance from the conductive portion of the elastic tube, so that when the elastic tube is flexibly bent by an external load, an electrical connection between the first and the second electrode members can be established with or without the conductive portion of the elastic tube being involved. Thus, when an electrical connection between the first and second electrode members is detected, whether a load is being applied can be determined. And as a result, it is possible to provide a load sensor having a comparatively simple and inexpensive configuration and a circuit structure that can easily and accurately detect the application of a load.

Further, the envelope members are provided that enclose the insertion member longitudinally, at predetermined intervals, and are inserted into the elastic tube, together with the insertion member, to separate the insertion member from the elastic tube. Thus, when, at least, one of the thickness of the envelope member, the width, in the longitudinal direction, of the envelope member of the insertion member, and the interval between envelope members is adjusted, it is possible to easily control the magnitude of the load (i.e., the sensitivity of the load sensor) that is required to bend the elastic tube, and to electrically connect the first and second electrode members via the conductive portion of the elastic tube.

According to the invention, while the elastic tube is in the normal state, the electrode members are so positioned, at a distance from the conductive portion of the elastic tube, that when an external load bends the elastic tube an electrical connection is established between the electrode members and the conductive portion of the elastic tube, with or without the conductive portion of the elastic tube. Therefore, whether a load has been applied can be determined by detecting the electrical connection between the electrode members and the elastic tube. As a result, it is possible to provide a load sensor having a comparatively simple and inexpensive configuration and a circuit structure that can easily and accurately detect the application of a load.

Further, the envelope members are provided that enclose the insertion member longitudinally, at predetermined intervals, and are inserted into the elastic tube, together with the insertion member, to separate the insertion member from the elastic tube. Thus, when, at least, one of the thickness of the envelope member, the width, in the longitudinal direction, of the envelope member of the insertion member, and the interval between envelope members is adjusted, it is possible to easily control the magnitude of the load (i.e., the sensitivity of the load sensor) that is required to bend the elastic tube, and to electrically connect the conductive portion and the electrode member.

According to the invention, at least, one of the interval between envelope members, the thickness of an envelope member and the width thereof in the longitudinal direction of the insertion member is set in accordance with the magnitude of a load to be detected. Thus, a predetermined detection sensitivity can be acquired that can precisely detect a load.

According to the invention, since the envelope members are shaped like rings, to mount envelope members on the insertion member, the envelope members need merely be fitted around the insertion member. Further, since the envelope members slide only in the longitudinal direction, the mounting position can be easily adjusted.

According to the invention, since an adhesive is used to secure envelope members to the insertion member, securing the envelope members to the insertion member can be performed easily.

According to the invention, since the envelope members are thermally shrinking tubes, envelope members are fitted around the insertion member and are shrunk by heating so that they squeeze the insertion member and thus are secured to the insertion member. In this manner, the securing of the envelope members can be easily performed.

According to the invention, the function of the envelope member can be easily implemented merely by winding insulating tape around the insertion member.

According to the invention, when the insulating tape need only be sequentially and spirally wound around the insertion member at predetermined intervals in the longitudinal direction, the function of the envelope member can be easily implemented.

According to the invention, the envelope member can be securely fixed on the insertion member by using the metal fixing member.

According to the invention, the envelope member can be securely fixed on the insertion member by using the metal fixing member.

According to the invention, since the first and second electrode members are provided on the outer wall of the elastic insulating member, the insertion member can be bent comparatively easily, and as a result, the load sensor can be arranged in the curved state. Thus, the degree of freedom available for the arrangement of the load sensor can be increased.

Accordingly to the invention, the elastic tube is securely connected to the output line for signal extraction by means of a simple operation whereby the insertion member is inserted into the elastic tube, while the conductive portion of the output line is wound around the outer wall of the envelope member.

According the invention, since the electrode members are formed of an elastic conductive material and have a hollow portion that passes through longitudinally, bending of the load sensor can be flexibly coped with. Further, a connection to the output line can be easily effected by inserting into the hollow portion the conductive portion of the signal extraction output line.

According to the invention, since the elastic exterior tube is provided outside the elastic tube, the elastic tube is protected and its elasticity is reinforced by the exterior tube, and the function whereby the elastic tube is recovered to the normal state when a pressing force is released is improved. Therefore, when a pressing force is released, the electrode member and the elastic tube are precisely disconnected.

According to the invention, since the electrode member, which constitutes the insertion member, is made of flexible material, the electrode member, together with the elastic tube, can be flexibly bent. As a result, the load sensor can be bent and shaped so that it can cope with various arrangement forms, and a strong load sensor can be provided that is not destroyed by bending.

Further since the insertion member is constituted by the electrode member, when the elastic tube is bent by the application of a load from any direction, the electrode member can correctly contact the conductive portion of the elastic tube, and the loads applied from various directions can be accurately detected. Further, the assembly and the arrangement of the load sensor can be easily performed without there being any need to ascertain the direction, around the axis, in which the electrode member, the inversion member, is facing.

According to the invention, since the electrode member includes the metal line arranged in the longitudinal direction, the resistance of the electrode member can be reduced, and the electrode member can be constituted by a low-noise conductive ago path. As a result, the detection circuit can incorporate the entire digital circuit structure.

According to the invention, since the coil of the metal line is exposed to the outer wall of the electrode member, when the elastic tube is bent by the application of a load from any direction, the metal line can accurately contact the conductive portion of the elastic tube, thereby enabling the correct detection of loads applied from various directions. Further, the assembly and arrangement of the load sensor can be easily performed without there being any need to ascertain the direction, around the axis, in which the electrode member is facing.

In addition, the signal line is easily connected to the metal line that is wound around the core member, and only a small contact resistance is encountered.

For the electrode member according to the present invention, a metal line is wound coil-like around the outer wall of the core member, so that upon application of a load, the elastic tube contacts the metal line wound around the electrode member, which is made of a material different from that of the tube. Thus, when the load is removed, the electrode member can be easily separated from the elastic tube, thereby increasing the reliability of the load sensor.

Furthermore, since insulating material is used for the core member and to adjust the unit length of the electrode member only the outer diameter of the core member need be adjusted to control the length of the area around which the metal line is wound, the unit length resistance of the electrode member can be easily adjusted.

In addition, since the metal line is wound coil-like around the outer wall of the core member, when upon application of a load the coil of the metal line electrically contacts the elastic tube, the conductive point at which the metal line coil contacts the elastic conductive tube can be accurately positioned at the load application position, so that it is possible to precisely render the two components conductive.

According to the invention, since the core member is formed of an elastic material, and since the metal line is wound around and embedded in the outer wall of the core member, sliding of the metal line along the outer wall of the core member can be prevented and a stable wound state can be maintained for the metal line.

Further, since the core member is made of an elastic material, the electrode member is more flexible and more susceptible to bending, and as a result, a strong load sensor is can be provided that can return to its original shape without breaking, even when it is bent 180° or is folded at random.

According to the invention, a spiral groove into which the metal line is fitted is formed in the outer wall of the core member, and the metal line is wound around the core member and fitted into the groove. Thus, sliding of the metal line on the outer wall of the core member can be eliminated, and for the metal line, a stable wound state can be maintained.

According to the invention, since an anticorrosive metal is used for the metal line, a reliable load sensor can be provided that is resistant to corrosion.

According to the invention, molding is used to integrally form envelope members on the outer walls of the electrode members. Thus, the inner wall of an envelope member facing an electrode member enters the spaces between the rings of the metal line that is wound coil-like around the electrode member and securely fixes the envelope member to the outer wall of the electrode member. Further, since the metal line is held by the envelope member, the metal line is prevented from separating from the core member.

According to the invention, the sensitivity of the load sensor can be easily controlled by at the least adjusting the intervals between envelope members enclosing electrode members, the width of envelope members in the longitudinal direction of an electrode member, the distance between the coil-like wound metal line and the elastic tube, the thickness of the elastic tube, or the outer diameter of the elastic tube.

According to the invention, since the inner space within the elastic tube is protected from the outside at both ends of the elastic tube by predetermined shielding means, the entry into the elastic tube of foreign objects, such as dust or liquid, can be prevented.

According to the invention, since the insertion means is divided into two segments at a specific position in the longitudinal direction, when a tension force is exerted on the insertion member by the application of a load, separation of the insertion member seldom occurs.

According to the invention, a satisfactory load sensor load detection function tends to be obtained even when insertion members are not sequentially arranged along the entire elastic tube. Thus, when two segments are arranged in an elastic tube at intervals within a range that does not adversely affect load detection, the cost of the material for the insertion member can be reduced by a value equivalent to the interval between the segments.

According to the invention, since one or multiple load sensors are arranged on the base member, a load sensor, or sensors, and the base member can be handled as a single unit, and the management and attachment of parts can be easily performed. This advantage is particularly remarkable when multiple load sensors are arranged on the base member.

According to the invention, since the load sensors are securely fixed to the base member at their ends or at portions whereat envelope members are inserted between insertion members and elastic tubes, the load sensors can be secured to the base member without disturbing the load detection function of the load sensor.

According to the invention, since a sheet unit including one or multiple load sensors and a base member is included in a bag member, the sheet unit and the bag member can be handled as a single unit, and the management and attachment of parts can be easily performed.

Further, since the sheet unit is included in the bag member, the load sensor can be protected by the bag member.

According to the invention, since the load sensor of one of the nineteenth to twenty-ninth aspects is employed, loads applied from various directions can be accurately detected with a low cost structure. Thus, a reliable insertion detection device can be provided.

According to the invention, while the elastic tube is in the normal state, the electrode members are so positioned, at a distance from the conductive portion of the elastic tube, that when an external load bends the elastic tube an electrical connection is established between the electrode members and the conductive portion of the elastic tube, with or without the conductive portion of the elastic tube. Therefore, whether a load has been applied can be determined by detecting the electrical connection between the electrode members and the elastic tube. As a result, it is possible to provide a load sensor having a comparatively simple and inexpensive configuration and a circuit structure that can easily and accurately detect the application of a load.

Further, the metal conductive line is arranged in the longitudinal direction of the elastic tube, so that when the elastic tube is bent by the external application of a load, at the least the portion of the conductive line at the load application location can be electrically connected to the conductive portion of the elastic tube. Thus, when this low resistance conductive line is used as the conductive path for a load detection signal, a low-noise conductive path can be provided. Therefore, when a load is applied, for example, at a position distant from the end of the load sensor, a satisfactory output signal for the detection of the load application can be extracted.

Further, the envelope members are provided that enclose the insertion member longitudinally, at predetermined intervals, and are inserted into the elastic tube, together with the insertion member, to separate the insertion member from the elastic tube. Thus, when, at least, one of the thickness of the envelope member, the width, in the longitudinal direction, of the envelope member of the insertion member, and the interval between envelope members is adjusted, it is possible to easily control the magnitude of the load (i.e., the sensitivity of the load sensor) that is required to bend the elastic tube, and to electrically connect the conductive portion and the electrode member.

According to the invention, since the electrode member, which constitutes the insertion member, is made of flexible material, the electrode member, together with the elastic tube, can be flexibly bent. As a result, the load sensor can be bent and shaped so that it can cope with various arrangement forms, and a strong load sensor can be provided that is not destroyed by bending.

Further, since the insertion member is constituted by the electrode member, when the elastic tube is bent by the application of a load from any direction, the electrode member can correctly contact the conductive portion of the elastic tube, and the loads applied from various directions can be accurately detected. Further, the assembly and the arrangement of the load sensor can be easily performed without there being any need to ascertain the direction, around the axis, in which the electrode member, the inversion member, is facing.

According to the invention, since the electrode member includes the metal line arranged in the longitudinal direction, the resistance of the electrode member can be reduced, and the electrode member can be constituted by a low-noise conductive path. As a result, the detection circuit can incorporate the entire digital circuit structure.

According to the invention, since the coil of the metal line is exposed to the outer wall of the electrode member, when the elastic tube is bent by the application of a load from any direction, the metal line can accurately contact the conductive portion of the elastic tube, thereby enabling the correct detection of loads applied from various directions. Further, the assembly and arrangement of the load sensor can be easily performed without there being any need to ascertain the direction, around the axis, in which the electrode member is facing.

In addition, the signal line is easily connected to the metal line that is wound around the core member, and only a small contact resistance is encountered.

For the electrode member according to the present invention, a metal line is wound coil-like around the outer wall of the core member, so that upon application of a load, the elastic tube contacts the metal line wound around the electrode member, which is made of a material different from that of the tube. Thus, when the load is removed, the electrode member can be easily separated from the elastic tube, thereby increasing the reliability of the load sensor.

Furthermore, since insulating material is used for the core member and to adjust the unit length of the electrode member only the outer diameter of the core member need be adjusted to control the length of the area around which the metal line is wound, the unit length resistance of the electrode member can be easily adjusted.

In addition, since the metal line is wound coil-like around the outer wall of the core member, when upon application of a load the coil of the metal line electrically contacts the elastic tube, the conductive point at which the metal line coil contacts the elastic conductive tube can be accurately positioned at the load application position, so that it is possible to precisely render the two components conductive.

According to the invention, since the core member is formed of an elastic material, and since the metal line is wound around and embedded in the outer wall of the core member, sliding of the metal line along the outer wall of the core member can be prevented and a stable wound state can be maintained for the metal line.

Further, since the core member is made of an elastic material, the electrode member is more flexible and more susceptible to bending, and as a result, a strong load sensor is can be provided that can return to its original shape without breaking, even when it is bent 180° or is folded at random.

According to the invention, a spiral groove into which the metal line is fitted is formed in the outer wall of the core member, and the metal line is wound around the core member and fitted into the groove. Thus, sliding of the metal line on the outer wall of the core member can be eliminated, and for the metal line, a stable wound state can be maintained.

According to the invention, since an anticorrosive metal is used for the metal line, a reliable load sensor can be provided that is resistant to corrosion.

According to the invention, molding is used to integrally form envelope members on the outer walls of the electrode members. Thus, the inner wall of an envelope member facing an electrode member enters the spaces between the rings of the metal line that is wound coil-like around the electrode member and securely fixes the envelope member to the outer wall of the electrode member. Further, since the metal line is held by the envelope member, the metal line is prevented from separating from the core member.

According to the invention, since the load sensor of one of the first to eleventh aspects is employed, loads applied from various directions can be accurately detected with a low cost structure. Thus, a reliable insertion detection device can be provided.

What is claimed is:

1. A load sensor comprising:
    an elastic tube, at least one part of which, in the circumferential direction, is a conductive portion;
    an elongated insertion member that has longitudinally arranged first and second electrode members provided at a distance, and that is inserted into the elastic tube; and envelope members that are provided longitudinally, at a predetermined distance, to enclose the insertion member, and that, together with the insertion member, are inserted into the elastic tube to separate the insertion member from the elastic tube, wherein, while the elastic tube is in the normal state, the first and the second electrode members are so positioned, at a distance from the conductive portion of the elastic tube, that when an external load bends the elastic tube an electrical connection is established between the first and the second electrode members, with or without the conductive portion of the elastic tube.

2. A load sensor comprising:

an elastic tube, at least one part of which, in the circumferential direction, is a conductive portion;

an elongated insertion member that has longitudinally arranged electrode members provided at a distance, and that is inserted into the elastic tube; and envelope members that are provided longitudinally, at a predetermined distance, to enclose the insertion member, and that, together with the insertion member, are inserted into the elastic tube to separate the insertion member from the elastic tube, wherein, while the elastic tube is in the normal state, the electrode members are so positioned, at a distance from the conductive portion of the elastic tube, that when an external load bends the elastic tube an electrical connection is established between the electrode members and the conductive portion of the elastic tube, with or without the conductive portion of the elastic tube.

3. The load sensor according to claim 1, wherein, for the envelope members, at least, one of the separating interval, the thickness, and the width in the longitudinal direction is set in accordance with the magnitude of the load that is to be detected.

4. The load sensor according to claim 1, wherein the envelope members are formed of insulating material.

5. The load sensor according to claim 1, wherein the envelope members are ring-shaped and externally engage the outer wall of the insertion member.

6. The load sensor according to claim 1, wherein the envelope members are secured to the insertion member by an adhesive.

7. The load sensor according to claim 1, wherein the envelope members are thermally shrinking tubes.

8. The load sensor according to claim 1, wherein the envelope members are formed by winding insulating tape around the insertion member.

9. The load sensor according to claim 8, wherein the insulating tape is spirally and continuously wound around the insertion member in the longitudinal direction with a predetermined gap.

10. The load sensor according to claim 1, wherein the envelope members each include a metal fixing member, attached via a predetermined insulating member to the outer wall of the insertion member, and a coated insulating member, fixed to and covering the outer wall of the metal fixing member.

11. The load sensor according to claim 2, wherein the envelope members each include a metal fixing member, attached to the outer wall of the insertion member, and a coated insulating member, fixed to and covering the outer wall of the metal fixing member.

12. The load sensor according to claim 1, wherein the insertion member includes, on the outer wall on which the first and the second electrode members are provided, the first and the second electrode members and an elastic insulating member.

13. The load sensor according to claim 2, further comprising:

a signal extraction output line that is electrically connected to the conductive portion of the elastic tube when the conductive portion, wound around the outer walls of the envelope members, is inserted into one end of the elastic tube.

14. The load sensor according to claim 1, wherein the electrode members are formed of elastic conductive members through which hollow, longitudinal portions passes.

15. The load sensor according to claim 1, wherein the conductive members are made of an elastic conductive material, a conductive metal, a compound material composed of an elastic conductive material and a conductive metal, or a compound material composed of a conducive metal and an insulating material.

16. The load sensor according to claim 1, further comprising:

an exterior elastic tube enclosing the elastic tube.

17. The load sensor according to claim 1, further comprising:

a load sensor body incorporating the elastic tube, the insertion member and the envelope member; and a substantially plate-shaped base member whereon the load sensor body is mounted.

18. The load sensor according to claim 1, further comprising:

a load sensor body incorporating the elastic tube, the insertion member and the envelope member; and two plate-shaped pressing members for vertically sandwiching and securing the load sensor body.

19. A load sensor according to claim 2, wherein the electrode members are fashioned from flexible members, and that the electrode members constitute the insertion member.

20. The load sensor according to claim 19, wherein the electrode members have metal, longitudinally laid lines.

21. The load sensor according to claim 20, wherein the electrode members each include an elongated flexible core member and a metal line wound coil-like around the outer wall of the core member.

22. The load sensor according to claim 21, wherein the core member is an insulating member of resin, rubber or a fibrous material, or a compound material incorporating several of these materials.

23. The load sensor according to claim 21, wherein the core member is formed of an elastic material, and the metal line is wound around and embedded in the outer wall of the core member.

24. The load sensor according to claim 21, wherein a spiral groove into which the metal line is to be fitted is formed in the outer wall of the core member, and wherein the metal line is fitted into the groove when wound around the core member.

25. The load sensor according to claim 20, wherein anticorrosive metal is employed for the metal line.

26. The load sensor according to claim 21, wherein the envelope members are integrally formed by molding resin or rubber on the outer wall of the electrode member.

27. The load sensor according to claim 21, wherein the sensitivity of the load sensor used to detect the load is adjusted by altering, at least, one of the interval between the envelope members for enclosing the electrode member, the width in the longitudinal direction of the electrode member, the distance between the metal, coil-like wound line and the elastic tube, the thickness of the elastic tube, and the outer diameter of the elastic tube.

28. The load sensor according to claim 1, wherein the signal extraction line is electrically connected, directly or via a predetermined conductive member, to the conductive portion that is positioned at one or both ends of the elastic tube, and to the electrode members that are positioned at one or both ends of the insertion member.

29. The load sensor according to claim 1, wherein at both ends of the elastic tube the inner space of the elastic tube is protected from the outside by predetermined shielding means.

30. The load sensor according to claim 1, wherein the insertion means is divided into two segments at a specific location in the longitudinal direction.

31. The load sensor according to claim 30, wherein the two segments are positioned at a predetermined interval.

32. A load sensor unit comprising:
one or multiple load sensors according to claim 2; and
an insulating base member whereon one or a multiple of the load sensors are mounted.

33. The load sensor unit according to claim 32, wherein the load sensors are securely fixed to the base member at the ends of the load sensor or at portions whereat the envelope members are inserted between the insertion member and the elastic tube.

34. The load sensor unit according to claim 32, wherein the base member is a sheet member, and one or a multiple of the load sensors and the base member constitute a sheet unit, further comprising:
the sheet unit; and
a sheet-shaped insulating bag member in which the sheet unit is included.

35. An insertion detection device, which detects the insertion of a foreign object when an opening is closed by an opening/closing member, comprising:
a load sensor according to claim 19, which is provided on the inner wall of the opening or the outer wall of the opening/closing member that is opposite the inner wall; and
a detector, for detecting the insertion of a foreign object by determining whether the conductive portion of the elastic tube is electrically connected to the electrode members of the insertion member via a predetermined signal line.

36. A load sensor comprising:
an elastic tube, at least one part of which, in the circumferential direction, is a conductive portion;
an elongated insertion member, which has an electrode member provided longitudinally and which is inserted into the elastic tube;
envelope members, which are provided longitudinally at predetermined intervals to enclose the insertion member, and are inserted together with the insertion member into the elastic tube to separate the insertion member from the elastic tube; and
a metal conductive line, laid in the longitudinal direction of the elastic tube,
wherein the electrode member is located at a distance from the conductive portion of the elastic tube while the elastic tube is in the normal state, so that when the flexible elastic tube is bent by the application of an external load, an electrical connection is established by the electrode member, through or apart from the conductive portion of the elastic tube, and
wherein the metal conductive line is so arranged that, when the elastic tube is bent by the external application of a load, at least the portion of the metal conducive line at the load application position is capable of being electrically connected to the conductive portion of the elastic tube.

37. A load sensor according to claim 36, wherein the metal conductive line is so designed that the line directly contacts the conductive portion of the elastic tube at individual longitudinal points.

38. The load sensor according to claim 36, further comprising:
an exterior tube, which is provided on the outer wall of the elastic tube to accommodate the elastic tube and which has, at the least, one circumferential part that faces the conductive portion of the elastic tube and that serves as a conductive portion,
wherein the metal conductive line is provided so as to directly contact the conductive portion of the exterior tube at the individual longitudinal points, and
wherein the metal conductive line can be electrically connected to the conductive portion of the elastic tube through the conductive portion of the exterior tube.

39. A load sensor according to claim 36, wherein the electrode member is fashioned from flexible members, and the electrode member constitutes the insertion member.

40. The load sensor according to claim 39, wherein the electrode member has metal, longitudinally laid lines.

41. The load sensor according to claim 40, wherein the electrode member includes an elongated flexible core member and a metal line wound coil-like around the outer wall of the core member.

42. The load sensor according to claim 41, wherein the core member be an insulating member of resin, rubber or a fibrous material, or a compound material incorporating several of those materials.

43. A load sensor according to claim 41, wherein the core member is formed of an elastic material, and the metal line is wound around and embedded in the outer wall of the core member.

44. The load sensor according to claim 41, wherein a spiral groove into which the metal line is to be fitted is formed in the outer wall of the core member, and wherein the metal line is fitted into the groove when wound around the core member.

45. The load sensor according to claim 40, wherein anticorrosive metal is employed for the metal line.

46. The load sensor according to claim 41, wherein the envelope members are integrally formed by molding resin or rubber on the outer wall of the electrode member.

47. An insertion detection device, which detects the insertion of a foreign object when an opening is closed by an opening/closing member, comprising:
a load sensor according to one of claim 36, which is provided on the inner wall of the opening or the outer wall of the opening/closing member that is opposite the inner wall; and
a detector, for detecting the insertion of a foreign object by determining whether the conductive portion of the elastic tube is electrically connected to the electrode member of the insertion member via a predetermined signal line.

* * * * *